United States Patent
Dharmatilleke

(10) Patent No.: US 11,606,449 B2
(45) Date of Patent: Mar. 14, 2023

(54) MOBILE PHONE/DEVICE CASE OR COVER HAVING A 3D CAMERA

(71) Applicant: Medha Dharmatilleke, Singapore (SG)

(72) Inventor: Medha Dharmatilleke, Singapore (SG)

( * ) Notice: Subject to any disclaimer, the term of this patent is extended or adjusted under 35 U.S.C. 154(b) by 11 days.

(21) Appl. No.: 17/239,767

(22) Filed: Apr. 26, 2021

(65) Prior Publication Data

US 2021/0243285 A1 Aug. 5, 2021

Related U.S. Application Data

(63) Continuation of application No. 15/573,057, filed as application No. PCT/SG2016/000007 on May 13, 2016, now Pat. No. 11,057,505.

(30) Foreign Application Priority Data

May 14, 2015 (SG) .................. PCT/SG2015/000125
Dec. 30, 2015 (SG) .................. PCT/SG2015/000146

(51) Int. Cl.
*H04N 13/20* (2018.01)
*H04M 1/02* (2006.01)
(Continued)

(52) U.S. Cl.
CPC ........ *H04M 1/0222* (2013.01); *H04B 1/3888* (2013.01); *H04M 1/0264* (2013.01);
(Continued)

(58) Field of Classification Search
CPC ............. H04M 1/0222; H04M 1/0264; H04M 1/0266; H04M 1/04; H04M 2201/38;
(Continued)

(56) References Cited

U.S. PATENT DOCUMENTS

| 6,046,787 A * | 4/2000 | Nishiguchi .......... H04N 13/341 |
| | | 348/E13.058 |
| 6,081,380 A * | 6/2000 | Ohshima ................ G02B 30/27 |
| | | 348/E13.058 |

(Continued)

FOREIGN PATENT DOCUMENTS

| WO | 2008132724 A1 | 11/2008 |
| WO | 2016182502 A1 | 11/2016 |
| WO | 2016182503 A1 | 11/2016 |

OTHER PUBLICATIONS

International Search Report and Written Opinion relating to priority application PCT/SG2016/000007, dated Oct. 21, 2016.

(Continued)

*Primary Examiner* — Jefferey F Harold
*Assistant Examiner* — Timothy R Newlin
(74) *Attorney, Agent, or Firm* — Andrew A Paul

(57) ABSTRACT

A mobile phone/device case or cover having a 3D camera, realized by integrating or connecting two cameras and a 3D viewer sheet integrated on the phone/device case or cover; wherein the 3D camera comprises: a V-shaped optical component having left and right arms, which act as light guides to guide the light from an object, onto an image sensor, and a focusing lens for focusing an image on the image sensor, where two images are formed of any object in the field of view of the V-shaped optical component.

20 Claims, 73 Drawing Sheets

(51) Int. Cl.
| | | |
|---|---|---|
| | *H04N 13/305* | (2018.01) |
| | *H04B 1/3888* | (2015.01) |
| | *H04N 13/204* | (2018.01) |
| | *H04N 13/239* | (2018.01) |
| | *H04N 13/296* | (2018.01) |
| | *H04N 5/225* | (2006.01) |
| | *H04N 5/232* | (2006.01) |
| | *H04N 13/30* | (2018.01) |
| | *H04M 1/04* | (2006.01) |

(52) U.S. Cl.
CPC ........ *H04M 1/0266* (2013.01); *H04N 5/2252* (2013.01); *H04N 5/2254* (2013.01); *H04N 5/2256* (2013.01); *H04N 5/23245* (2013.01); *H04N 5/23293* (2013.01); *H04N 13/204* (2018.05); *H04N 13/239* (2018.05); *H04N 13/296* (2018.05); *H04N 13/305* (2018.05); *H04M 1/04* (2013.01); *H04M 2201/38* (2013.01); *H04M 2250/52* (2013.01); *H04N 13/30* (2018.05); *H04N 2213/001* (2013.01)

(58) Field of Classification Search
CPC ............. H04M 2250/52; H04B 1/3888; H04N 5/2254; H04N 5/2256; H04N 5/23245; H04N 5/23293; H04N 13/204; H04N 13/239; H04N 13/296; H04N 13/305; H04N 13/30; H04N 2213/001
See application file for complete search history.

(56) References Cited

U.S. PATENT DOCUMENTS

| | | | |
|---|---|---|---|
| 6,590,605 B1 | 7/2003 | Eichenlaub | |
| 7,312,845 B2 | 12/2007 | Silverbrook | |
| 8,553,043 B2 | 10/2013 | Yan | |
| 8,639,214 B1 | 1/2014 | Fujisaki | |
| 9,277,206 B1* | 3/2016 | Lloyd | G01B 11/2545 |
| 9,503,705 B2* | 11/2016 | Ramirez | H04N 13/225 |
| 9,854,164 B1* | 12/2017 | Kozko | G02B 27/1066 |
| 10,268,044 B1 | 4/2019 | Spickermann | |
| 2002/0181034 A1 | 12/2002 | Miyake | |
| 2003/0214732 A1 | 11/2003 | Kajino | |
| 2004/0208362 A1 | 10/2004 | Suzuki | |
| 2006/0170869 A1* | 8/2006 | Shestak | H04N 13/305 352/57 |
| 2007/0159640 A1* | 7/2007 | Berestov | H04N 13/214 348/E13.014 |
| 2008/0150936 A1* | 6/2008 | Karman | H04N 13/376 348/E13.05 |
| 2010/0045773 A1* | 2/2010 | Ritchey | H04N 5/23238 348/E7.001 |
| 2010/0279739 A1 | 11/2010 | Lin | |
| 2011/0267348 A1 | 11/2011 | Lin | |
| 2011/0279655 A1* | 11/2011 | Tan | H04N 13/218 348/E13.074 |
| 2011/0315863 A1* | 12/2011 | Yu | H01L 31/02325 250/578.1 |
| 2012/0007947 A1 | 1/2012 | Costa et al. | |
| 2012/0098971 A1* | 4/2012 | Hansen | H04N 5/2252 348/E5.09 |
| 2012/0113100 A1 | 5/2012 | Niioka et al. | |
| 2012/0154374 A1* | 6/2012 | Cheng | H04N 13/139 345/419 |
| 2012/0229595 A1 | 9/2012 | Miller | |
| 2012/0236123 A1* | 9/2012 | Chen | H04N 13/239 348/47 |
| 2012/0270600 A1* | 10/2012 | Zelson | H04B 1/3888 348/E5.026 |
| 2012/0314144 A1 | 12/2012 | Sugita | |
| 2013/0021335 A1* | 1/2013 | Arakita | G02B 30/27 345/419 |
| 2013/0044372 A1 | 2/2013 | Lo | |
| 2013/0106838 A1 | 5/2013 | Lee et al. | |
| 2013/0113894 A1 | 5/2013 | Mirlay | |
| 2013/0121559 A1 | 5/2013 | Hu | |
| 2013/0314494 A1 | 11/2013 | Chen | |
| 2013/0314507 A1* | 11/2013 | Akagi | G03B 35/10 348/46 |
| 2014/0015942 A1 | 1/2014 | Said | |
| 2014/0071231 A1 | 3/2014 | Joseph | |
| 2014/0104389 A1* | 4/2014 | Dharmatilleke | H04N 5/2254 348/46 |
| 2014/0313551 A1 | 10/2014 | Lyren | |
| 2014/0320604 A1* | 10/2014 | Dalvi | H04N 13/239 348/47 |
| 2015/0015462 A1* | 1/2015 | Lee | H04N 13/305 361/679.01 |
| 2015/0181089 A1* | 6/2015 | Mirlay | H04N 13/204 348/46 |
| 2015/0277014 A1* | 10/2015 | Schrader | G02B 6/00 348/335 |
| 2015/0370079 A1 | 12/2015 | Shin | |
| 2015/0378393 A1* | 12/2015 | Erad | G06F 3/1446 345/1.3 |
| 2016/0002380 A1* | 1/2016 | Abe | C08F 220/68 526/274 |
| 2016/0092012 A1 | 3/2016 | Yamaguchi | |
| 2016/0182887 A1* | 6/2016 | Gutierrez | H04N 13/207 348/46 |
| 2017/0142407 A1 | 5/2017 | Cho | |
| 2017/0176710 A1 | 6/2017 | Peng | |
| 2017/0269357 A1 | 9/2017 | Murao | |
| 2017/0272651 A1* | 9/2017 | Mathy | G01S 17/894 |
| 2017/0295357 A1 | 10/2017 | Yang | |
| 2019/0116319 A1 | 4/2019 | Tokiwa | |
| 2021/0376666 A1* | 12/2021 | AbuKhalaf | H02J 50/80 |

OTHER PUBLICATIONS

International Search Report and Written Opinion relating to priority application PCT/SG2015/000146, dated May 25, 2016.
International Search Report and Written Opinion relating to priority application PCT/SG2015/000125, dated Apr. 22, 2016.

* cited by examiner

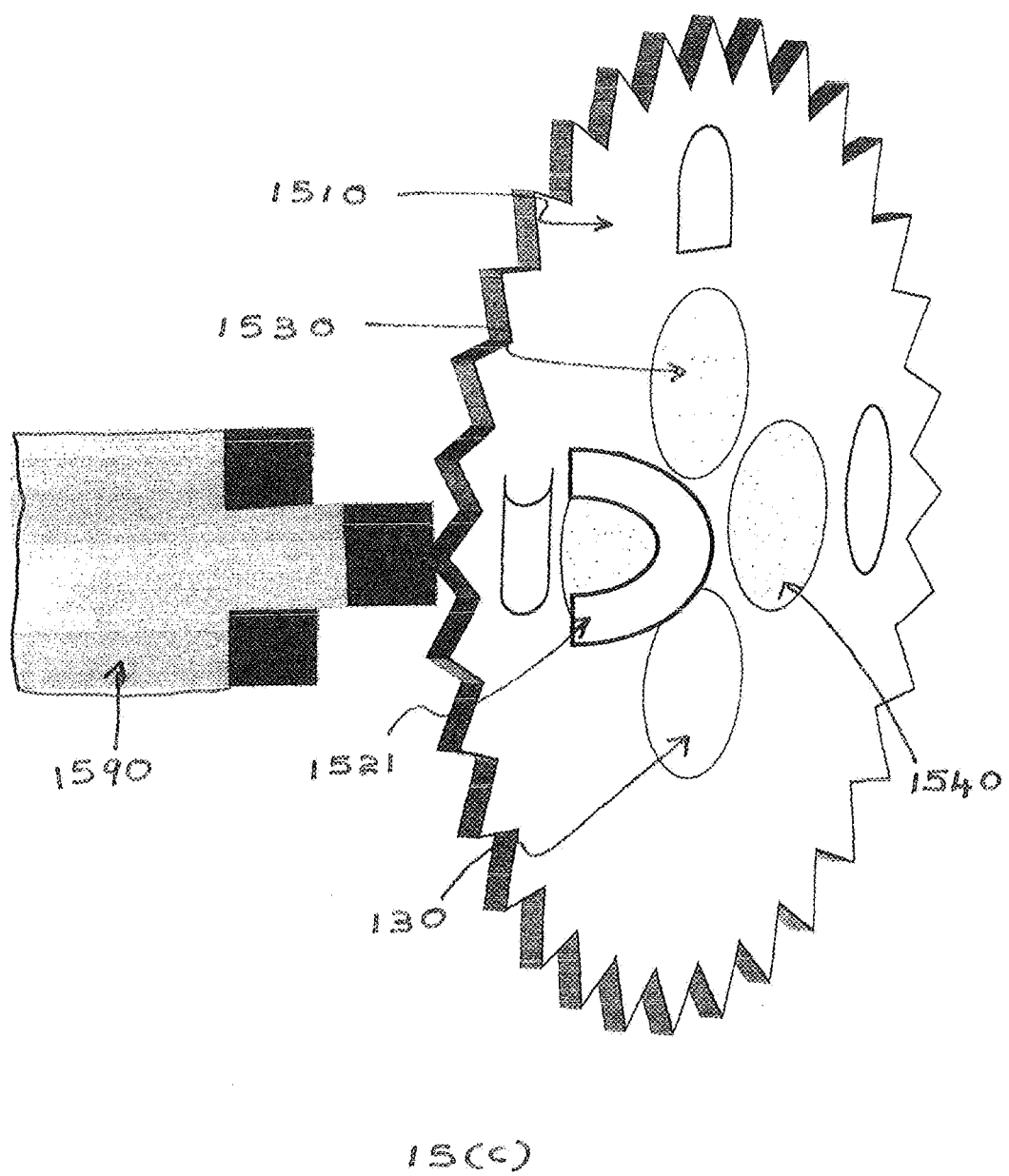
15(c)

Mobile phone attached to audio amplification module

MOBILE PHONE/DEVICE CASE OR COVER HAVING A 3D CAMERA

CROSS REFERENCE TO RELATED APPLICATION

This application is a continuation application of U.S. Ser. No. 15/573,057, filed on 9 Nov. 2017, the disclosure of which is hereby incorporated by reference in its entirety.

BACKGROUND

Technical Field

Embodiments of the invention relate to a mobile phone/device case or cover having a 3D camera.

SUMMARY OF EMBODIMENTS OF THE INVENTION

A mobile phone/device case or cover having a 3D camera, realized by integrating or connecting two cameras and a 3D viewer sheet integrated on the phone/device case or cover; wherein the 3D camera comprises: a V-shaped optical component having left and right arms, which act as light guides to guide the light from an object, onto an image sensor, and a focusing lens for focusing an image on the image sensor, where two images are formed of any object in the field of view of the V-shaped optical component.

The mobile phone/device case or cover may also have two objective lenses to collect and focus light from an object and guide the light through the left and right arms of the V-shaped optical component, respectively.

The V-shaped optical component may comprise four prisms placed in two groups of two, where in a given group, light entering into one prism is reflected into the second prism due to total internal reflection at the first prism and the light entering the second prism is reflected due to total internal reflection at the second prism, on the image sensor, forming side-by-side images on the image sensor.

The mobile phone/device case or cover may have a 3D viewer sheet that does not require electricity to function.

The application areas are in the mobile communications such as mobile phone/devices, laptops, smart phones, mobile multimedia devices, web cams, video camera, camcorders, digital SLR cameras, digital cameras, photographic film camera, medical camera and compact camera modules, mobile phone/device camera, 3 Dimension depth mapping, holography, depth sensing, video/image projector.

BRIEF DESCRIPTION OF THE DRAWINGS

FIG. 15 a) illustrates a camera which may be integrated on a mobile phone/device case. The camera has multiple lenses attached to a thumb wheel where different lenses can be used/changed to have multiple optical effects. (eg. Zoom, telephoto, multi image, etc). FIG. (15 b) illustrates a camera which may be integrated on a mobile phone/device case. The camera has multiple lenses attached to a thumb wheel where different lenses can be used/changed to have multiple optical effects. (eg. Zoom, telephoto, multi image, etc). FIG. (15 c)

illustrates a camera which may be integrated on a mobile phone/device case. The camera has multiple lenses attached to a thumb wheel where different lenses can be used/changed to have multiple optical effects. (eg. Zoom, telephoto, multi image, etc). FIG. (16) illustrates a 3D camera and a 3D viewer integrated on a mobile phone/device case. The camera has multiple lenses attached to a thumb wheel where different lenses can be used/changed to have multiple optical effects. The camera is shown to be rotated around multiple axis.

Figure 17:
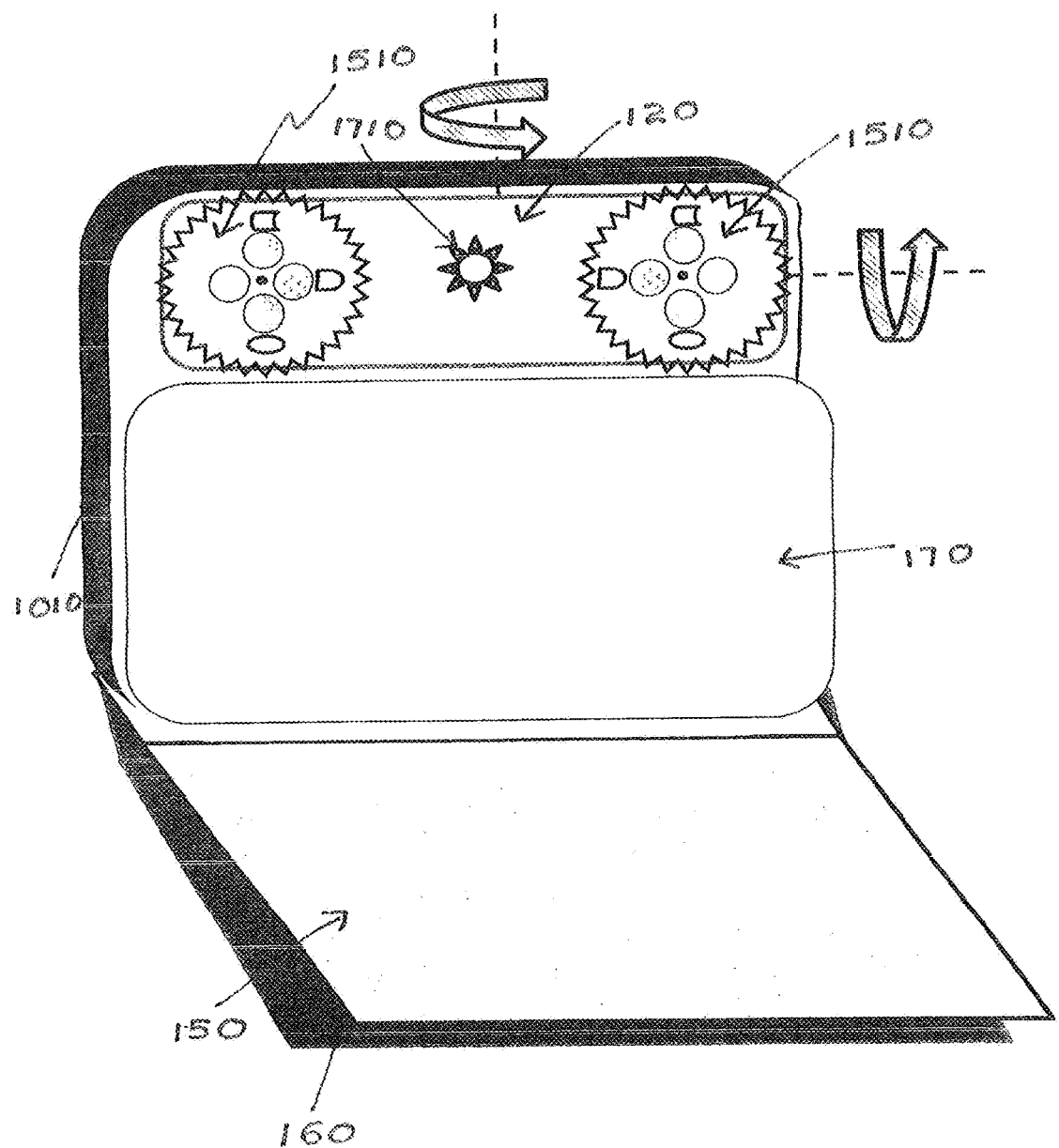

FIG. 17) illustrates a 3D camera, a 3D viewer and camera flash integrated on a mobile phone/device case. The camera has multiple lenses attached to a thumb wheel where different lenses can be used/changed to have multiple optical effects. The camera is shown to be rotated around multiple axis.

Figure 18:
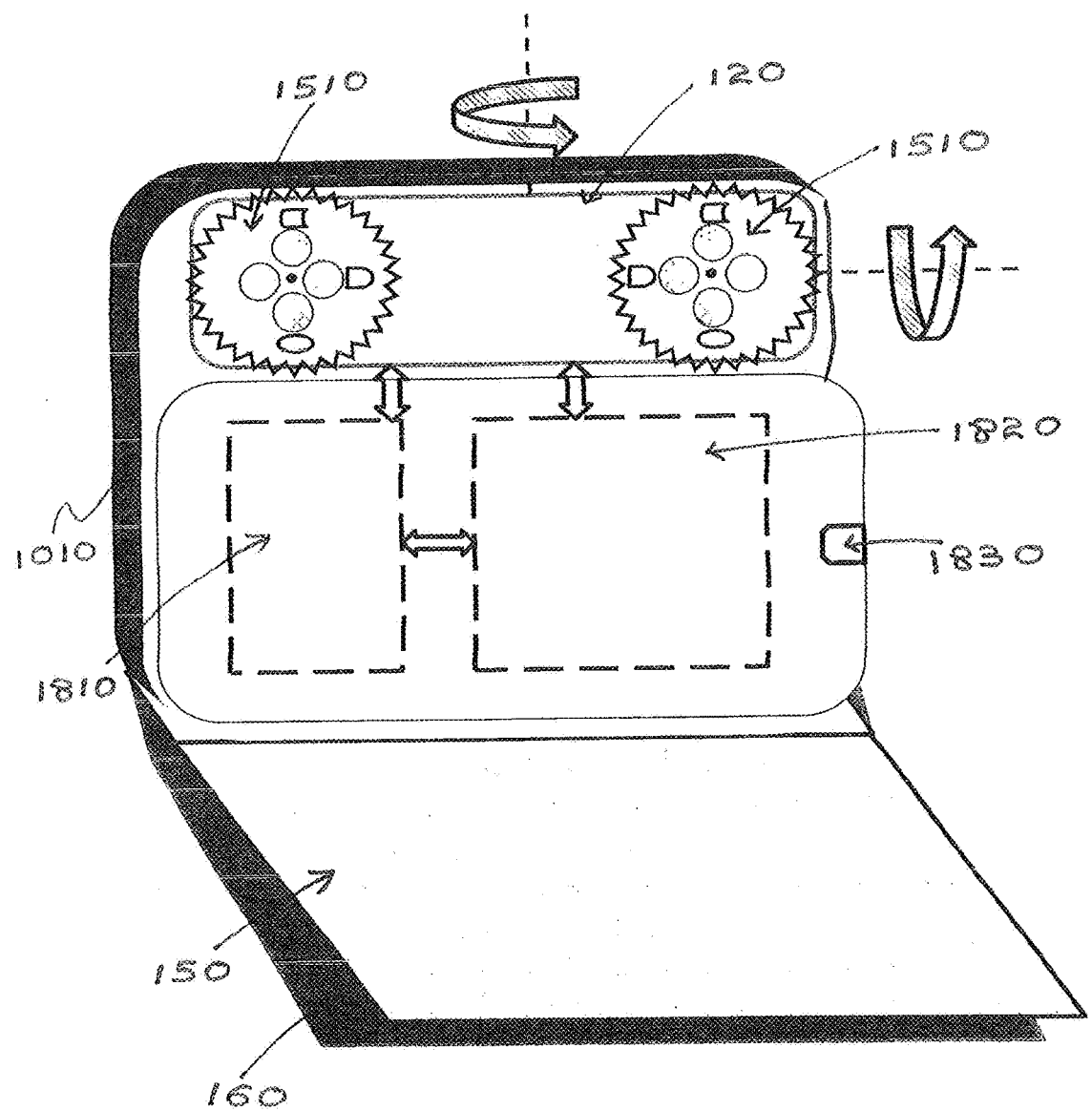

FIG. 18) illustrates a 3D camera, a 3D viewer, electronics with wireless communication, signal processing and battery integrated on a mobile phone/device case. The camera has multiple lenses attached to a thumb wheel where different lenses can be used/changed to have multiple optical effects. The camera is shown to be rotated around multiple axis. FIG. (18a) illustrates a 3D camera, a 3D viewer, electronics with wireless communication, signal processing and battery integrated on a mobile phone/device case. The camera has multiple lenses attached to a thumb wheel where different lenses can be used/changed to have multiple optical effects. The camera is shown to be rotated around multiple axis. The flip cover and 3D viewer has rounded edges.

Figure 19:
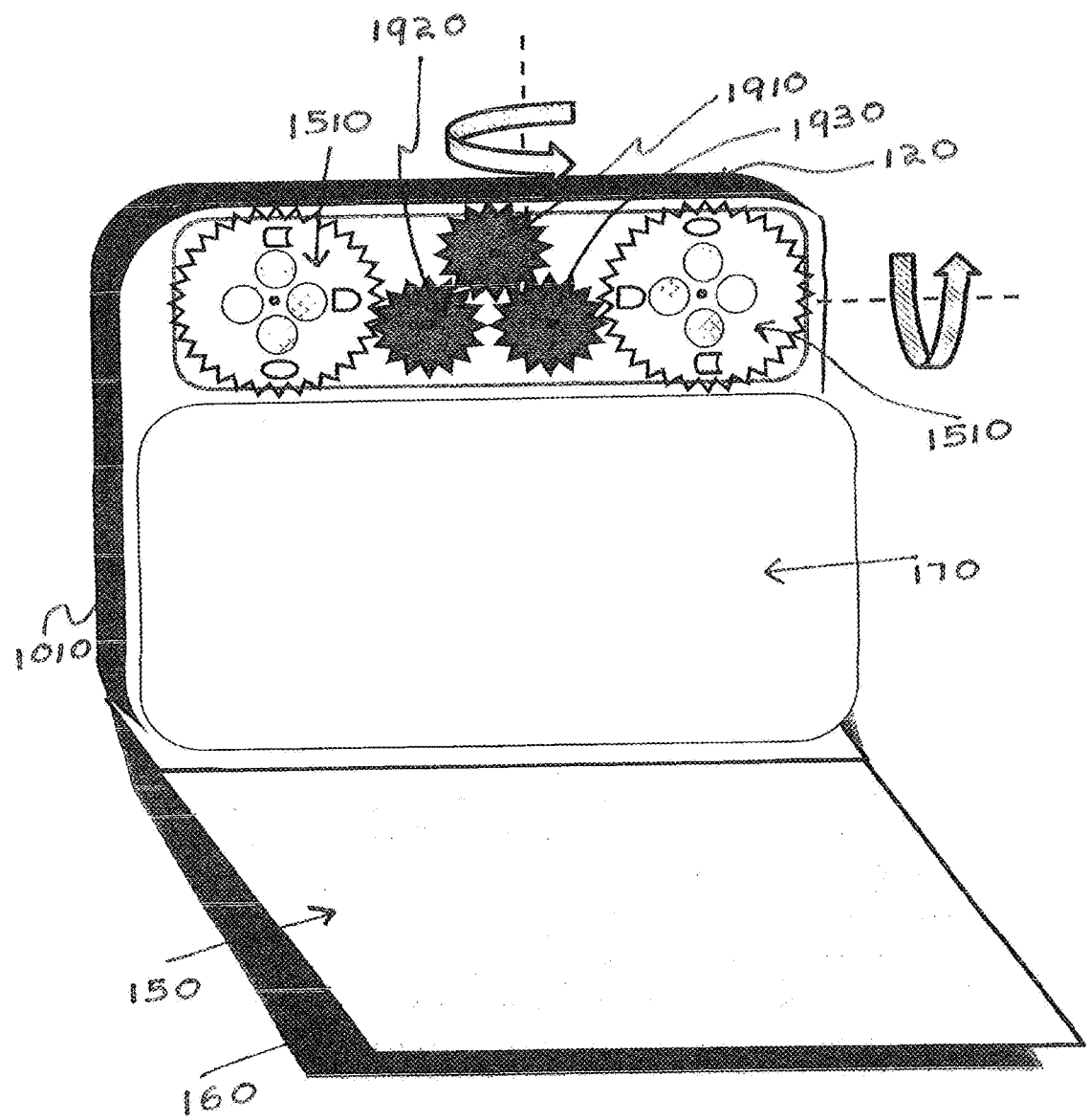

FIG. 19) illustrates a 3D camera, a 3D viewer, electronics with wireless communication, signal processing and battery integrated on a mobile phone/device case. The camera has multiple lenses attached to a thumb wheel where different lenses can be used/changed to have multiple optical effects. The camera is shown to have coupled the thumb wheels having multiple lenses.

Figure 20:
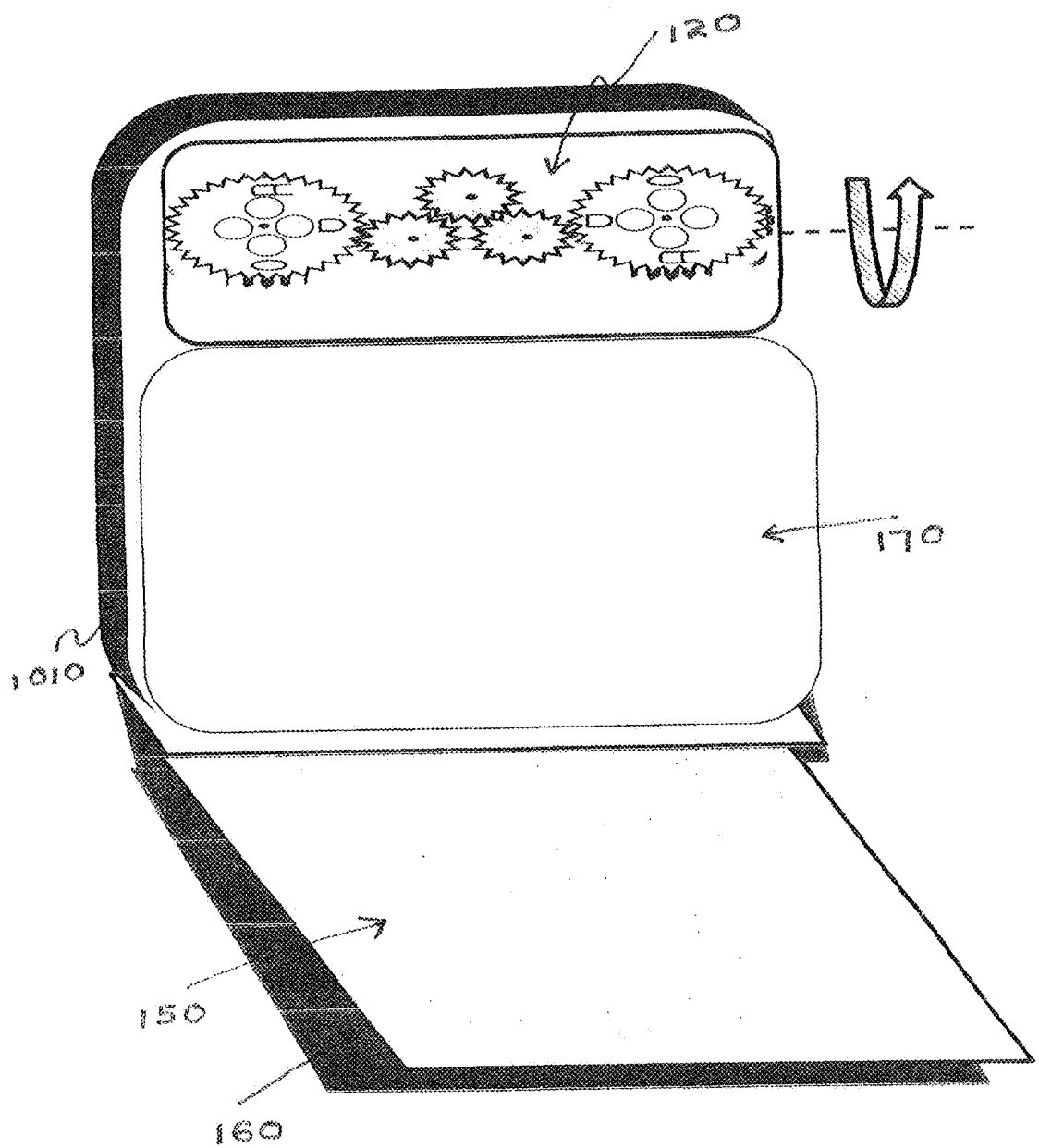
Figure 21:
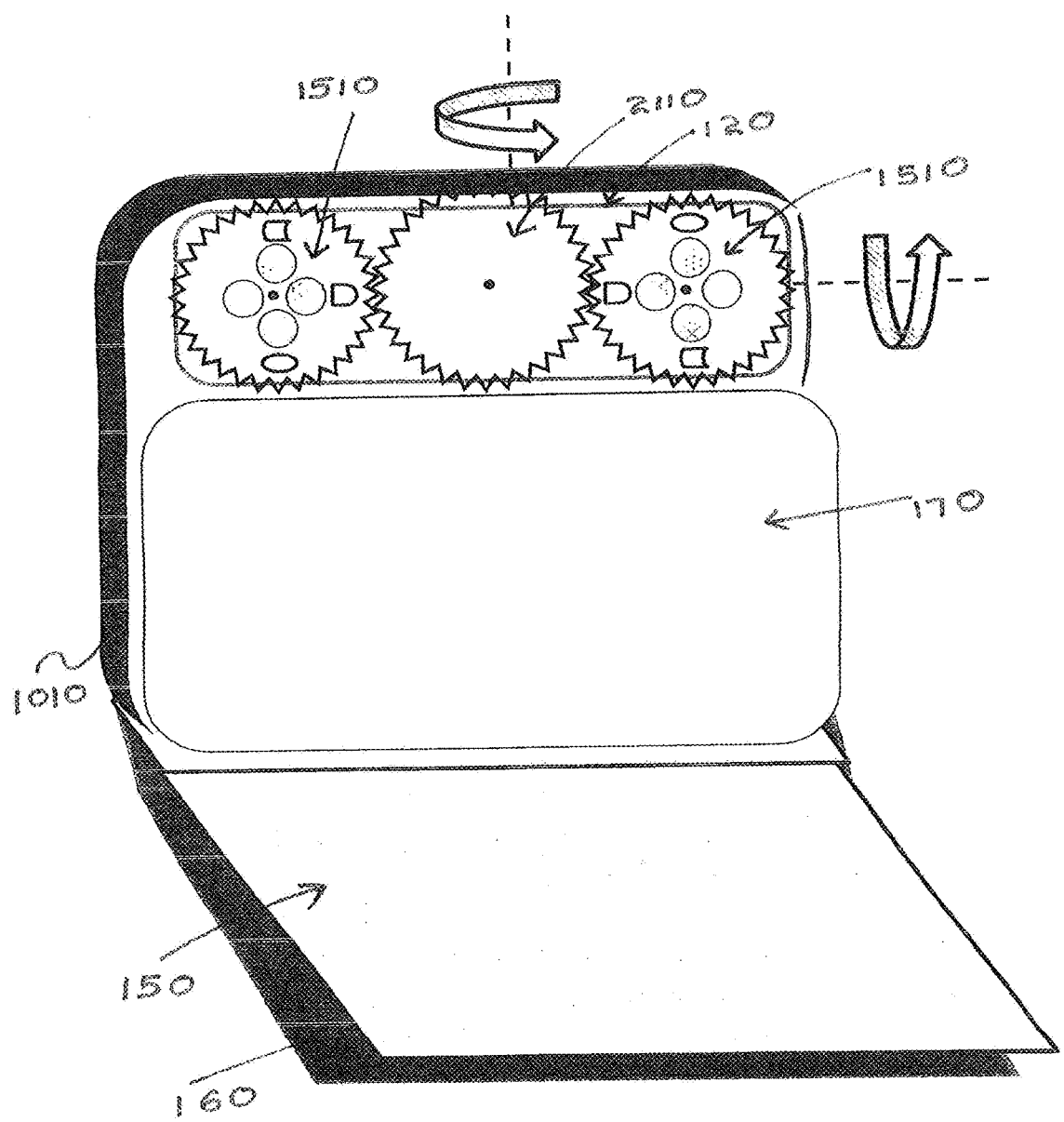

FIG. 20) illustrates a 3D camera, a 3D viewer, electronics with wireless communication, signal processing and battery integrated on a mobile phone/device case. The camera has multiple lenses attached to a thumb wheel where different lenses can be used/changed to have multiple optical effects. The camera is shown to have coupled the thumb wheels having multiple lenses. The camera is shown to be rotated around multiple axis. FIG. 21) illustrates a 3D camera, a 3D viewer, electronics with wireless communication, signal processing and battery integrated on a mobile phone/device case. The camera has multiple lenses attached to a thumb wheel where different lenses can be used/changed to have multiple optical effects. The camera is shown to have coupled the thumb wheels having multiple lenses.

Figure 22:
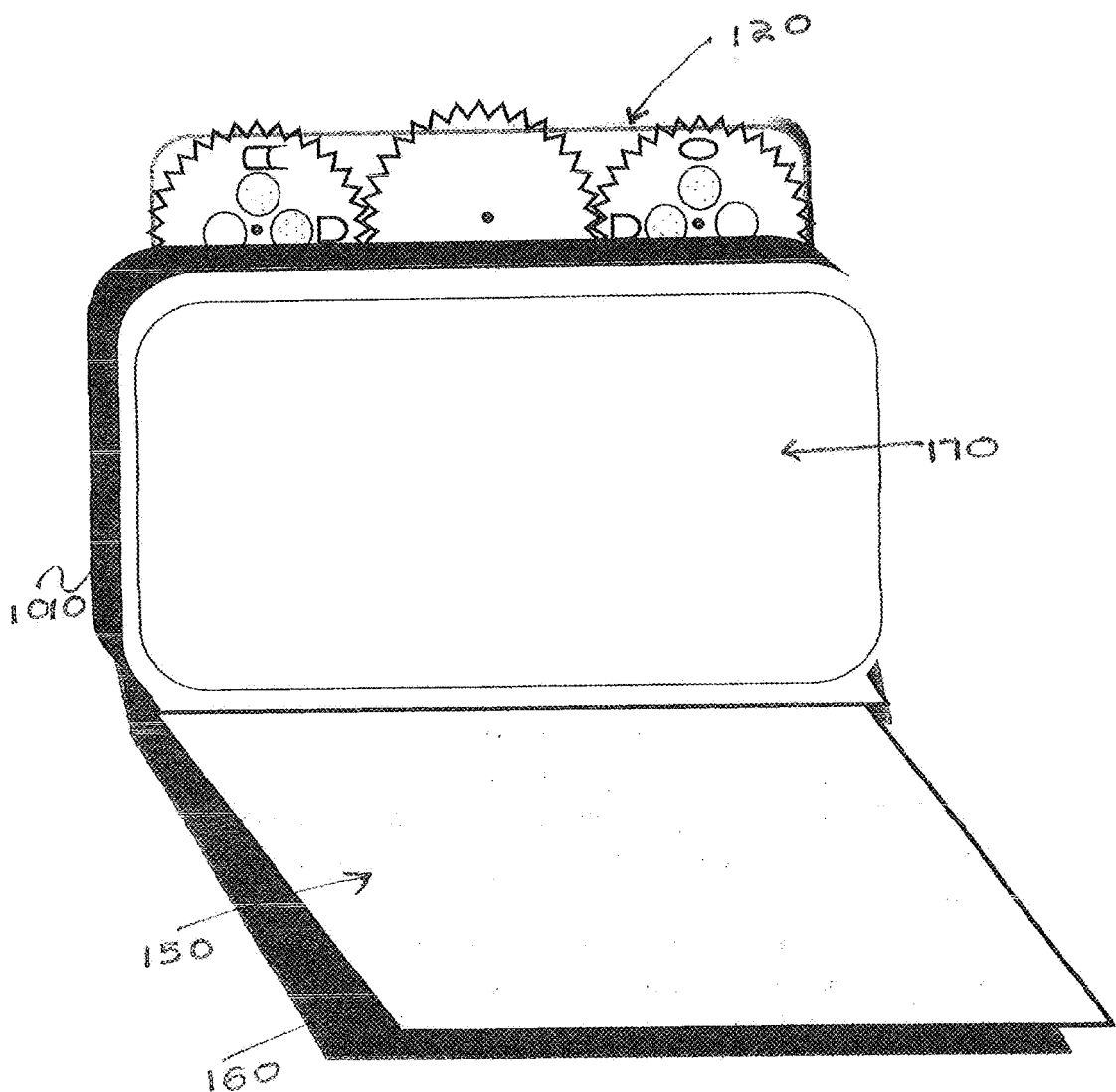

FIG. 22) illustrates a 3D camera, a 3D viewer, electronics with wireless communication, signal processing and battery integrated on a mobile phone/device case. The camera has multiple lenses attached to a thumb wheel where different lenses can be used/changed to have multiple optical effects. The camera is shown to have coupled the thumb wheels having multiple lenses. The camera can be slipped inside the phone case, after use. FIG. (23) illustrates a 3D camera, a 3D viewer, electronics with wireless communication, signal processing and battery integrated on a mobile phone/device case. The camera has multiple lenses attached to a thumb wheel where different lenses can be used/changed to have multiple optical effects. The camera is shown to have coupled the thumb wheels having multiple lenses. The camera can be further slipped inside the phone case, after use.

Figure 24:
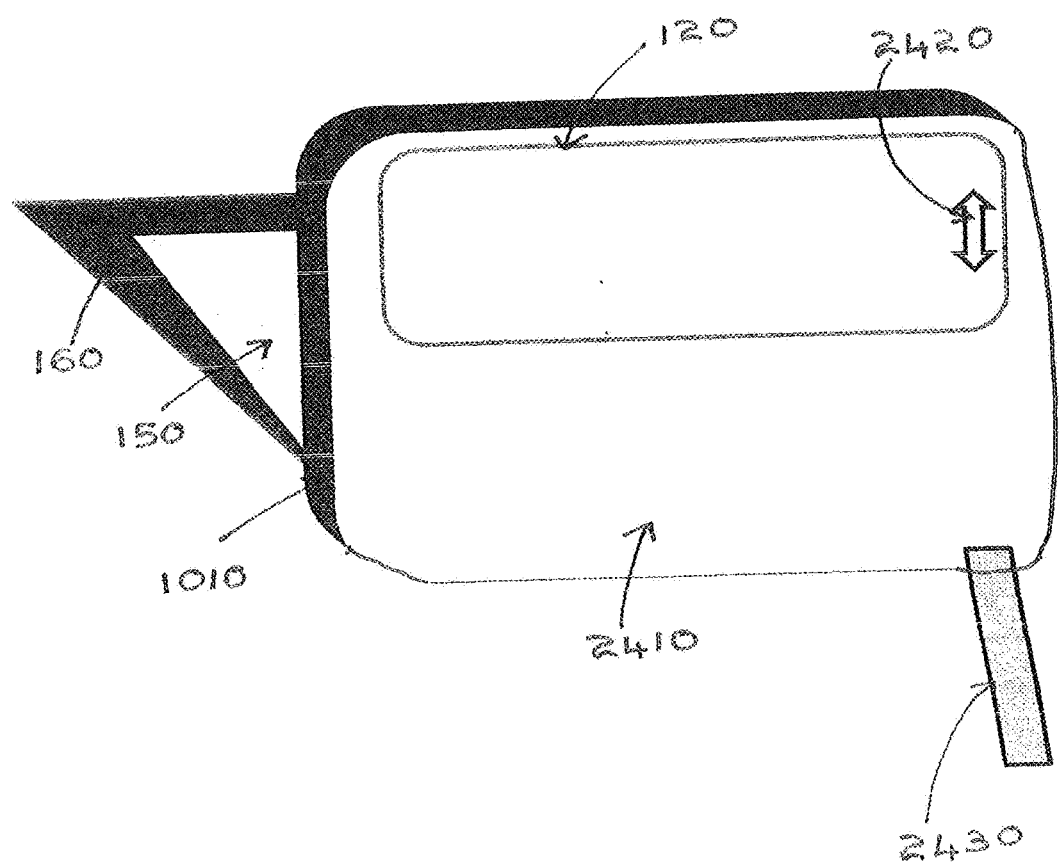

FIG. 24) illustrates the backside of the phone case, when the camera is retracted.

Figure 25:
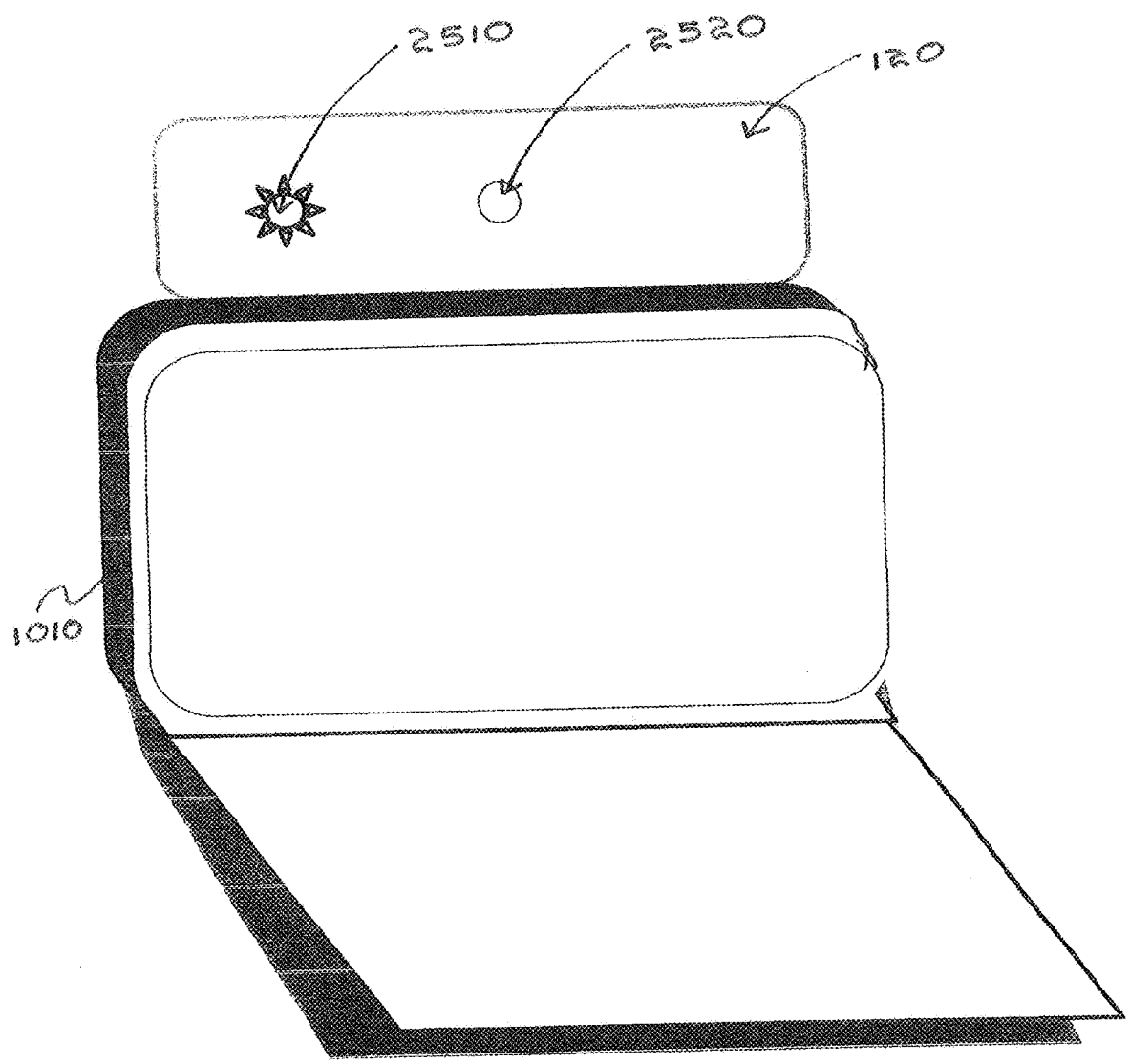

FIG. 25) illustrates a camera which may be integrated on a mobile phone/device case. The camera is equipped with a flash.

Figure 26:
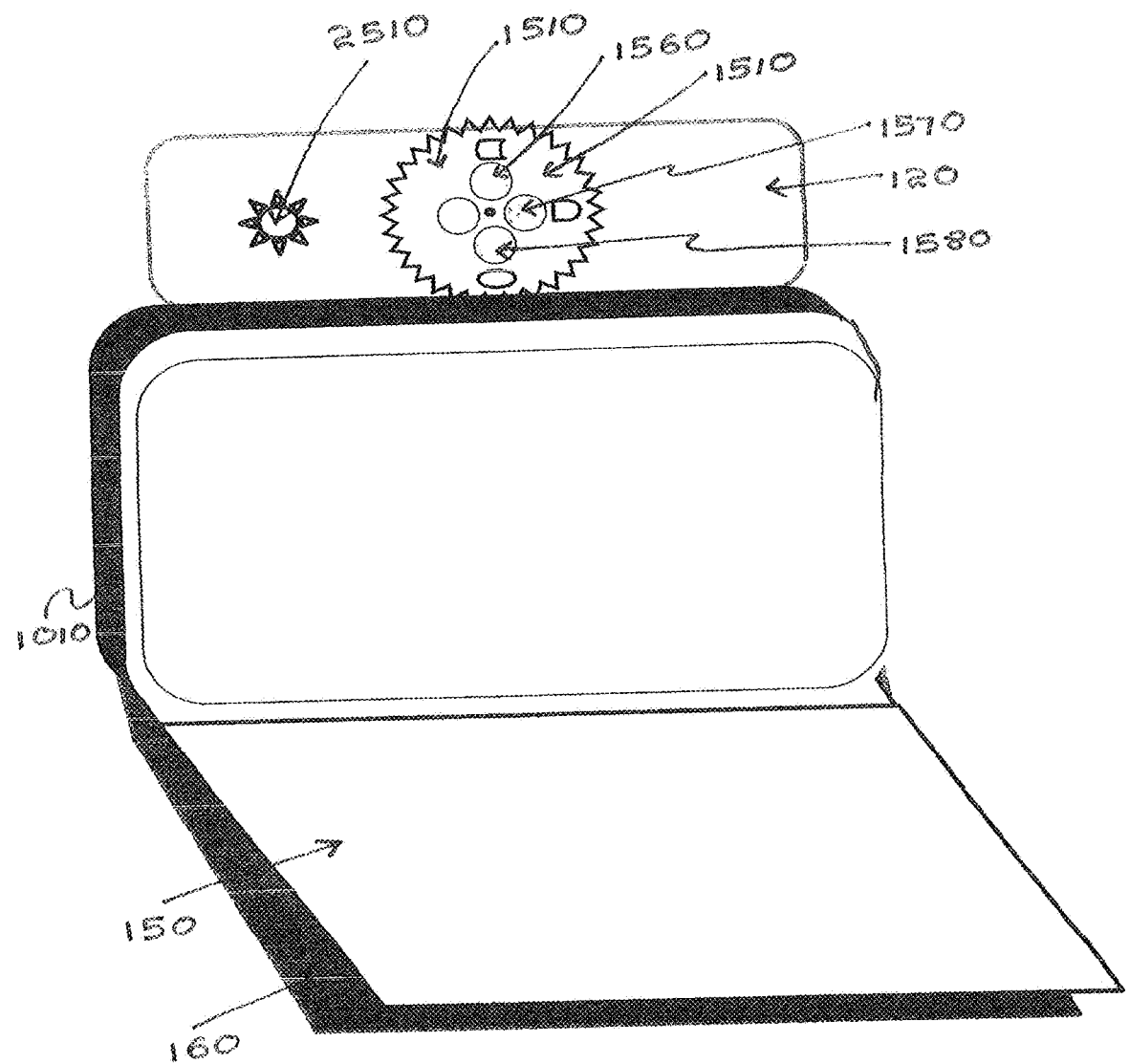

FIG. 26) illustrates a camera, a viewer, electronics with wireless communication, signal processing and battery integrated on a mobile phone/device case. The camera has multiple lenses attached to a thumb wheel where different lenses can be used/changed to have multiple optical effects. The camera is shown to have coupled the thumb wheels having multiple lenses. The camera can be slipped inside the phone case, after use. The camera is equipped with a flash.

Figure 27:
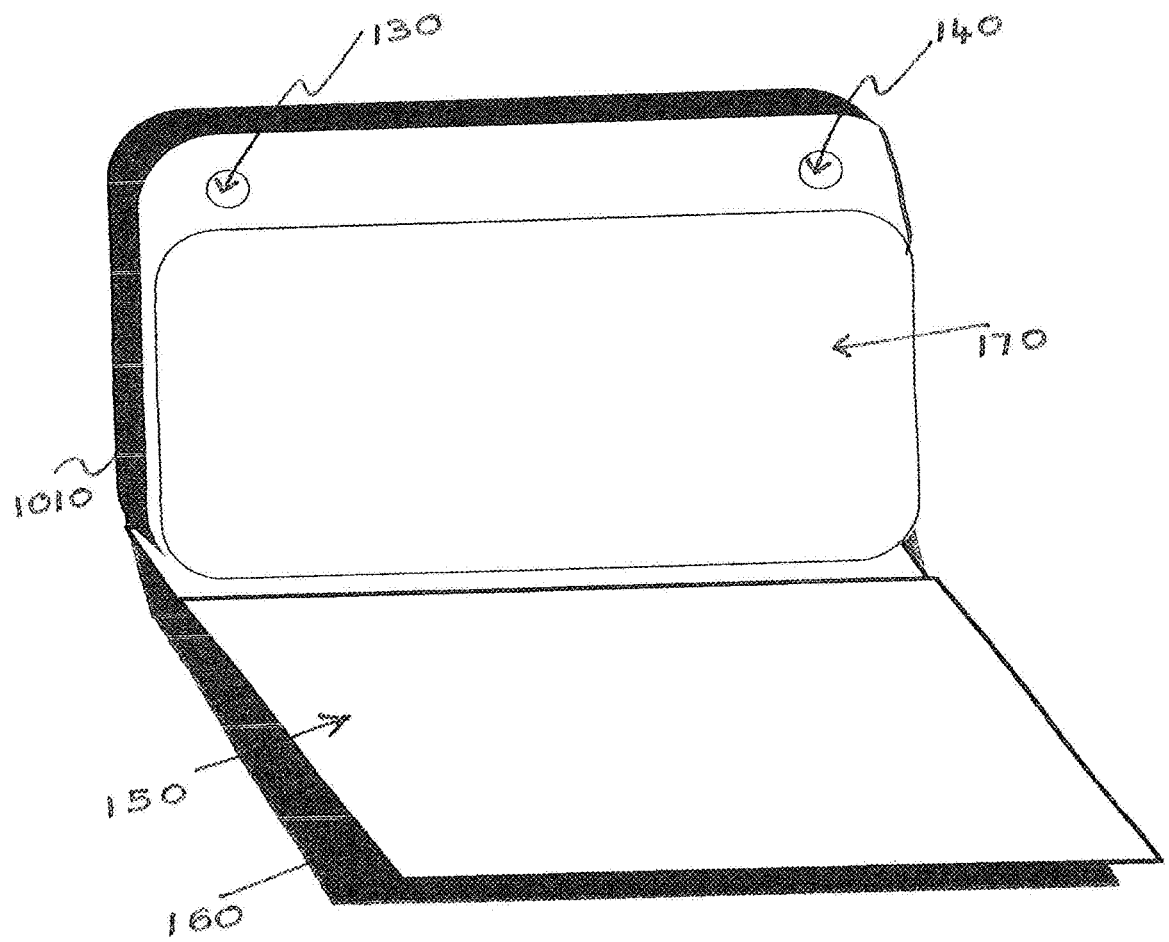

FIG. 27) illustrates the 3D camera permanently fixed on the phone case.

Figure 28:
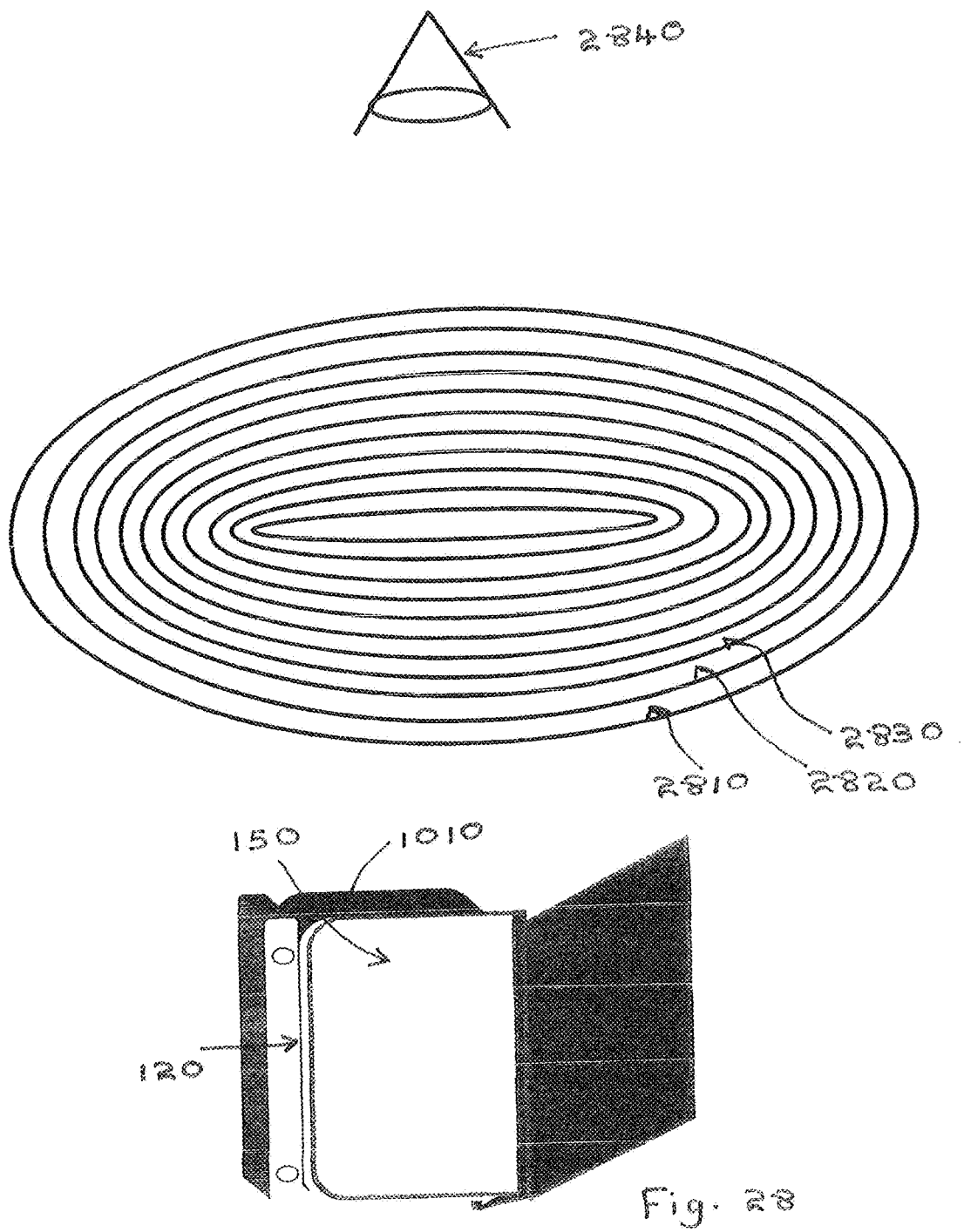

FIG. 28) illustrates a 3D camera, a 3D viewer, electronics with wireless communication, signal processing and battery integrated on a mobile phone/device case. A 3D viewer and a Fresnel lens viewer is placed between the phone display screen and the eye of the person looking at the screen.

Figure 28A:
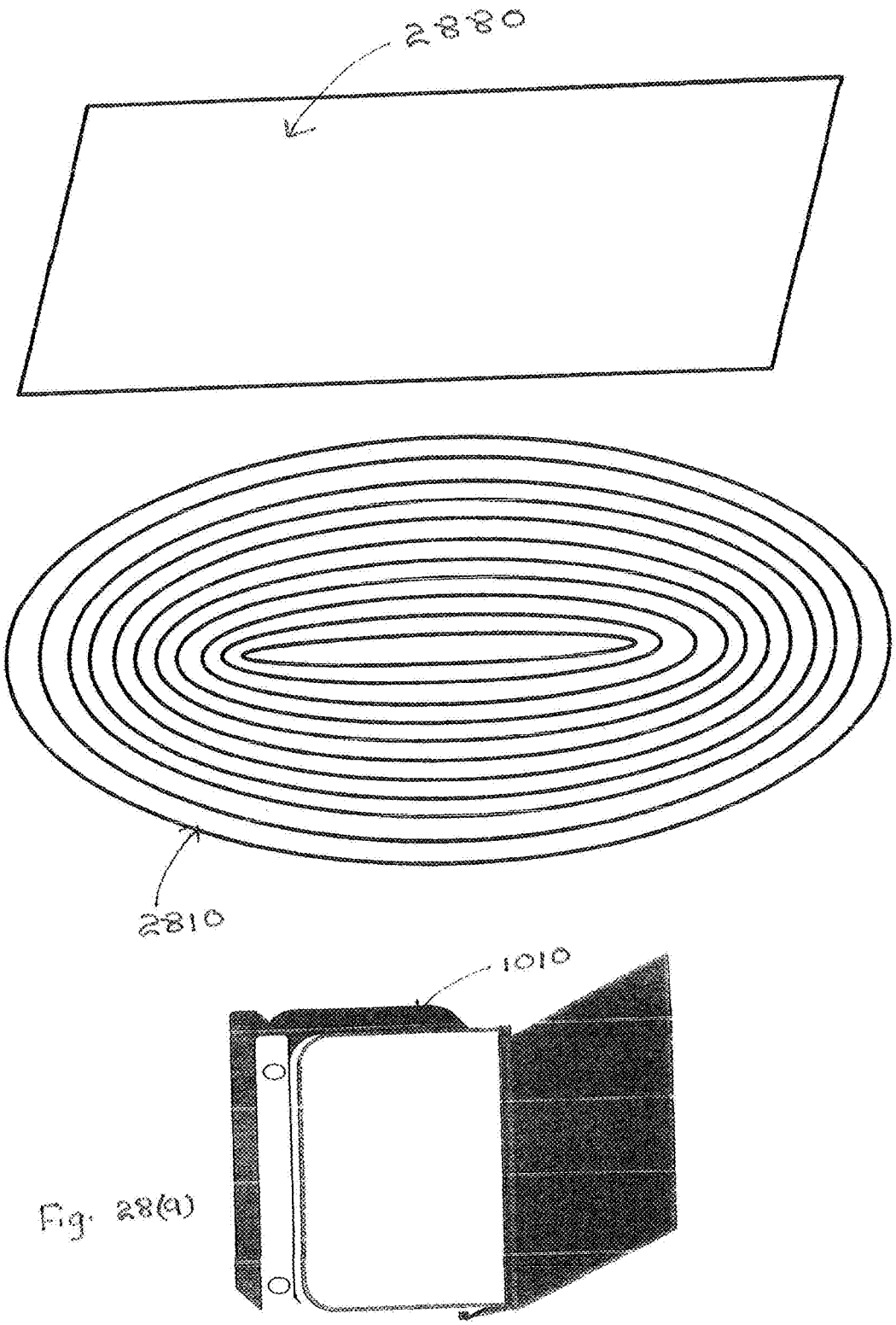

FIG. 28a Illustrates the method to project the content on the mobile device's display onto a screen.

Figure 28B:
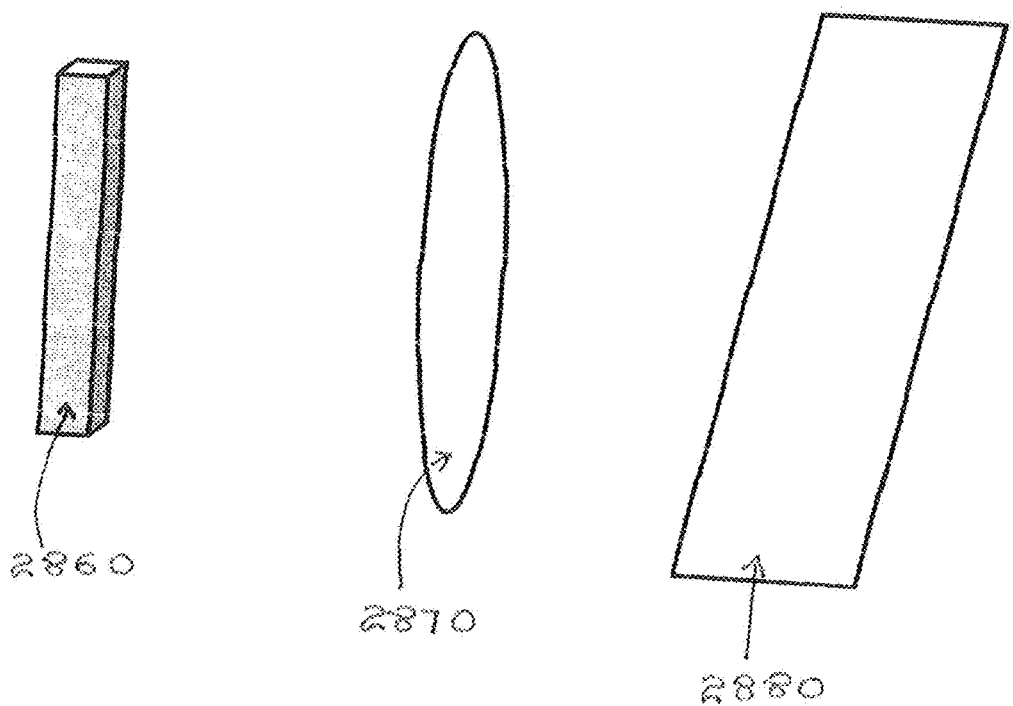

FIG. 28b Illustrates the cross sectional view of the method to project the content on the mobile device's display onto a screen.

Figure 29:
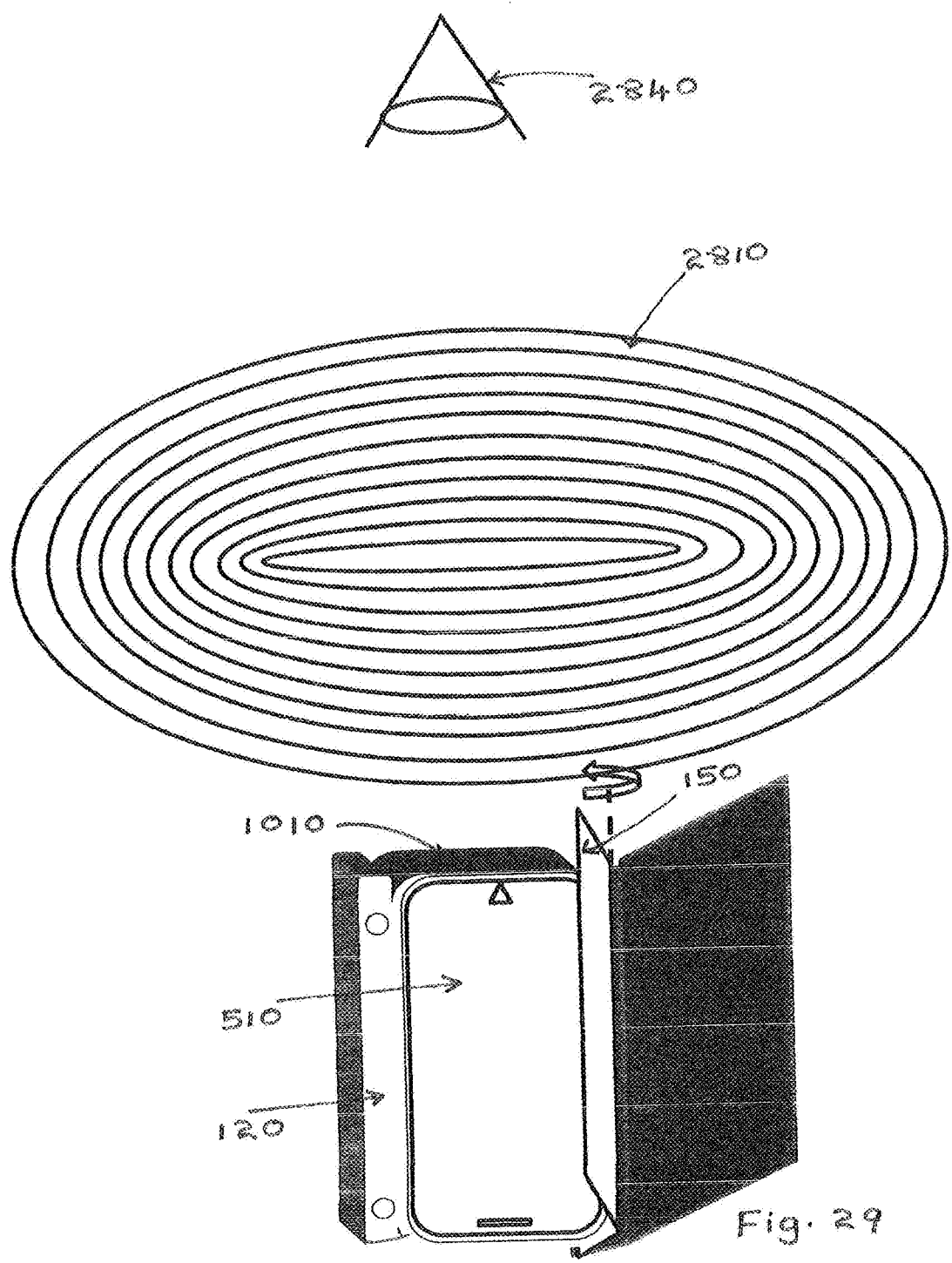

FIG. 29) illustrates a 3D camera, a 3D viewer, electronics with wireless communication, signal processing and battery integrated on a mobile phone/device case. A Fresnel lens viewer is placed between the phone display screen and the eye of the person looking at the screen.

Figure 30:
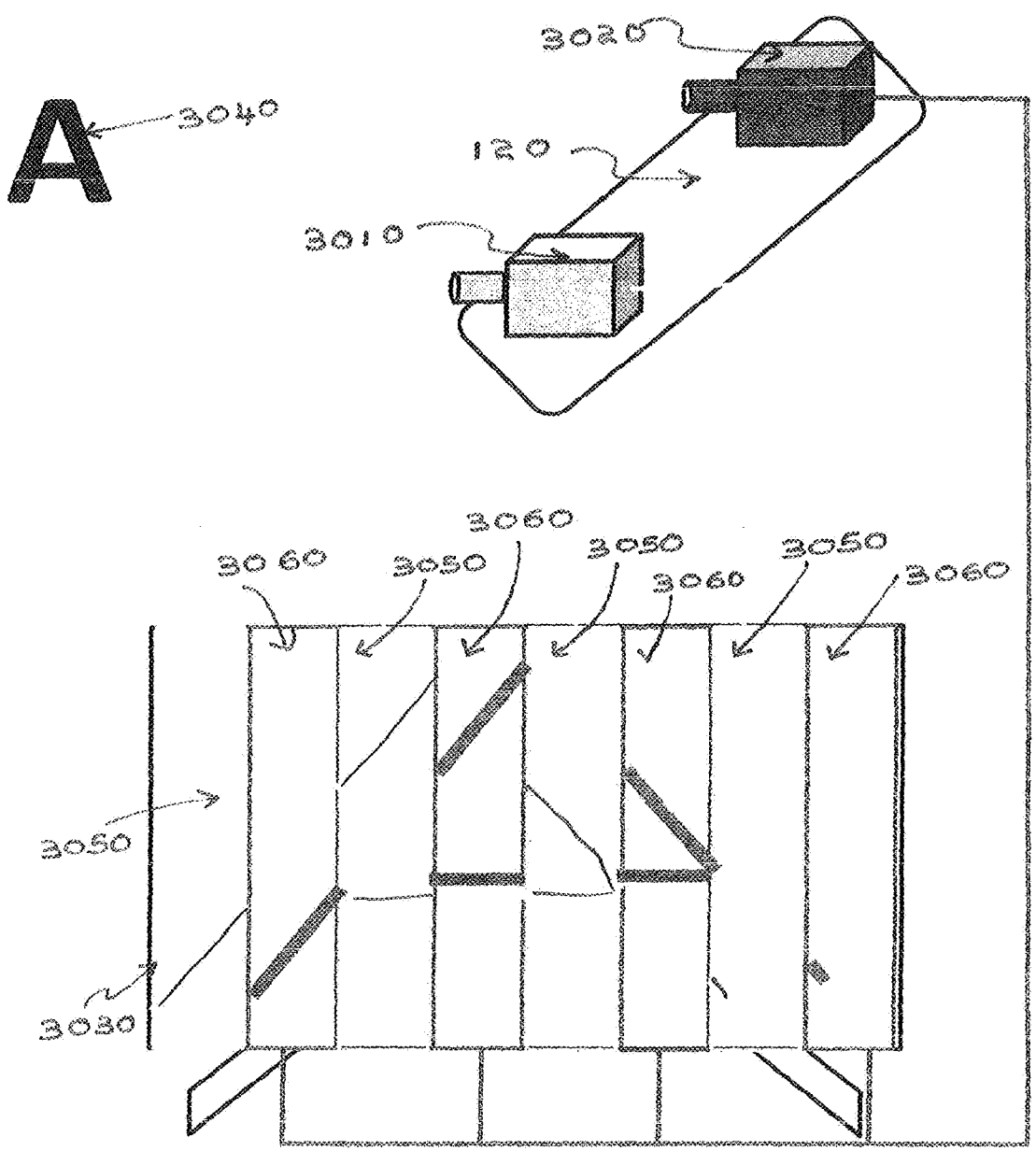

FIG. 30) illustrates another mode of displaying the two images captured with the two cameras of the 3D camera.

Figure 31:
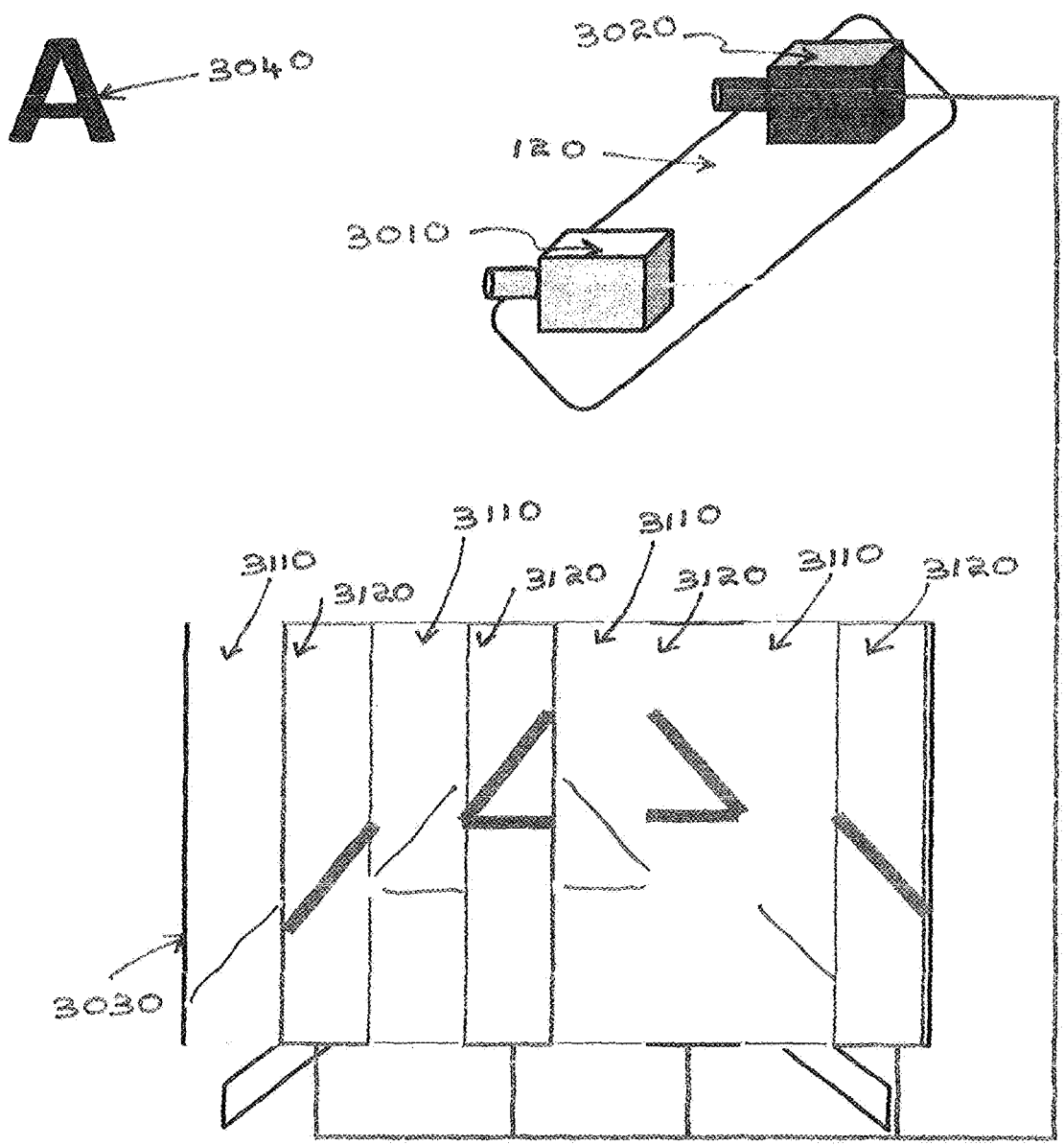

FIG. 31) illustrates another mode of displaying the two images captured with the two cameras of the 3D camera.

Figure 32:
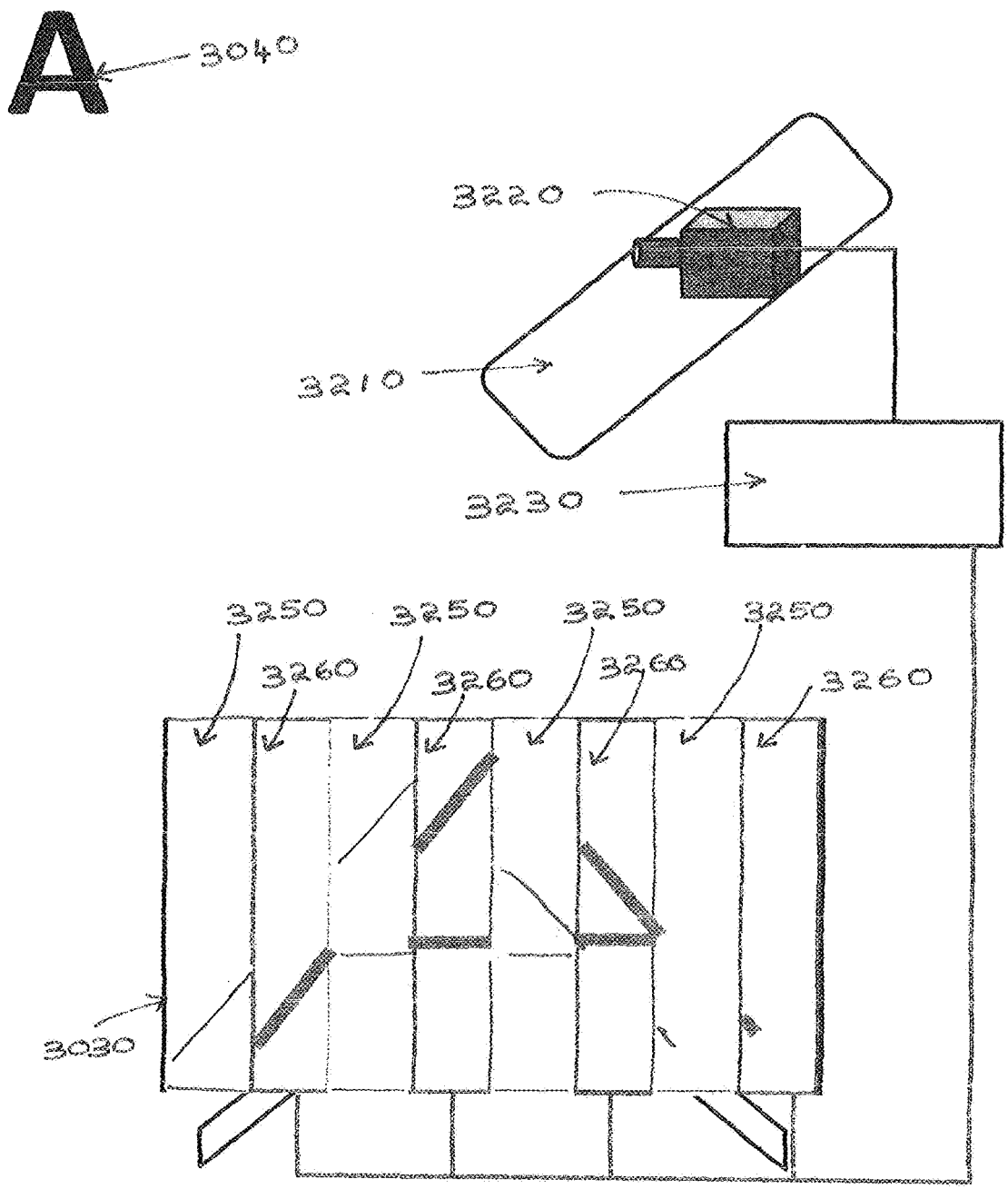

FIG. 32) illustrates another mode of displaying the two images captured with the two cameras of the 3D camera.

Figure 33:
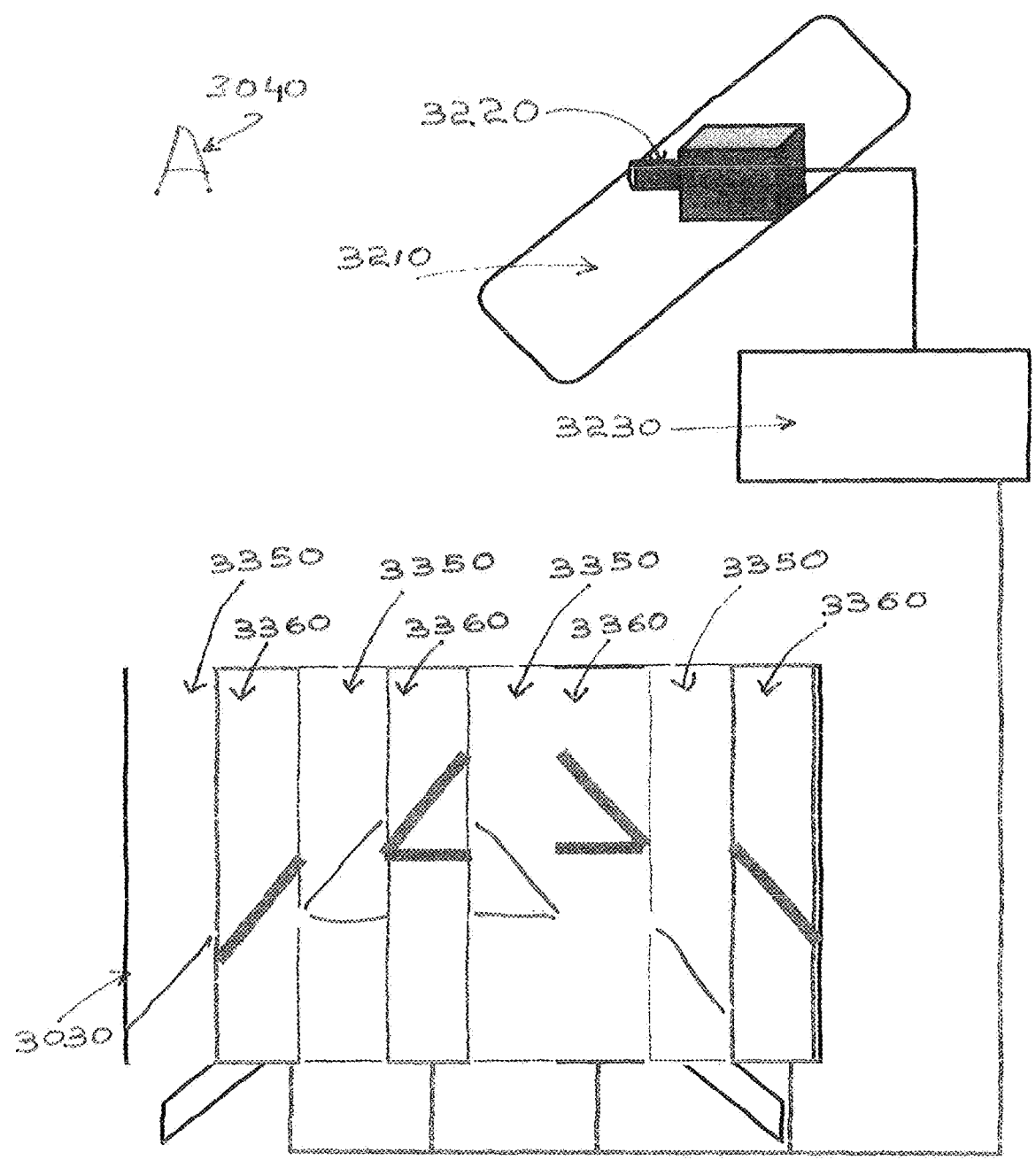

FIG. 33) illustrates another mode of displaying the two images captured with the two cameras of the 3D camera.

Figure 34:
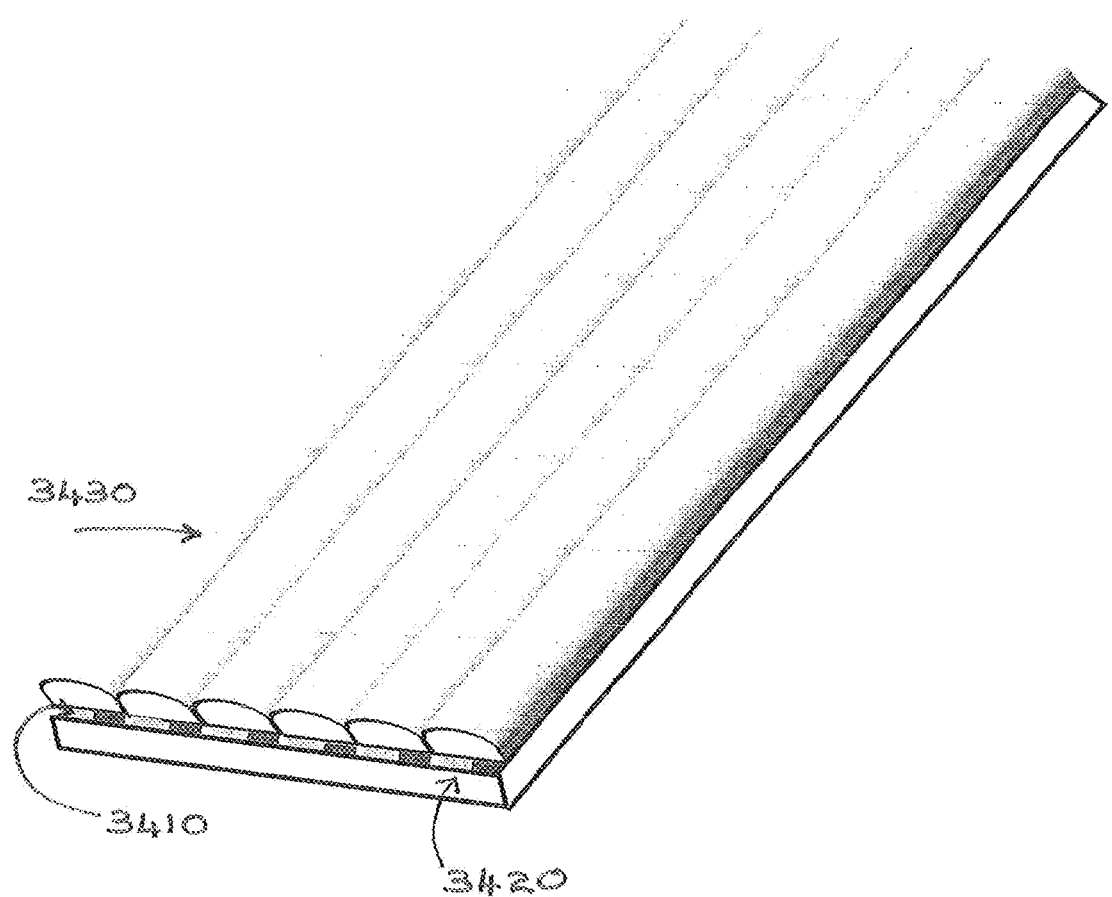

FIG. 34) illustrates some of the features of the 3D viewer sheet, when placed on the display (eg. Mobile device screen or TV screen).

Figure 35:
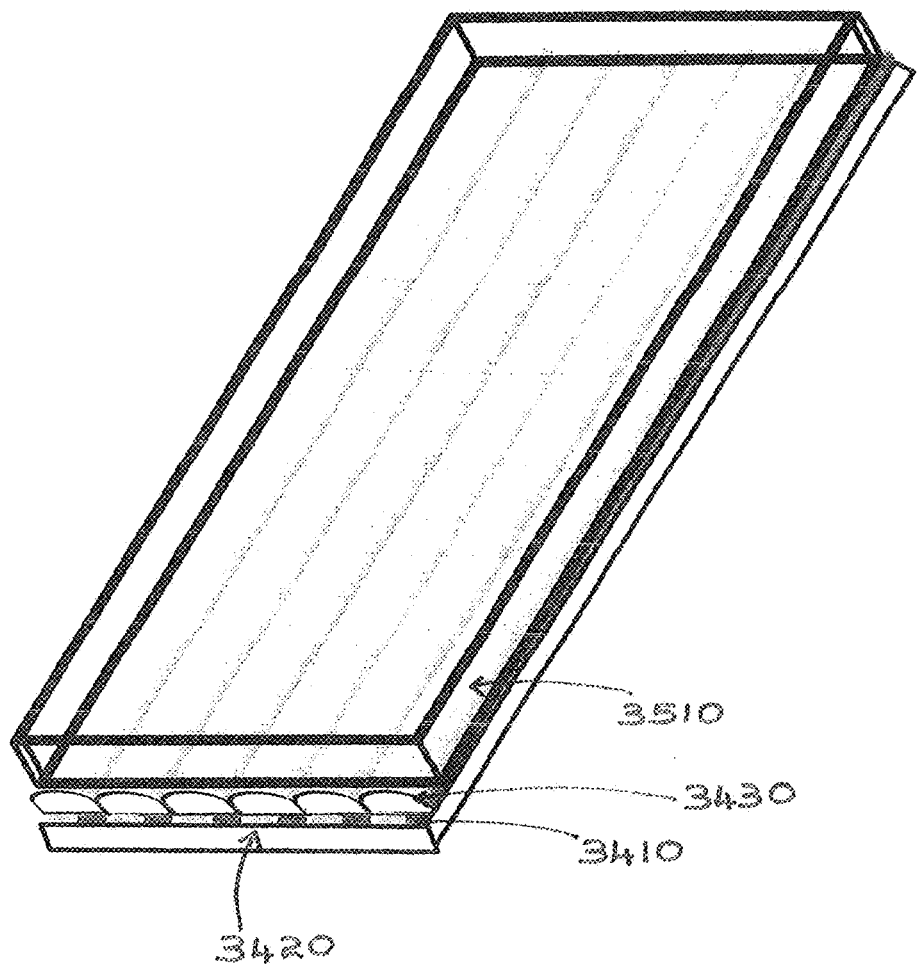

FIG. 35) illustrates some of the features of the 3D viewer sheet, when placed on the display (eg. Mobile device screen or TV screen).

Figure 36:
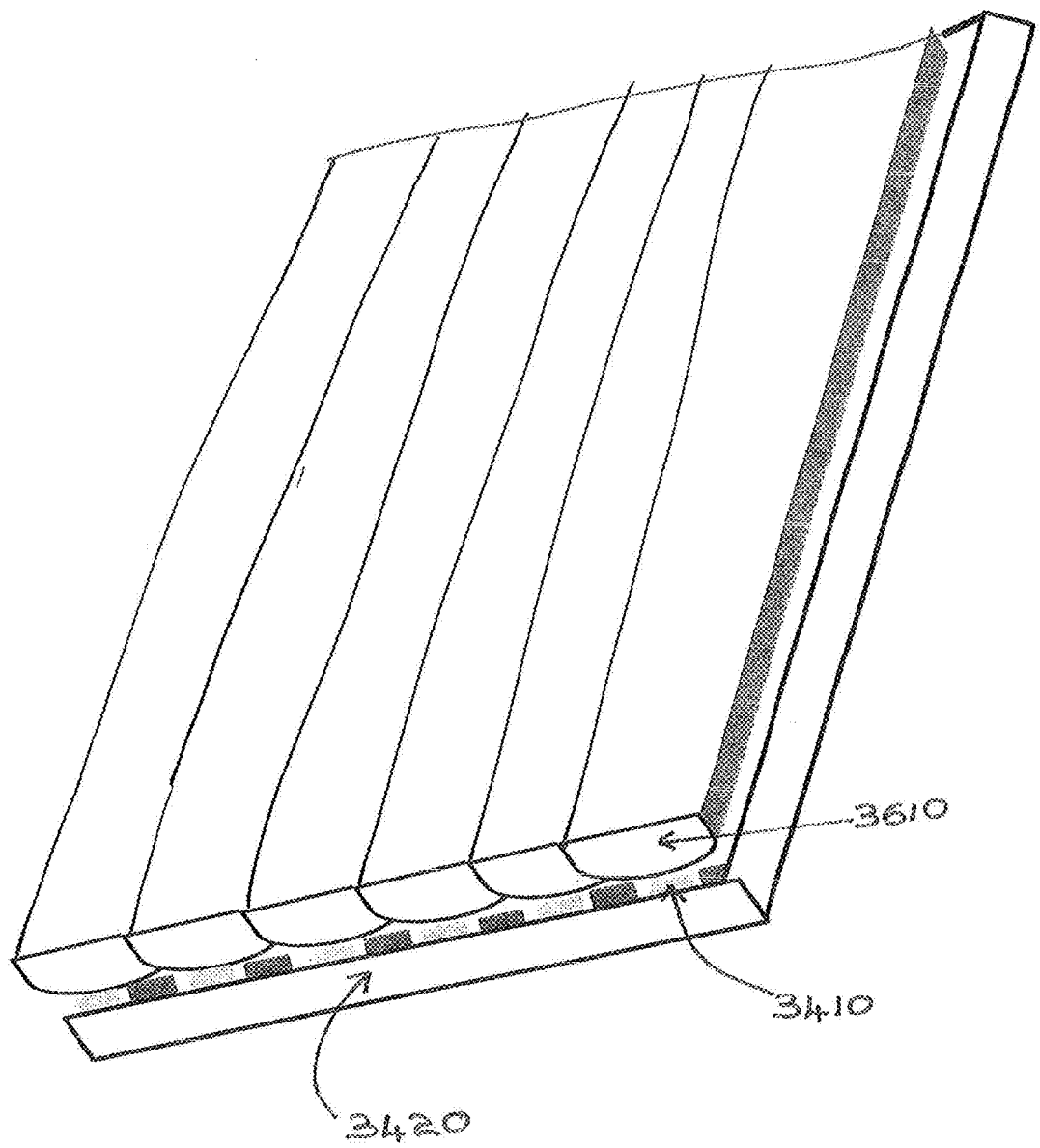

FIG. 36) illustrates some of the features of the 3D viewer sheet, when placed on the display (eg. Mobile device screen or TV screen).

Figure 37:
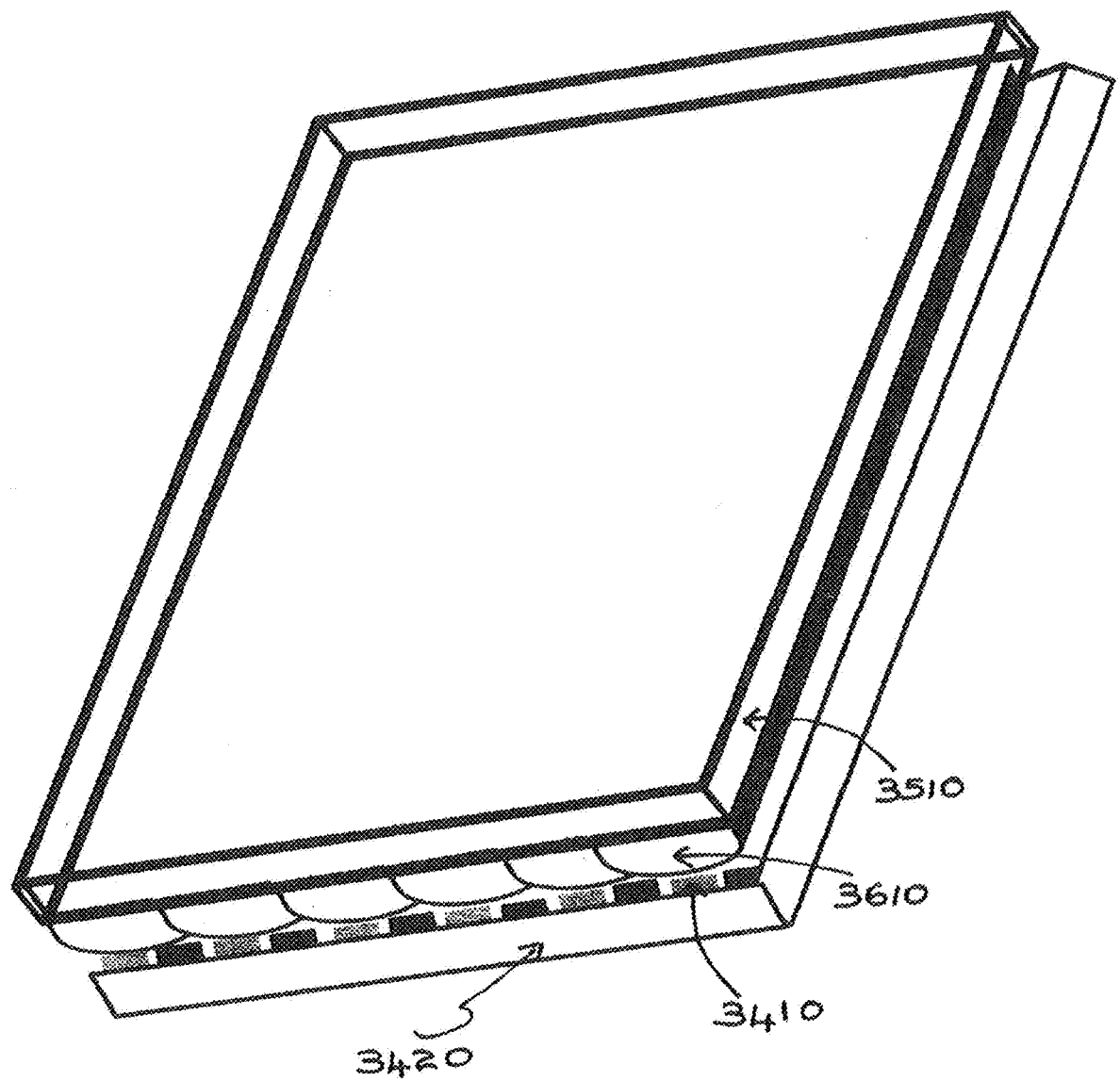

FIG. 37) illustrates some of the features of the 3D viewer sheet, when placed on the display (eg. Mobile device screen or TV screen).

Figure 38:
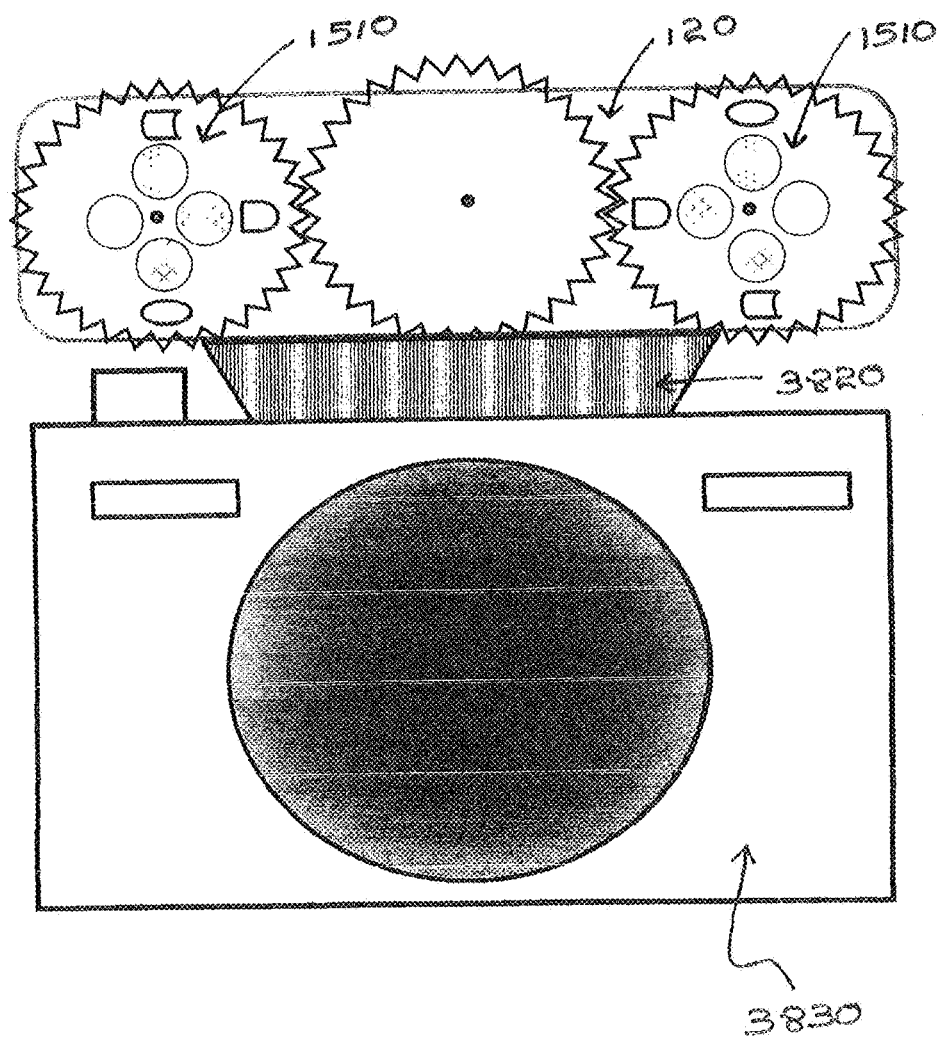

FIG. 38) illustrates the 3D camera being used with (or mounted on) a SLR or digital SLR camera.

Figure 39:
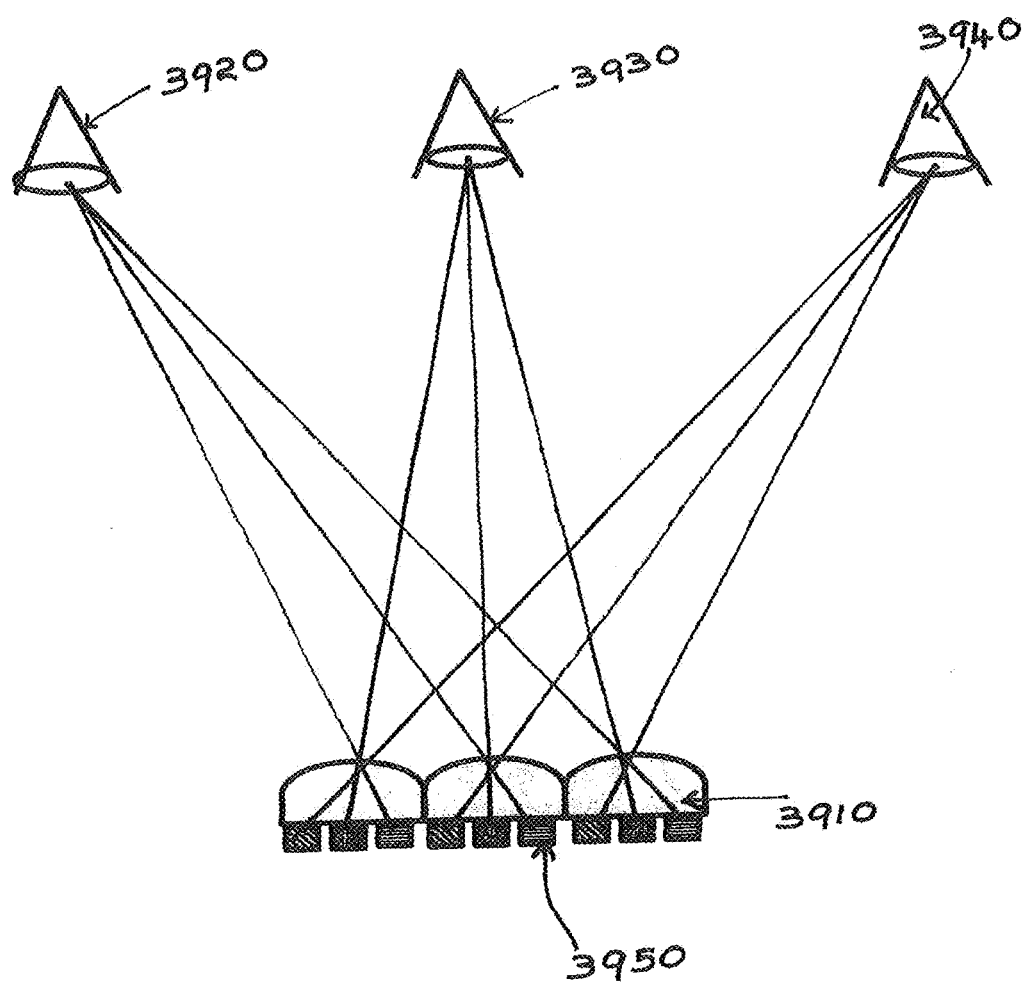

FIG. 39) illustrates the cross section of the 3D/multiple video & still frame viewer, integrated on the display of mobile device (e.g. Mobile device screen or TV screen).

Figure 40:
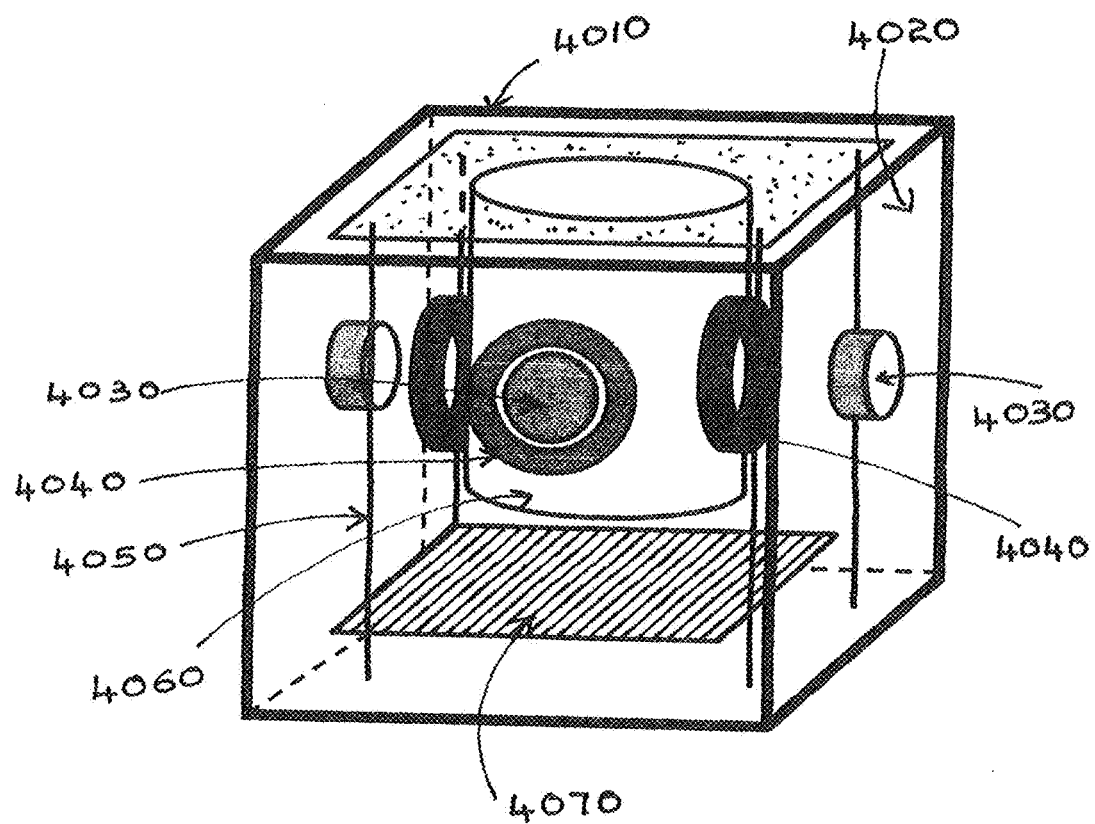

FIG. 40) illustrates the schematic of a unique "Optical Image Stabilizer". Illustrated in FIG. 1 to FIG. 40, are some of the features of the "Multi Purpose Mobile Device Case/Cover Integrated With A Camera System and 3D viewer sheet, for 3D and/or 2D High Quality Videography, Photography and Selfie Recording", but not limited to these illustrations.

Figure 41:
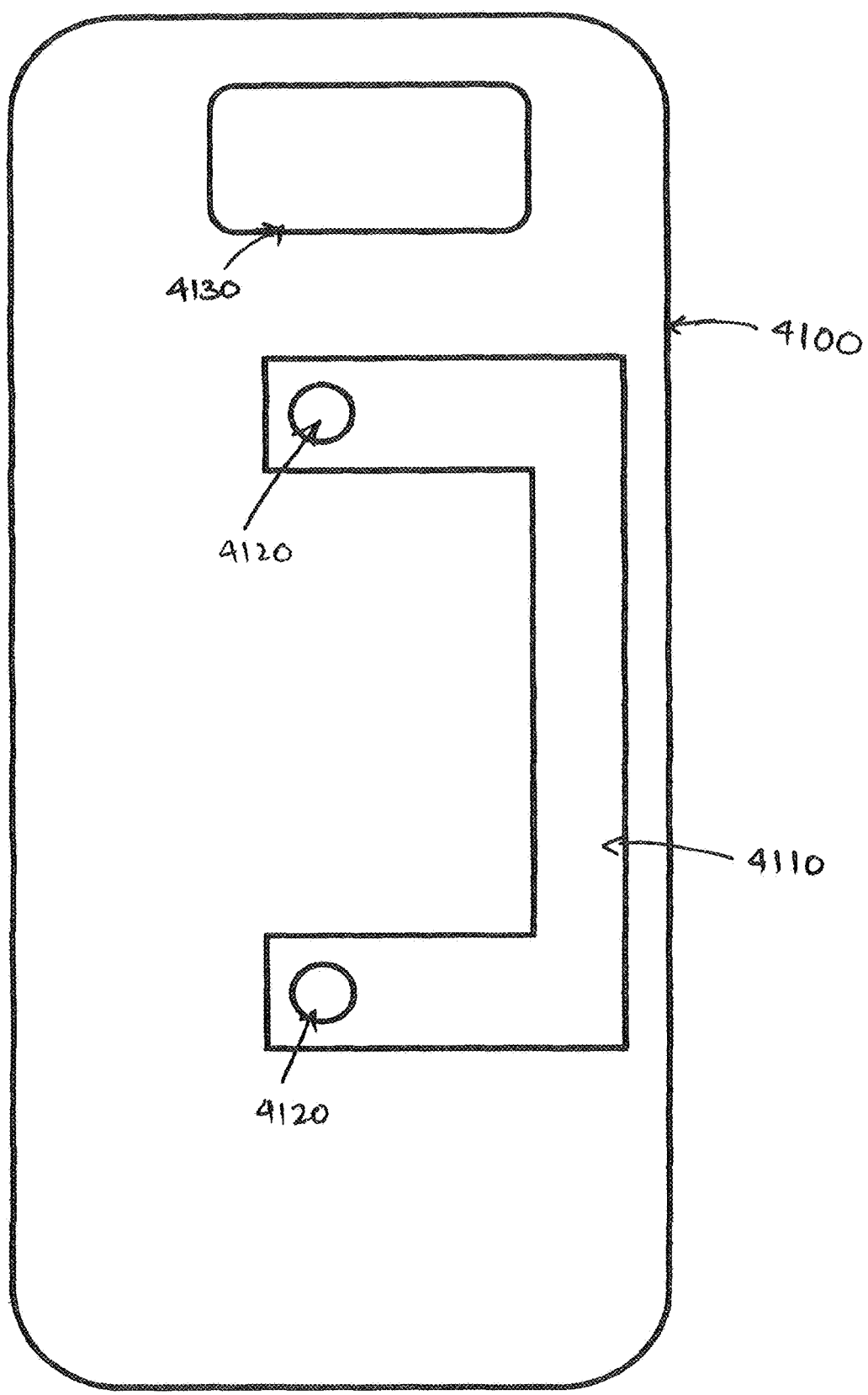

FIG. 41) illustrates the mobile device cover, having a 3D camera which can be rotated around a hinge.

Figure 42:
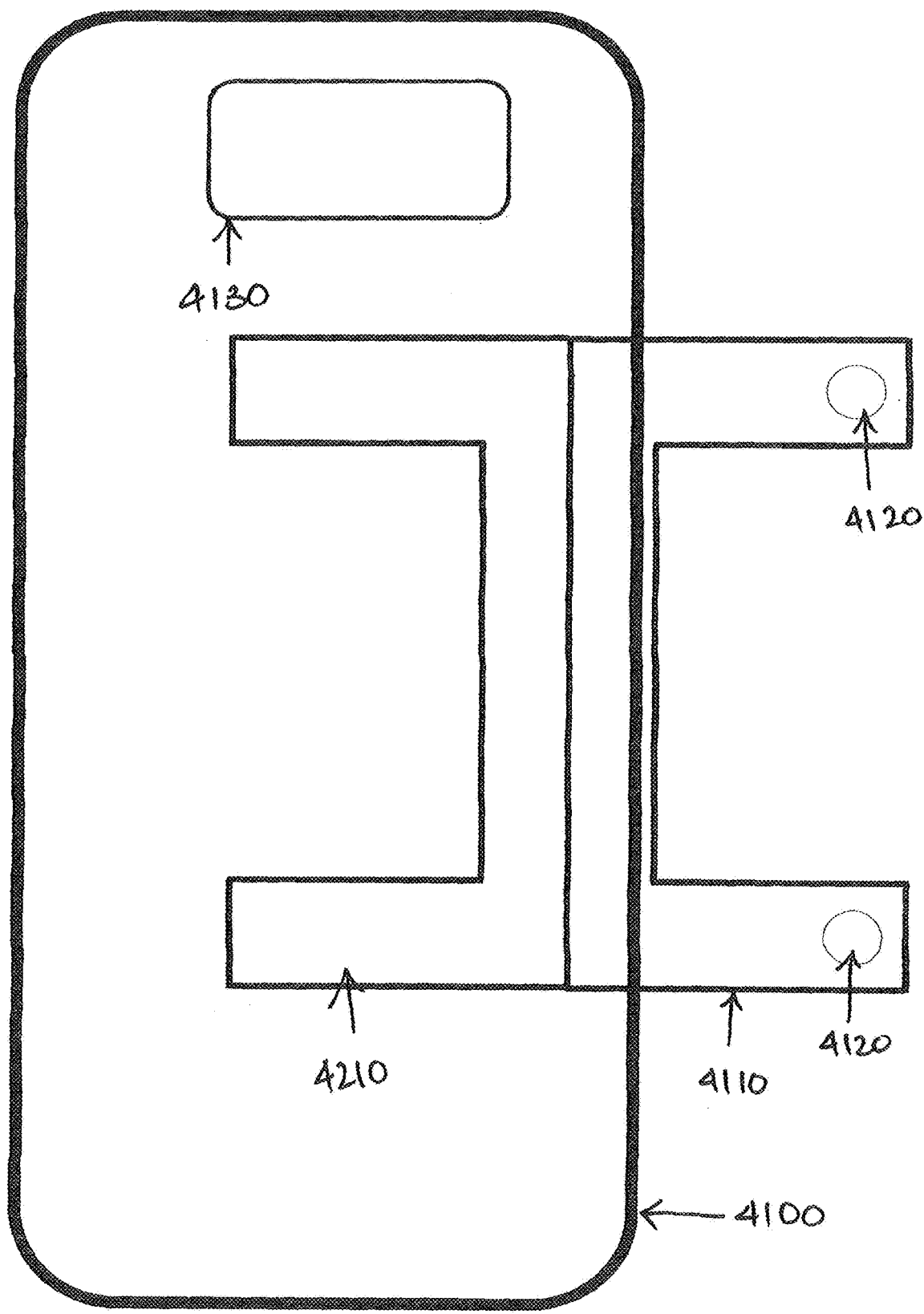

FIG. 42) illustrates the mobile device cover, the 3D camera is attached to an arm that is connected by hinges which allows the arm to be lifted off the cover and rotated upwards.

Figure 43:
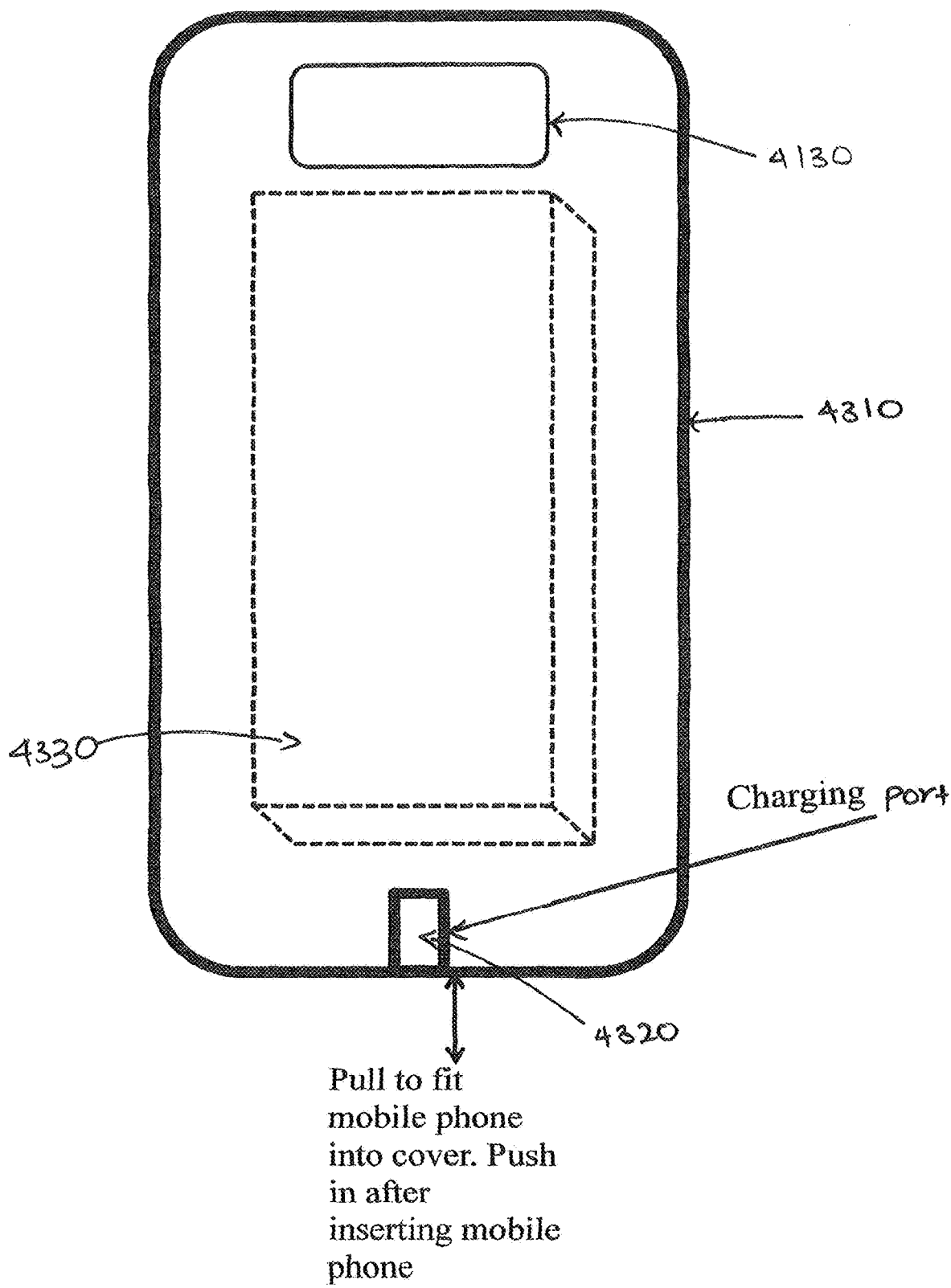

FIG. 43) illustrates the inner side of the cover. There is a charging connector which can be connected to the mobile device and a small box that is detachable and interchangeable and can hold either the camera or the battery, or any other compatible component or system or device.

Figure 44:
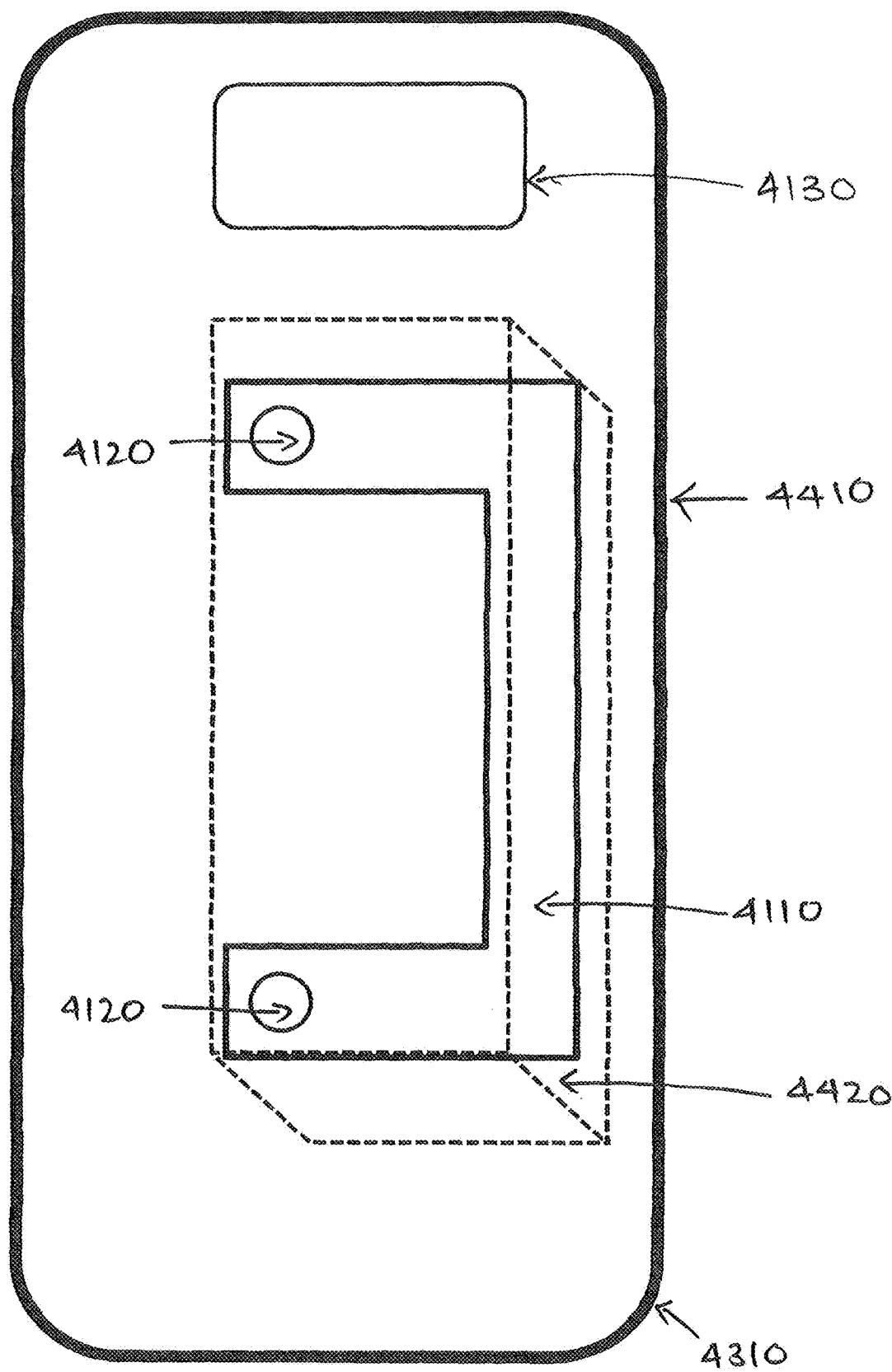

FIG. 44) illustrates the 3D camera inside the box, which can be detached from the mobile device cover.

Figure 45:
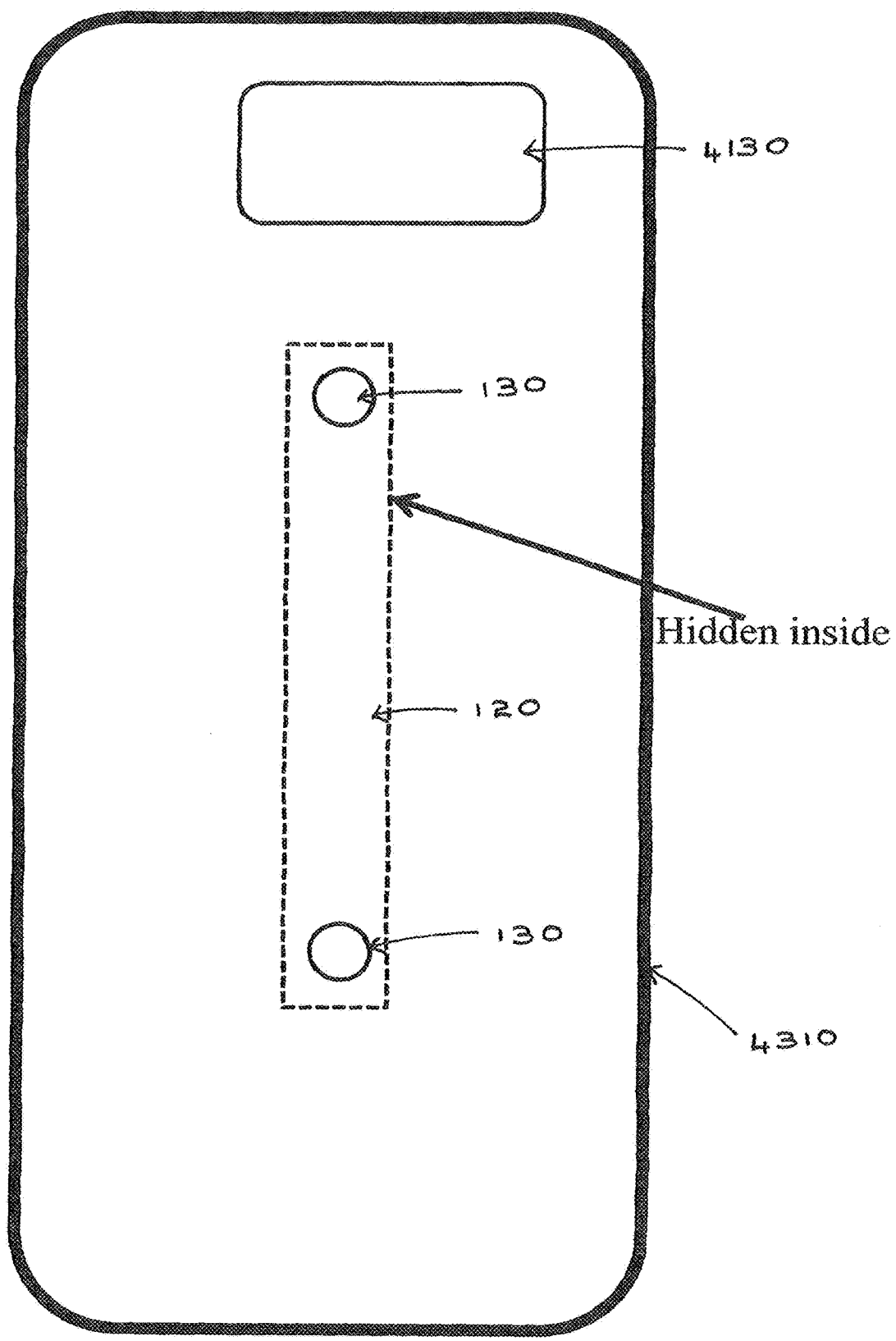

FIG. 45) illustrates 3D camera which are placed inside the cover.

Figure 46:
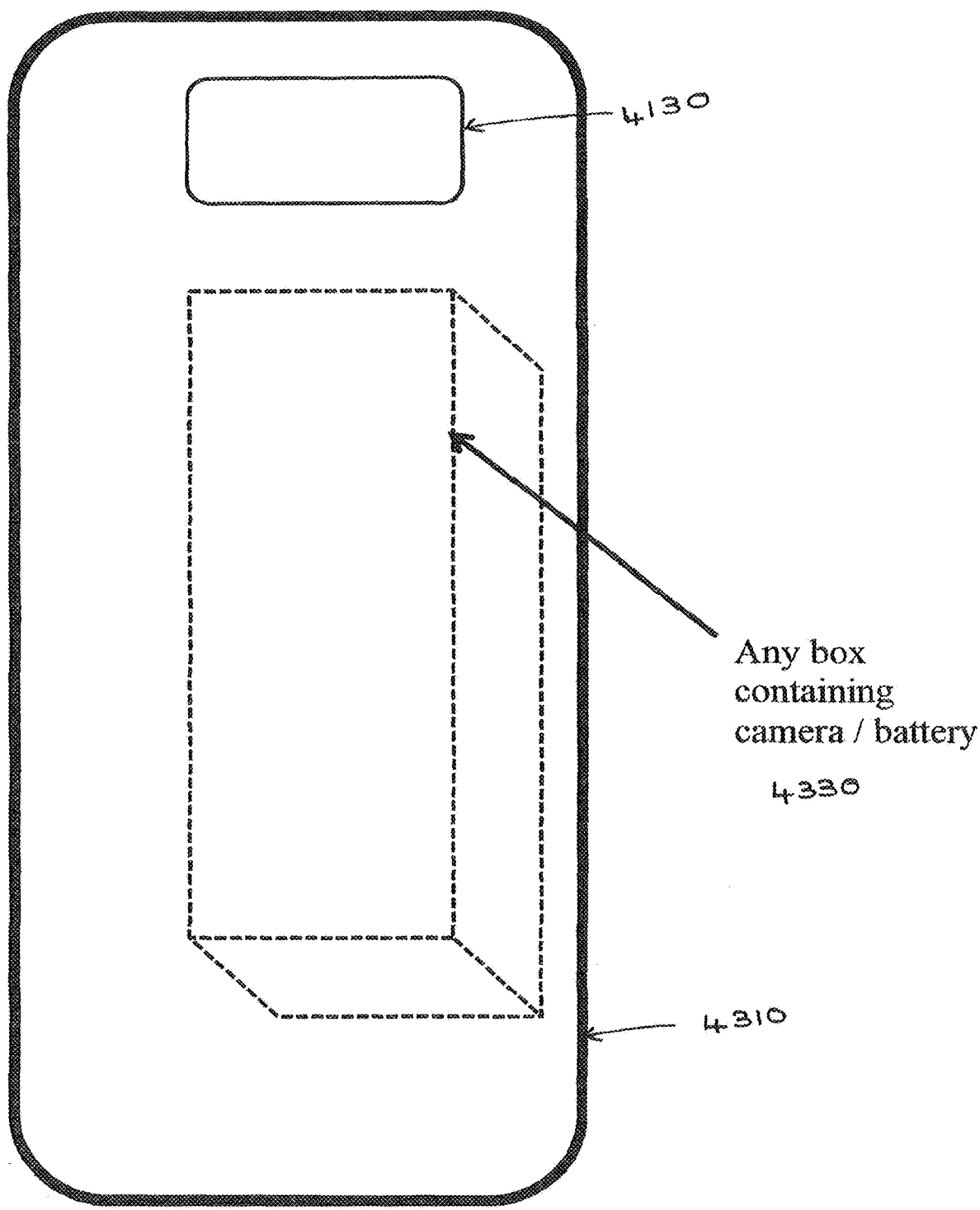

FIG. 46) illustrates the cover with the box embedded containing a 2D or 3D camera, battery charger or a health monitor or other suitable device.

Figure 47:
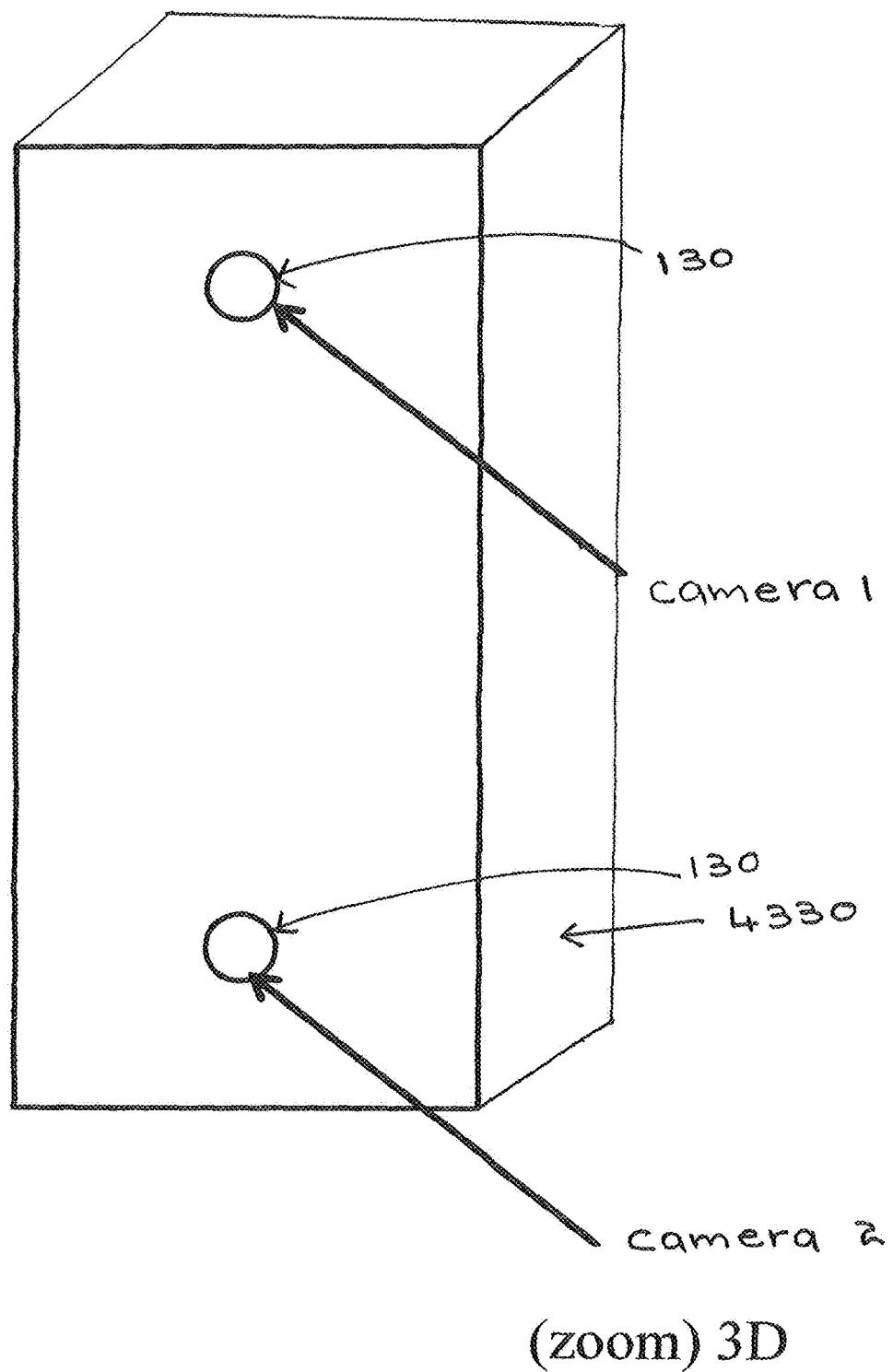

FIG. 47) illustrates 2 cameras as one detachable unit. One of which is to zoom and view 3D and the other to view in high quality 2D.

Figure 48:
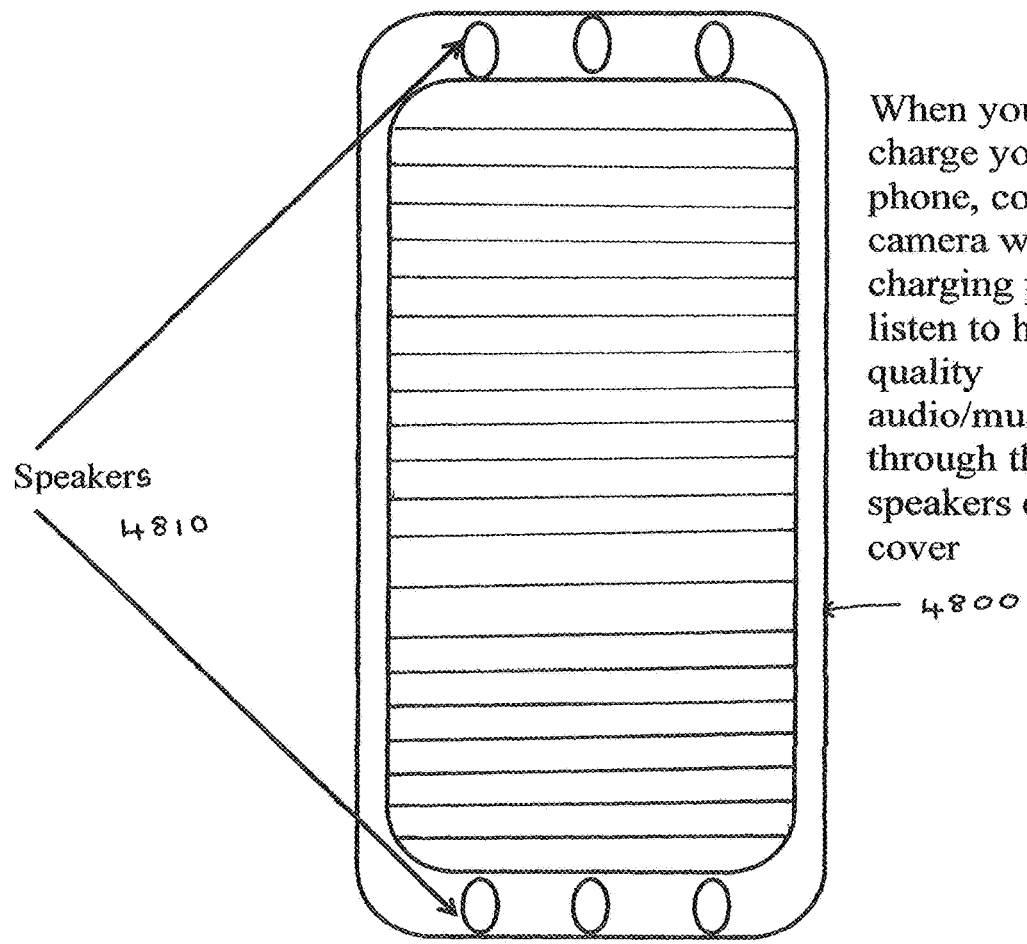

FIG. 48) illustrates a mobile device with a detachable lenticular sheet attached onto the display, inserted into the mobile device cover with the camera on the back and audio speakers embedded on the front of the case.

Figure 49:
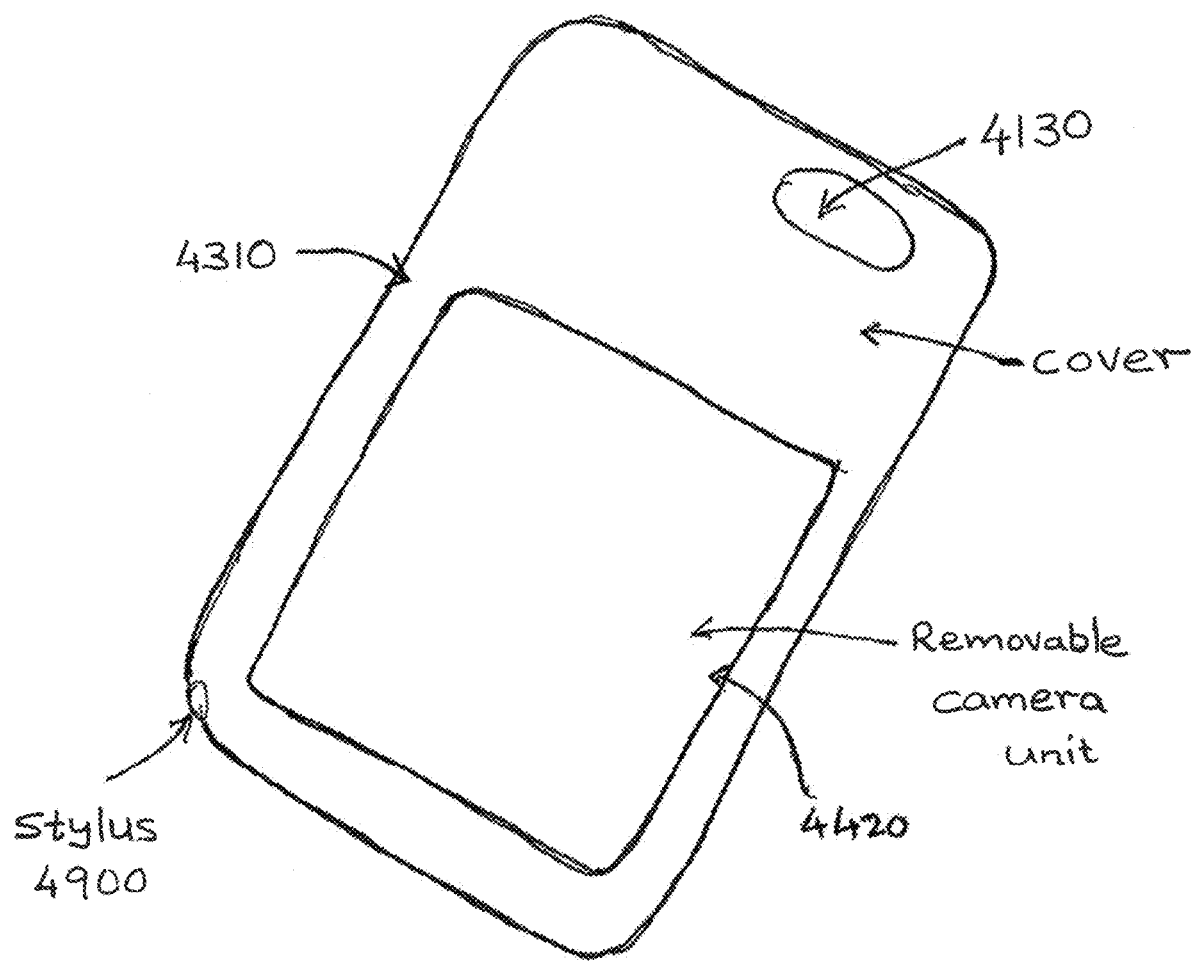

FIG. 49) illustrates a removable camera unit integrated on a mobile device case or a camera housing. The camera housing can contain a 3D/2D display screen for viewing the video, photos captured by the detachable camera unit, which is connected to the camera housing by means of wireless communication, such as wife or hifi or optical communication.

Figure 50:
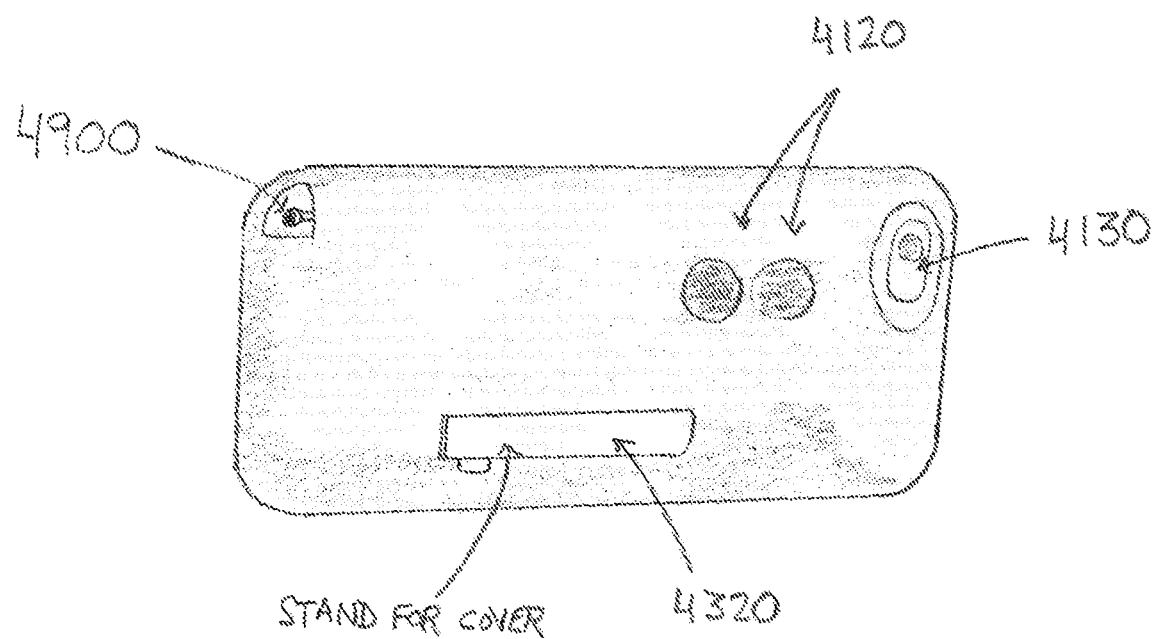

FIG. 50) illustrates the back view of the mobile device case with a stand for the cover.

Figure 51:
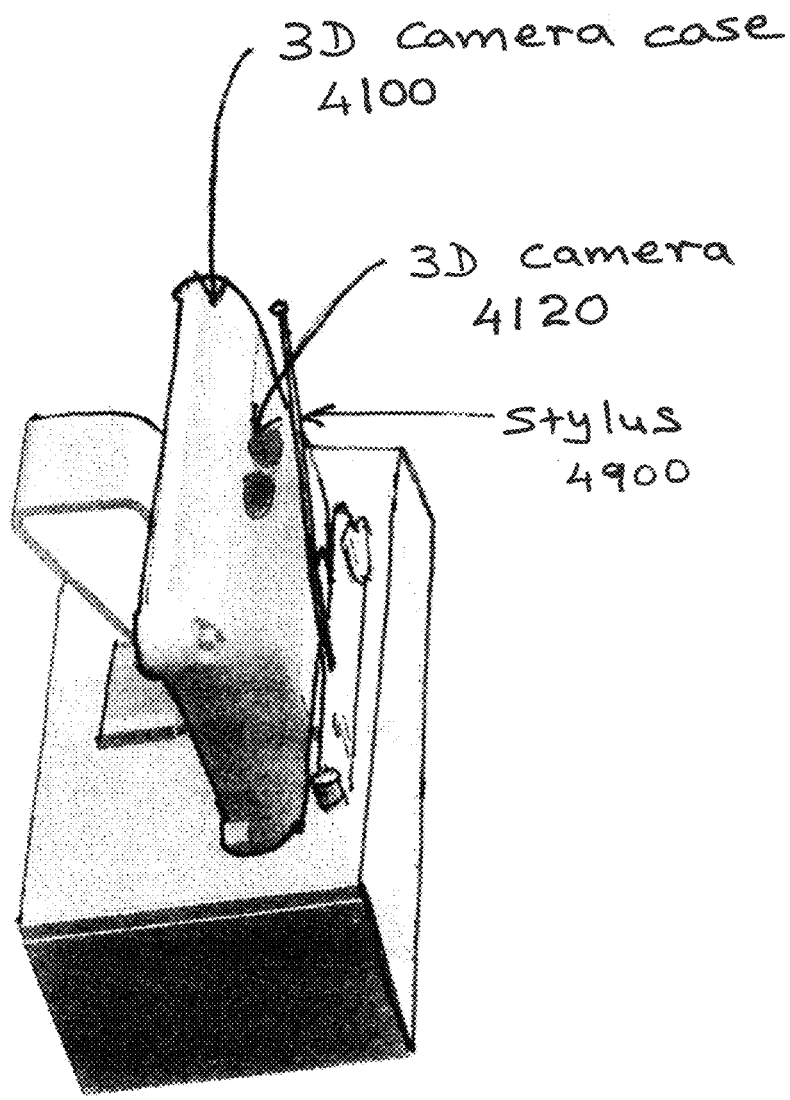

FIG. 51) illustrates the packaging of the mobile device case and the stylus.

Figure 52:
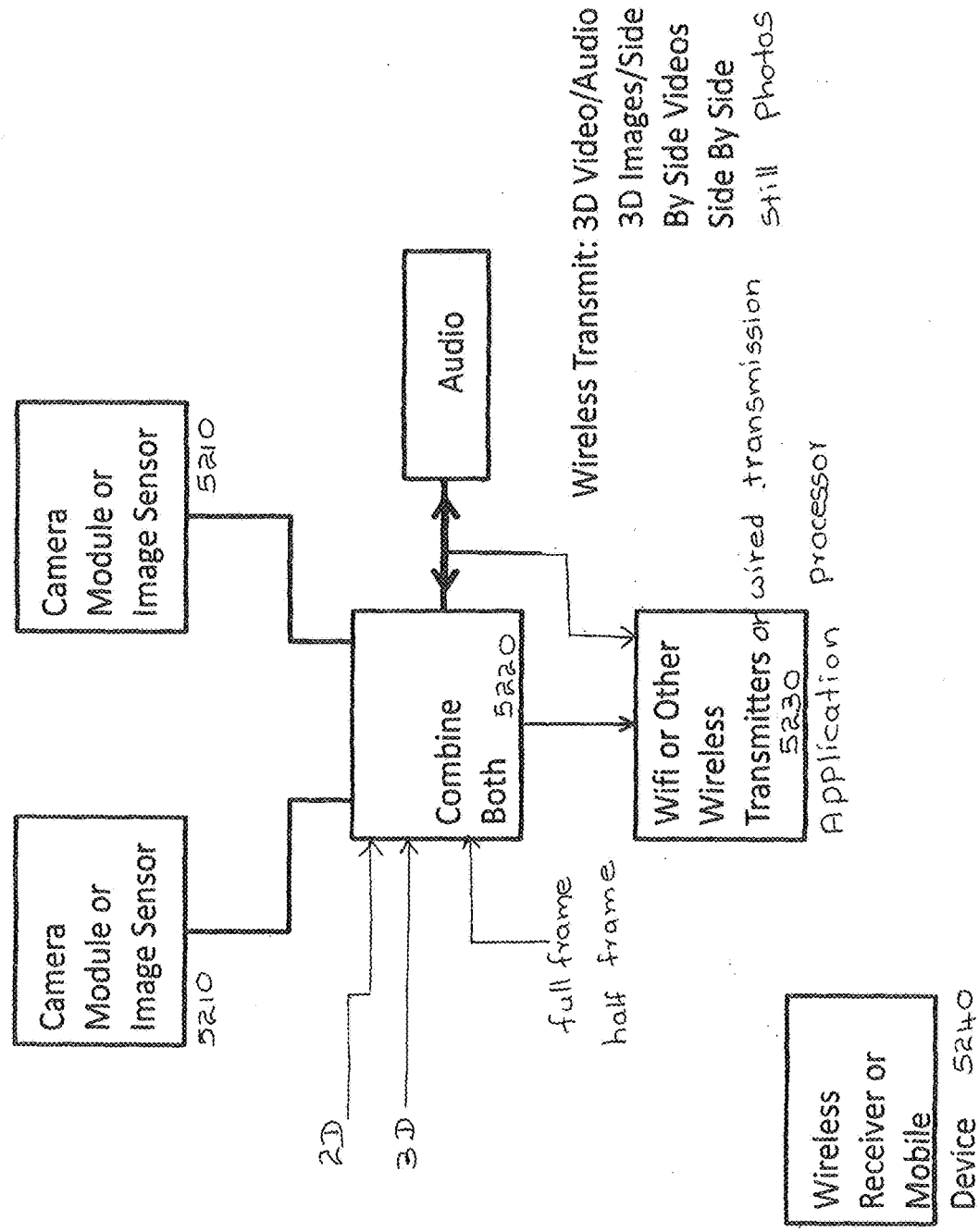

FIG. 52) illustrates the electronic schematic of the 3D camera unit.

Figure 53:
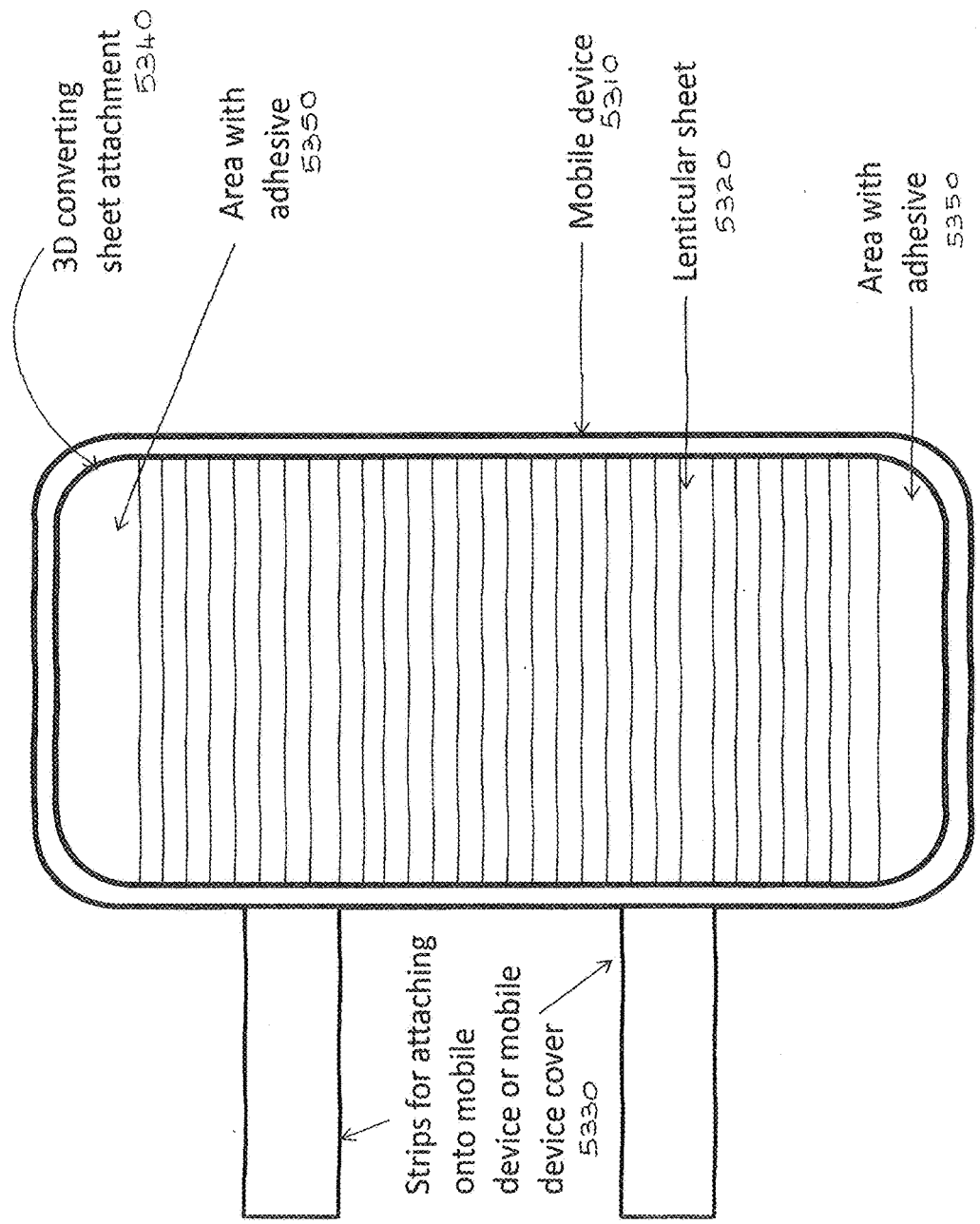

FIG. 53) illustrates one method of attaching the lenticular sheet onto the mobile device, for easy attachment and removal.

Figure 54:
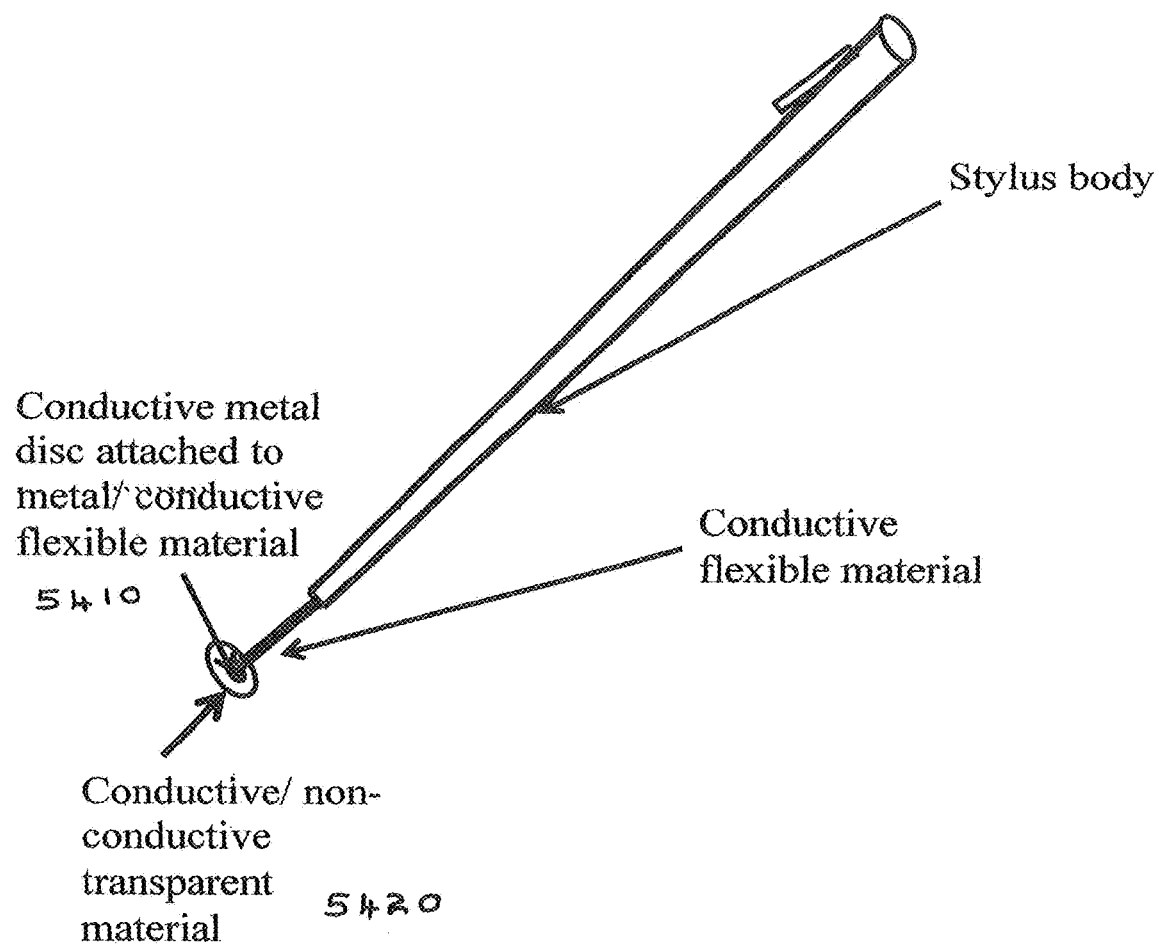

FIG. 54) illustrates a stylus which has a transparent conductive disc attach to the tip of the stylus body.

Figure 55:
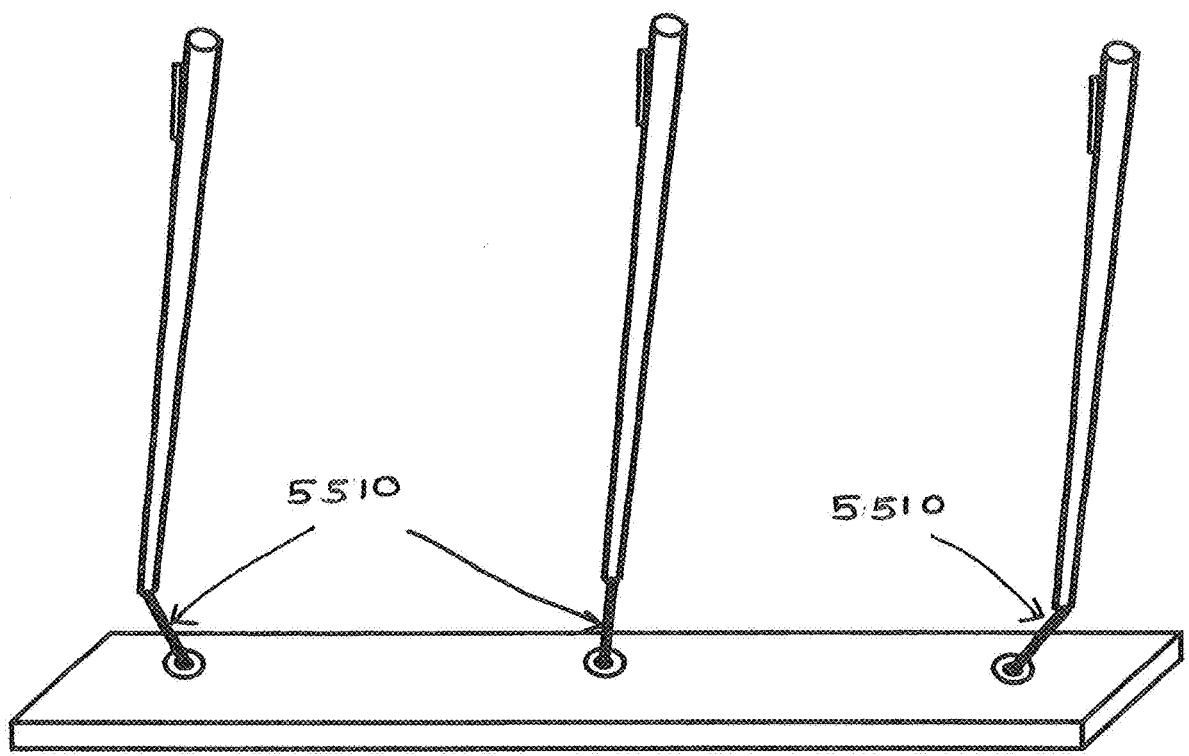

FIG. 55) illustrates three different positions of the stylus which can be rotated or swivelled.

Figure 56:
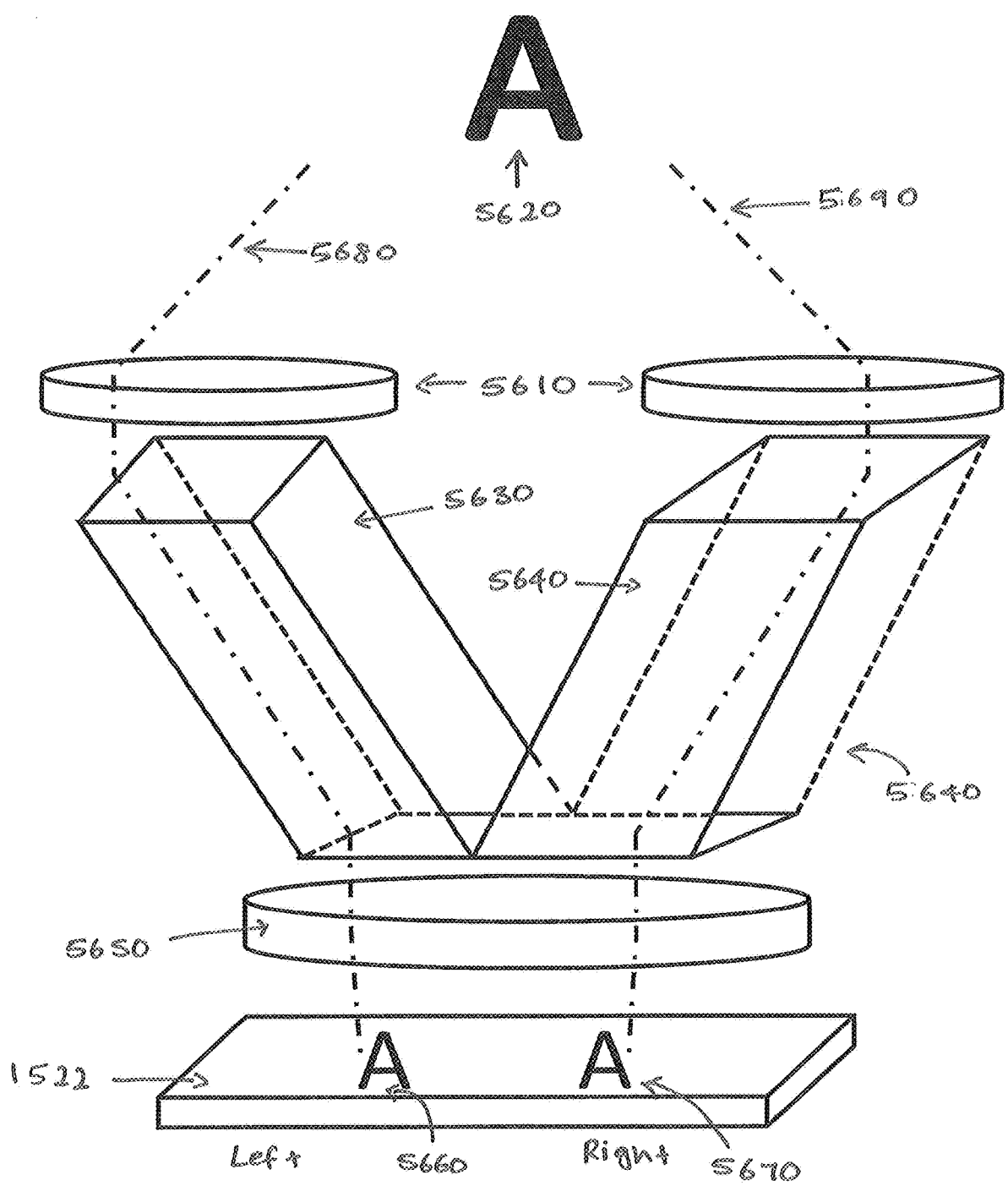

FIG. 56) illustrates a V-shaped optical component used for making a 3D camera capable of capturing side-by-side image/video using a single image sensor.

Figure 57:
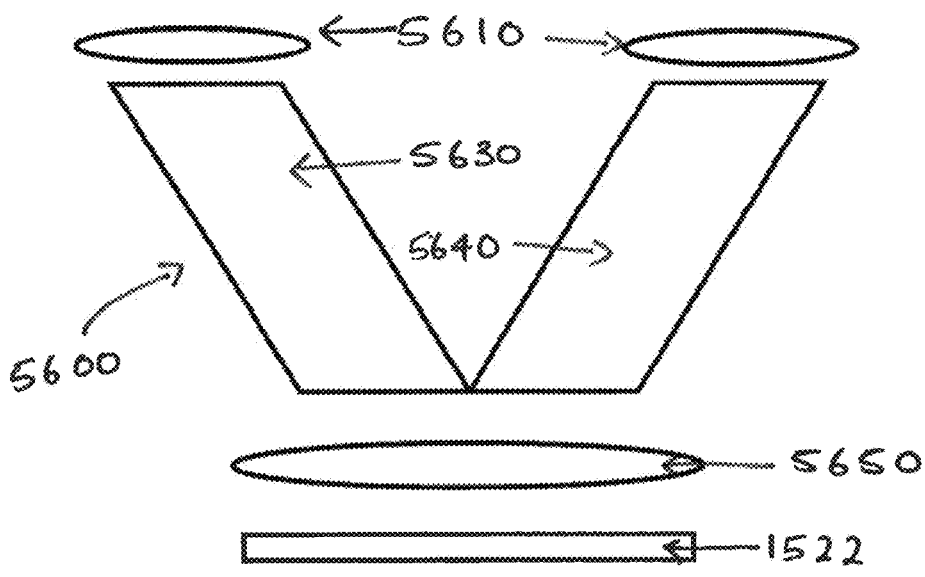

FIG. 57) illustrates a cross-section of a V-shaped optical component used for making a 3D camera capable of capturing side-by-side image/video using a single image sensor with two objective lenses and one focusing lens.

Figure 58:
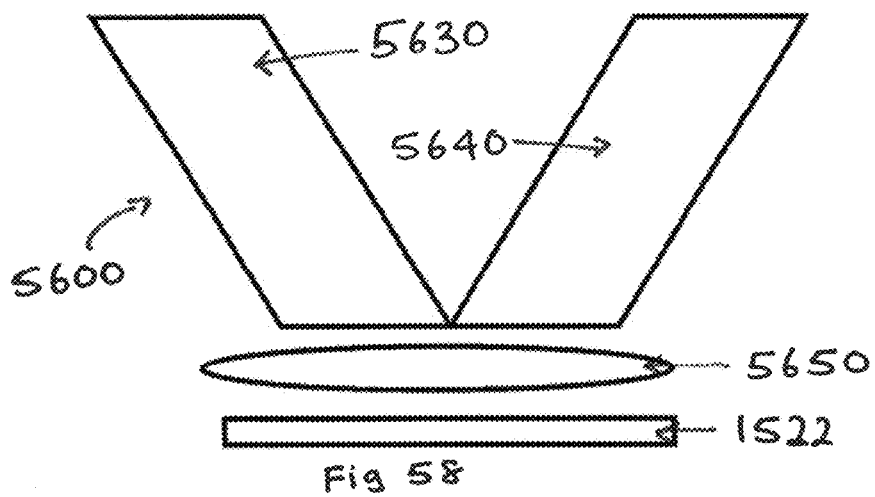

FIG. 58) illustrates a cross-section of a V-shaped optical component used for making a 3D camera capable of capturing side-by-side image/video using a single image sensor with one lens for focusing the image onto the image sensor.

Figure 59:
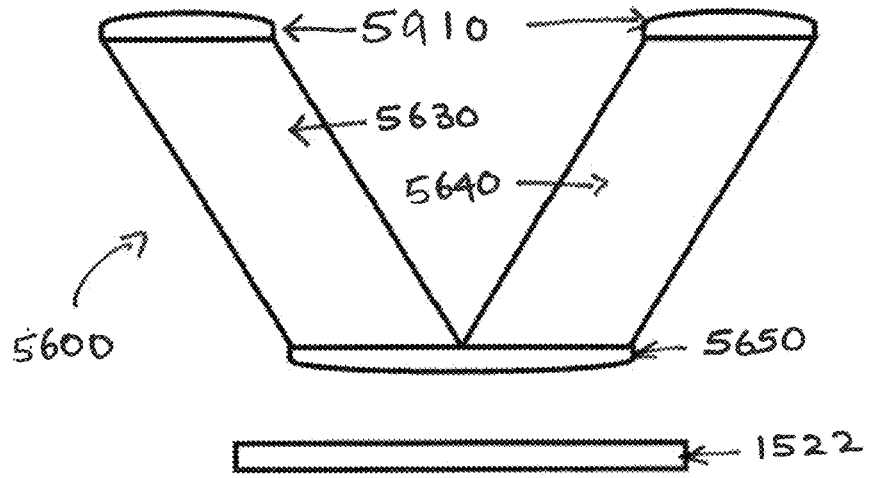

FIG. 59) illustrates a cross-section of a V-shaped optical component used for making a 3D camera capable of capturing side-by-side image/video using a single image sensor with two attached objective lenses and one attached focusing lens.

Figure 60:
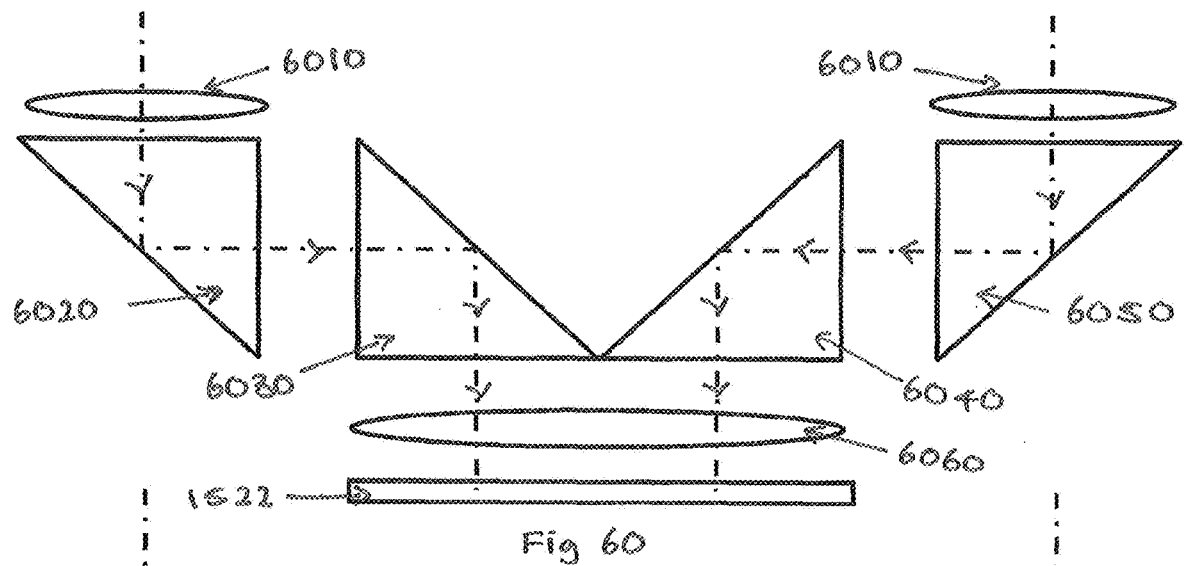

FIG. 60) illustrates a cross-section of an optical component used for making a 3D camera capable of capturing side-by-side image/video using a single image sensor, utilising four prisms with two objective lenses and one focusing lens.

Figure 61:
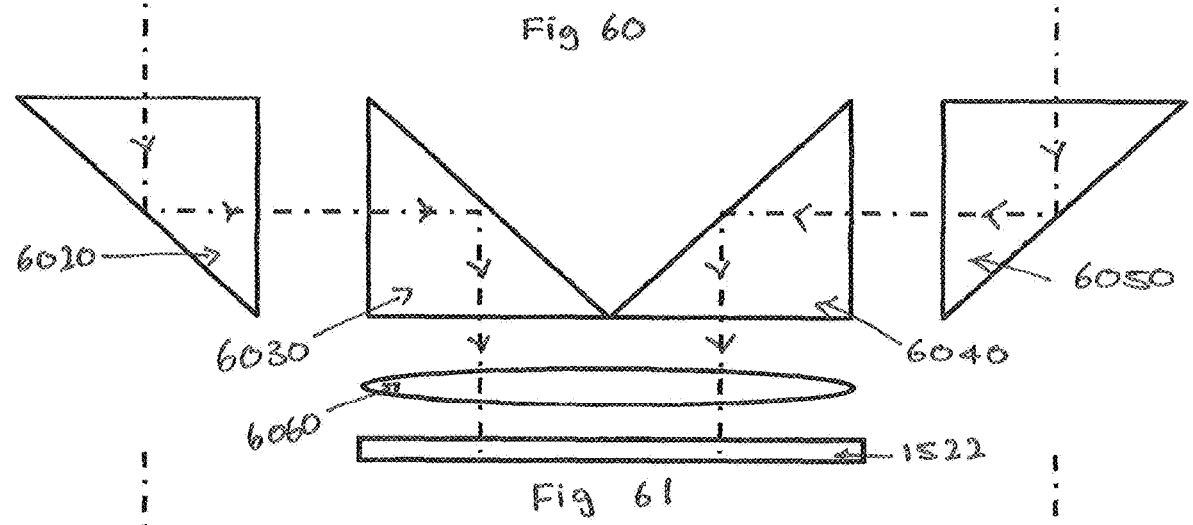

FIG. 61) illustrates a cross-section of an optical component used for making a 3D camera capable of capturing side-by-side image/video using a single image sensor, utilising four prisms with one lens focusing the image onto the image sensor.

Figure 62:
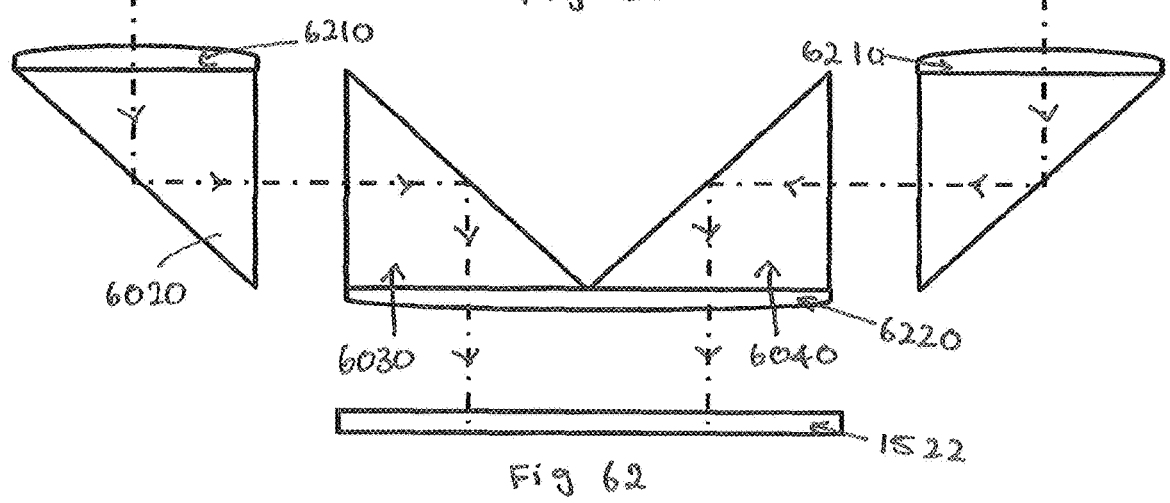

FIG. 62) illustrates a cross-section of an optical component used for making a 3D camera capable of capturing side-by-side image/video using a single image sensor, utilising four prisms with two attached objective lenses and one attached focusing lens.

Figure 63:
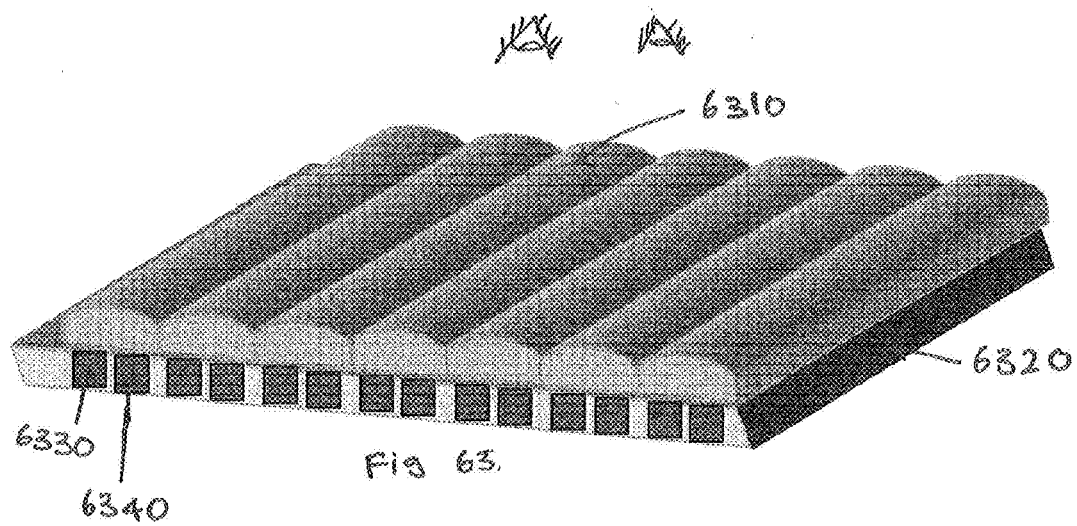

FIG. 63) illustrates an image display screen or TV screen attached to a 3D viewer on the flat side.

Figure 64:
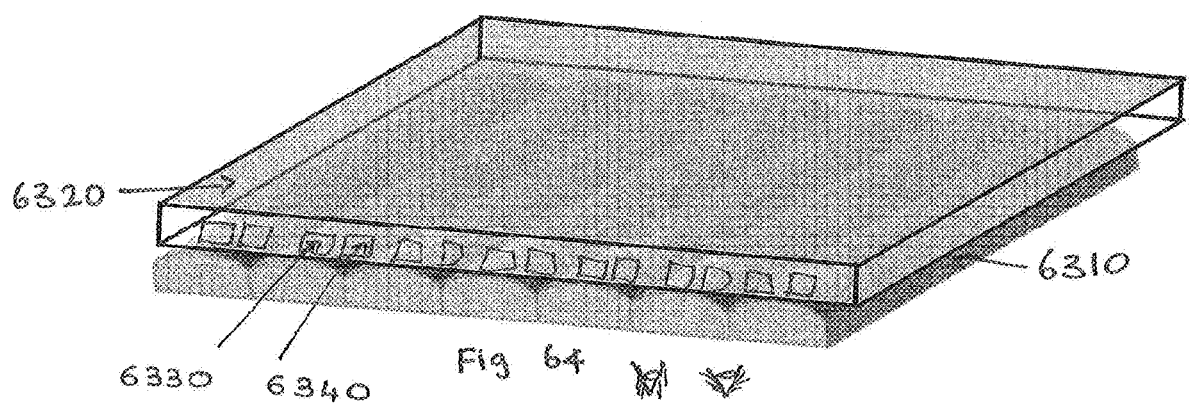

FIG. 64) illustrates an image display screen or TV screen attached to a 3D viewer on the corrugated side.

Figure 65:
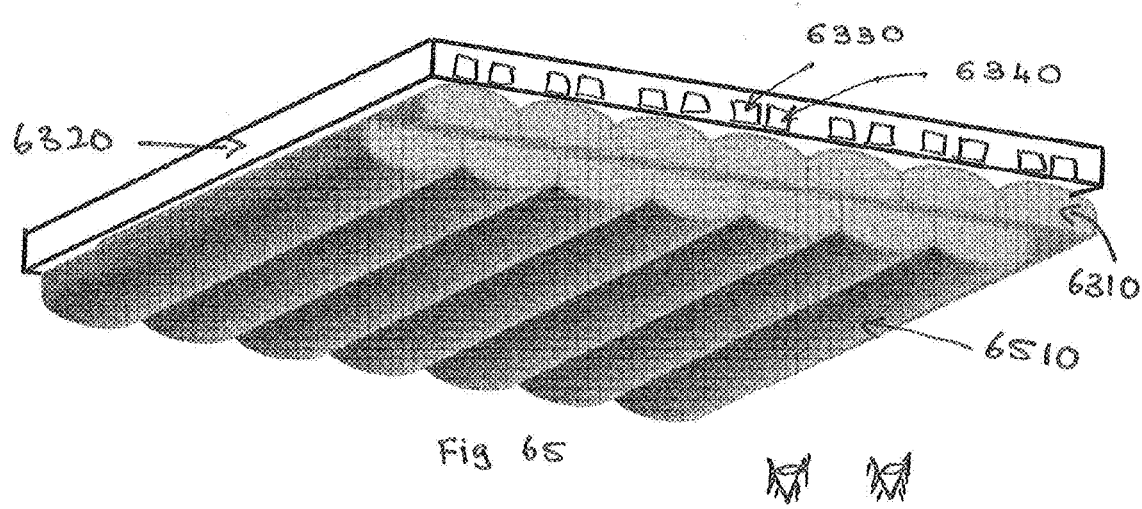

FIG. 65) illustrates two 3D viewers attached together on the flat surface parallel to each other and an image display screen or TV screen attached on the top corrugated surface.

Figure 66:
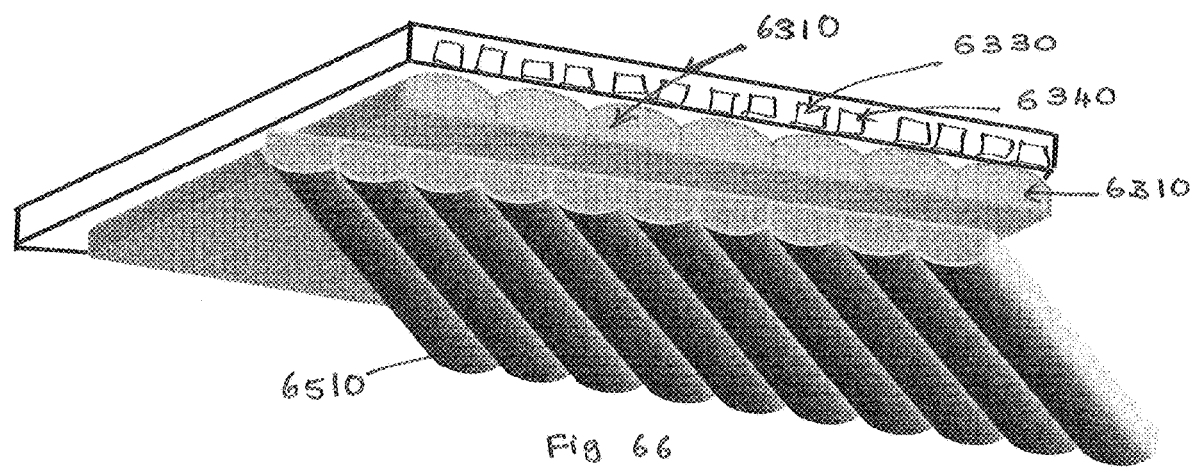

FIG. 66) illustrates two 3D viewers attached together on the flat surface at an angle and an image display screen or TV screen attached on the top corrugated surface.

Figure 67:
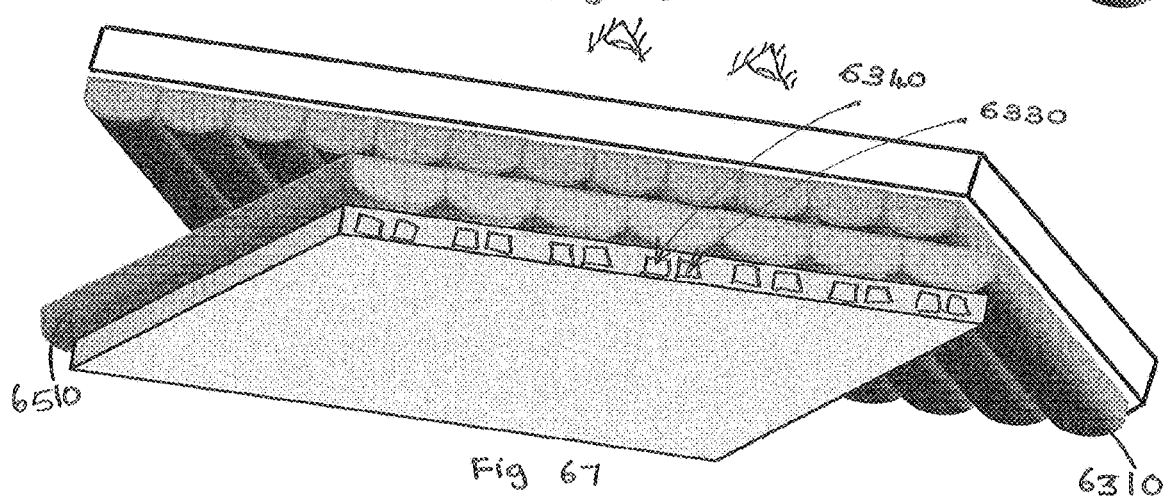

FIG. 67) illustrates two 3D viewers attached together with the corrugated surface of one attached to the flat surface of the other and an image display screen or TV screen attached on the bottom corrugated surface. An anti-scratch hard coating is put on the uppermost flat surface of the filter.

Figure 68:
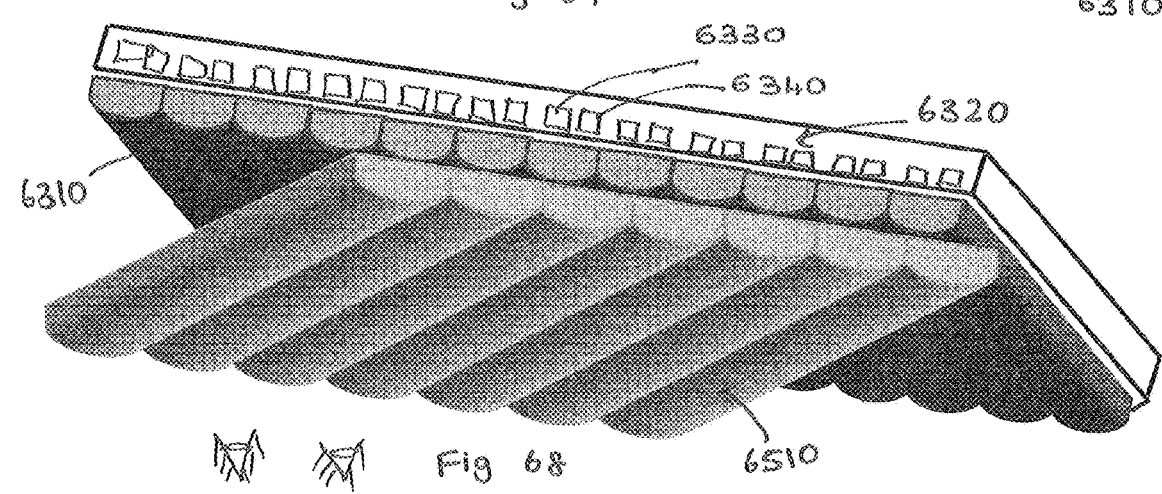

FIG. 68) illustrates two 3D viewers attached together with the corrugated surface of one attached to the flat surface of the other and an image display screen or TV screen attached on the top flat surface.

Figure 69:
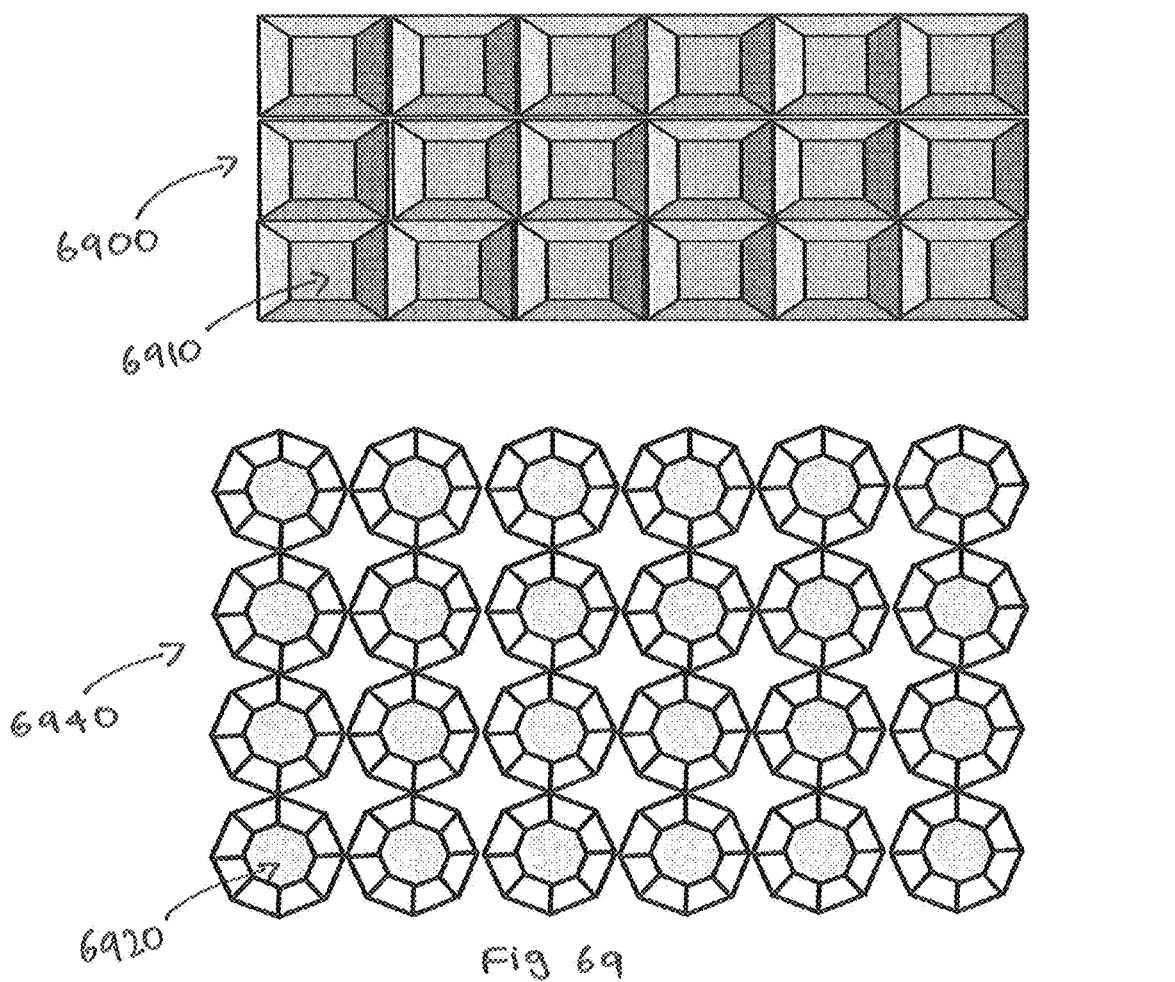

FIG. 69) illustrates two types of multidirectional 3D viewers.

Figure 70:
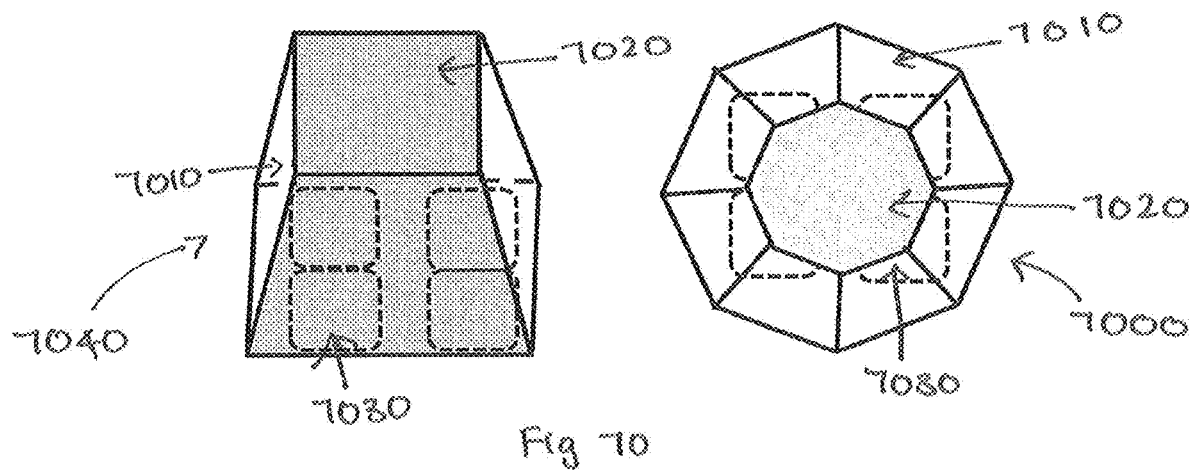

FIG. 70) illustrates two types of optical elements used in the multidirectional 3D viewers.

Figure 71:
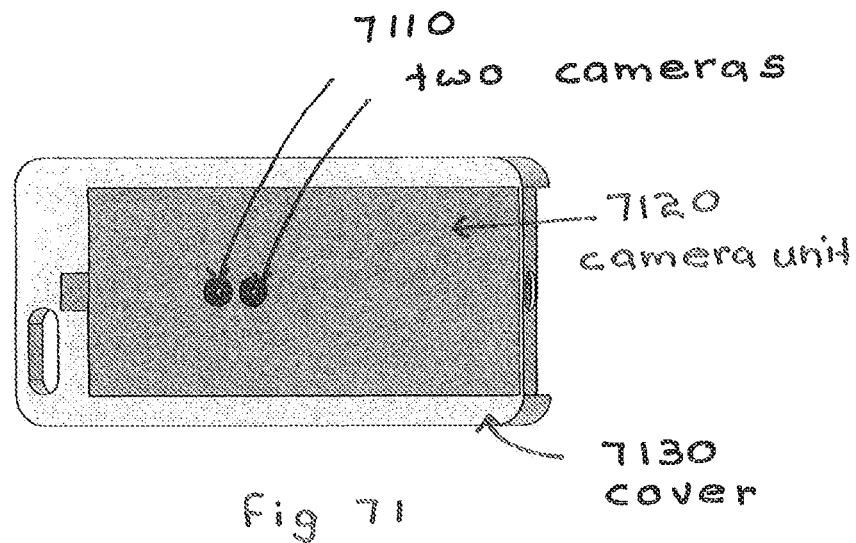

FIG. 71) illustrates the back view of a mobile device cover with an attached 3D camera unit.

Figure 72:
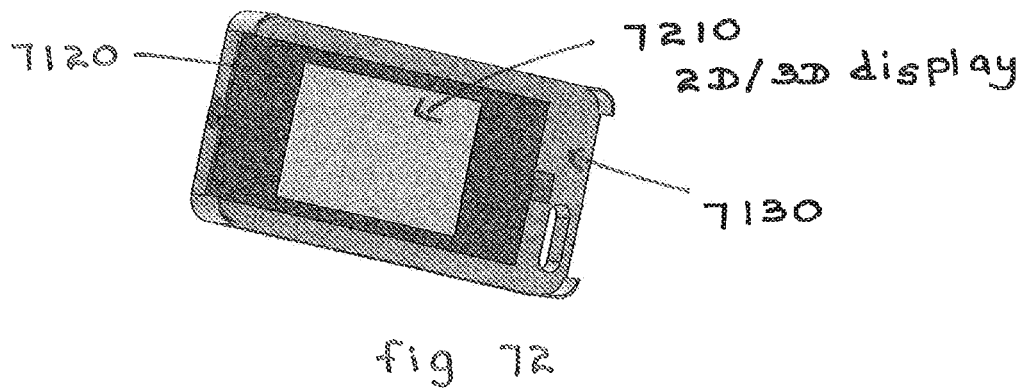

FIG. 72) illustrates the back view of a mobile device cover with an attached 3D camera having an attached 2D or 3D display.

Figure 73:
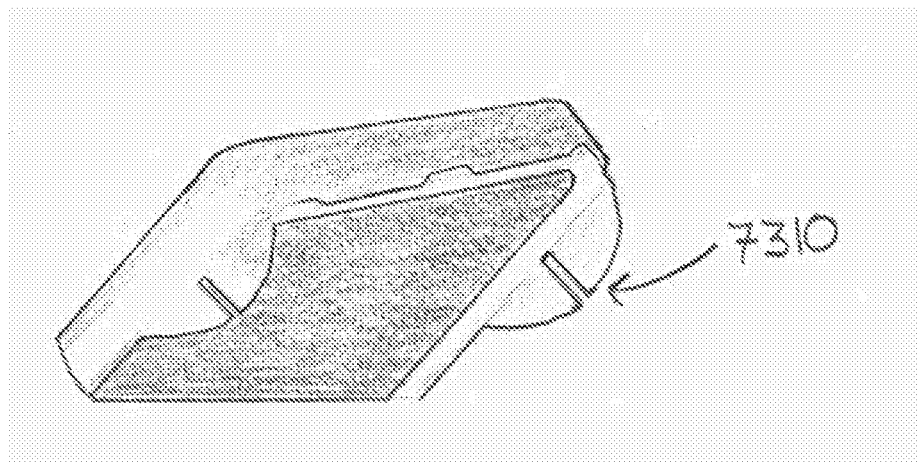

FIG. 73) illustrates a mobile device cover attaching clip.

Figure 74:
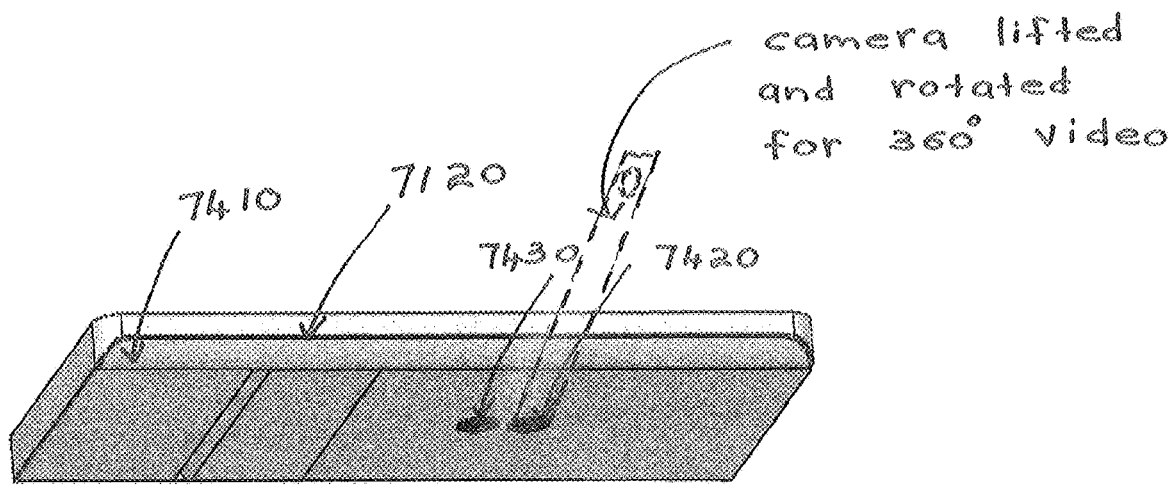

FIG. 74) illustrates another view of the mobile device cover having the detachable 3D camera unit.

Figure 75:
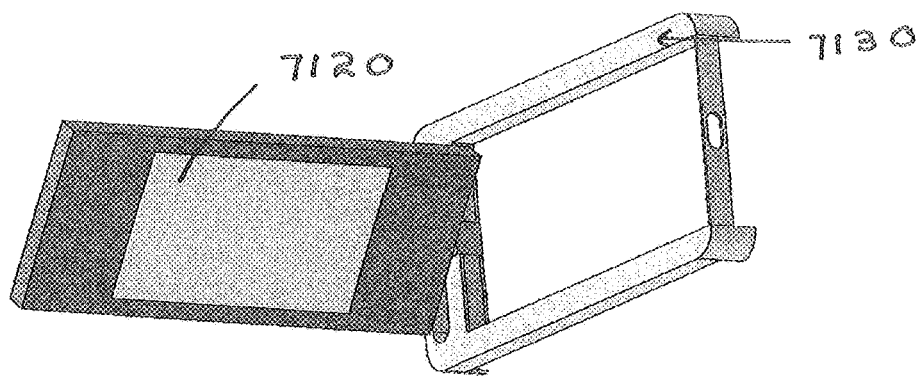

FIG. 75) illustrates the mobile device cover and detachable unit in the open position.

Figure 76:
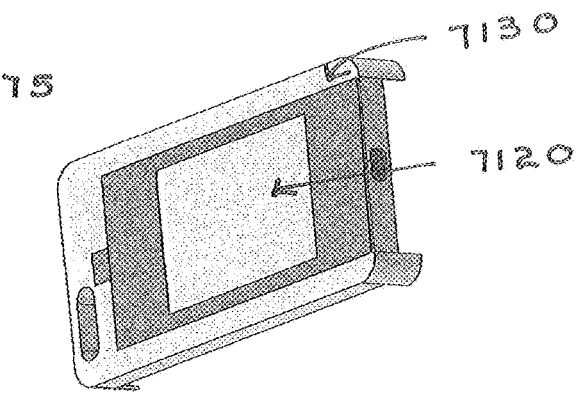

FIG. 76) illustrates the mobile device cover and detachable unit in another position.

Figure 77:
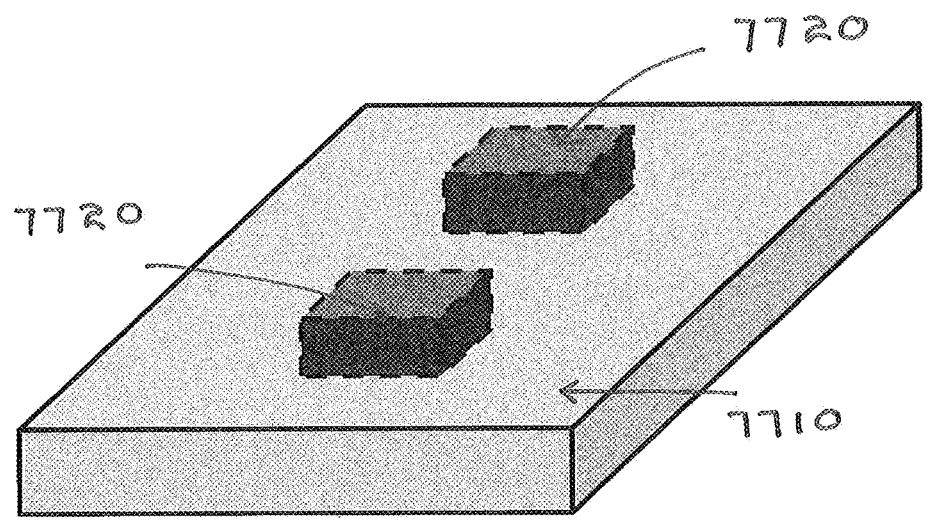

FIG. 77) illustrates a 2D/3D image/video projector for a mobile phone/device case.

Figure 78:
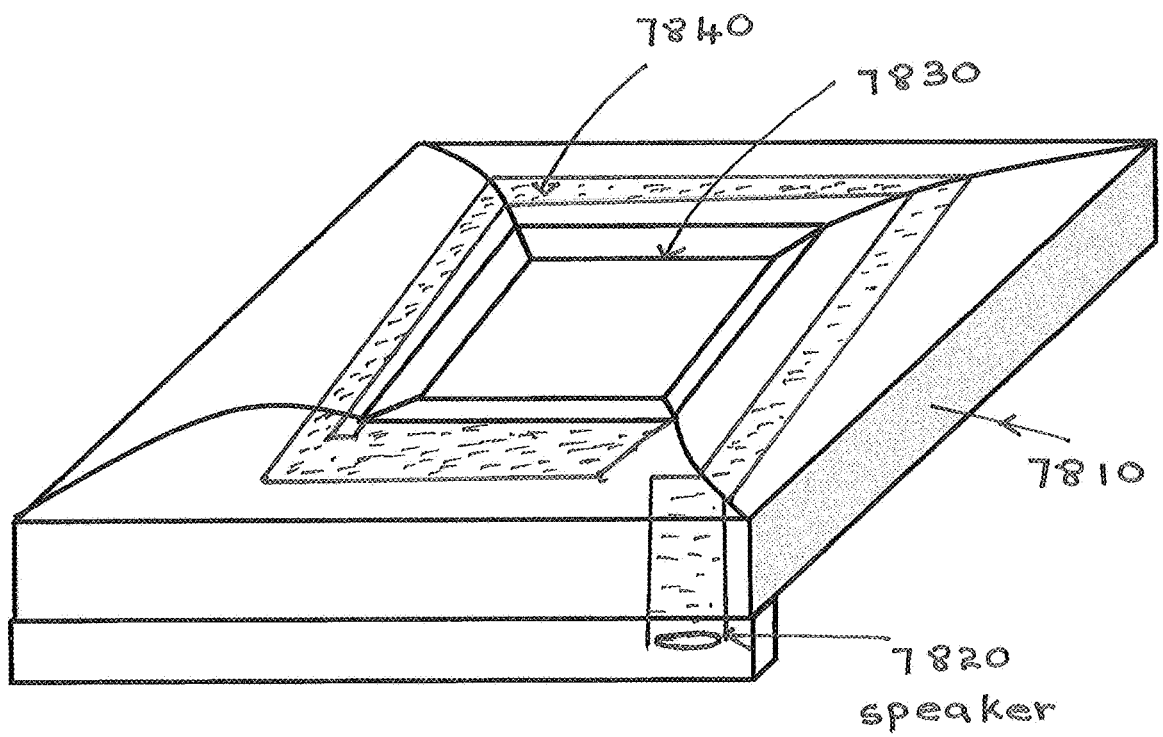

FIG. 78) illustrates a passive audio amplification module.

Figure 79:
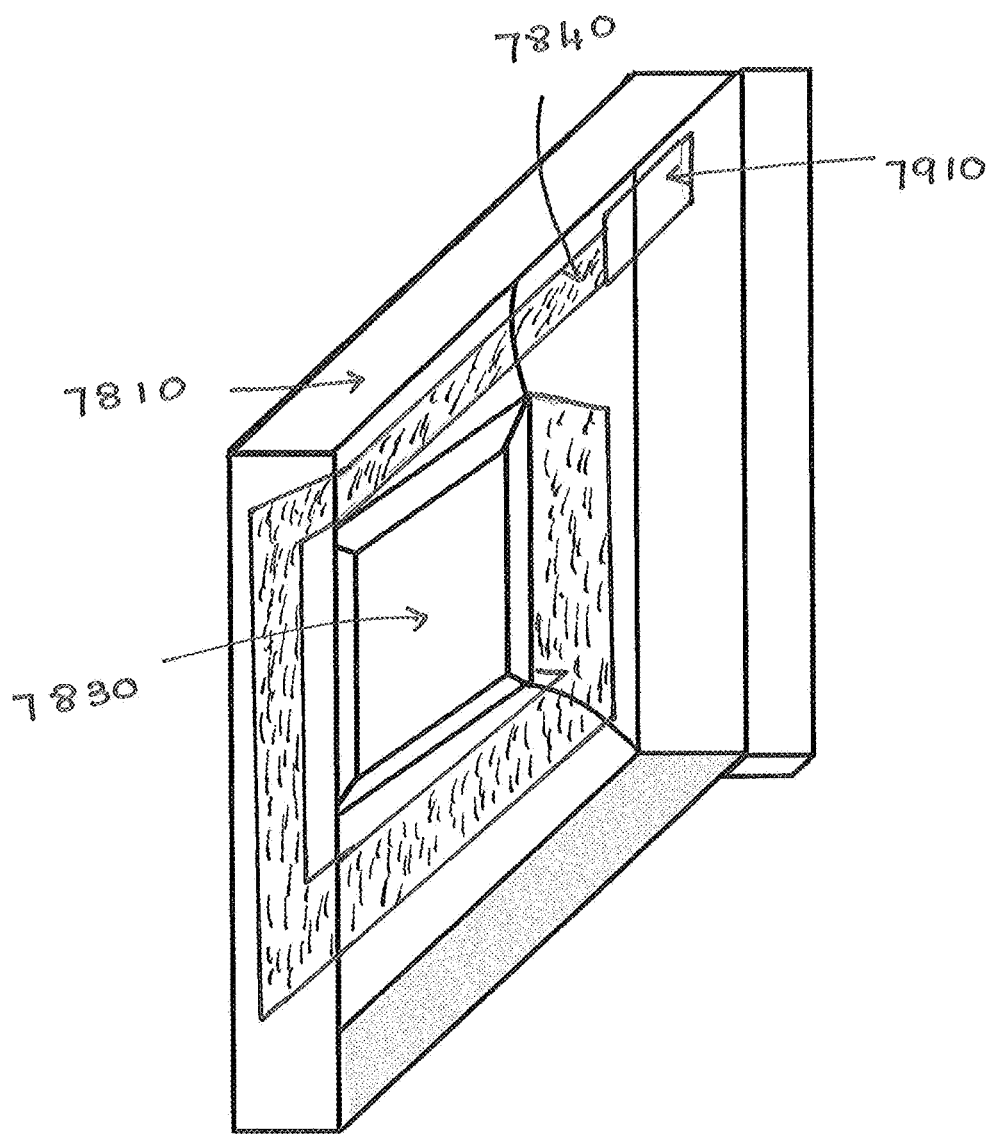

FIG. 79) illustrates an audio amplification module with a Bluetooth unit and speaker.

Figure 80:
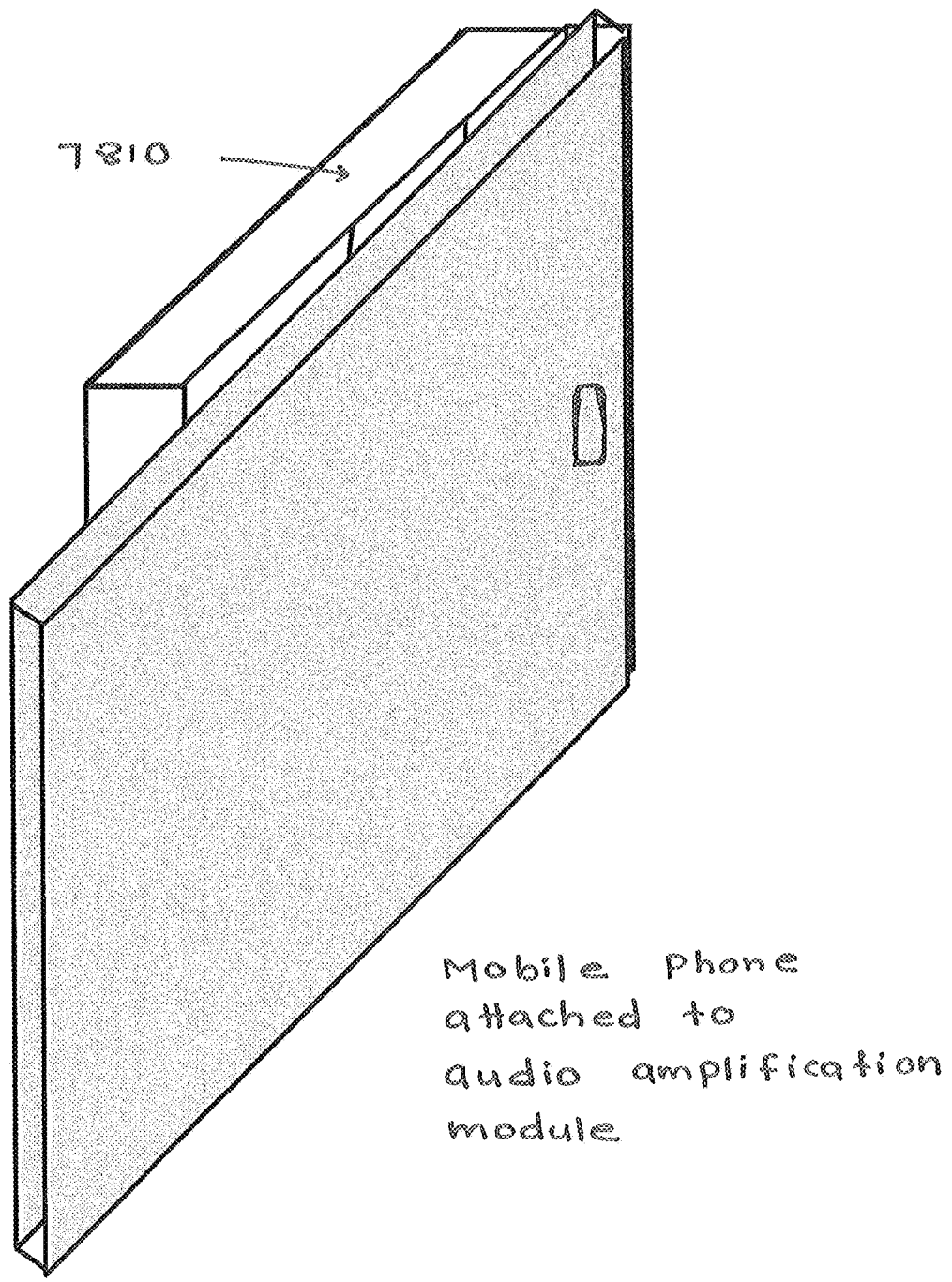

FIG. 80) illustrates a mobile device attached to the passive audio amplification module.

Figure 81:
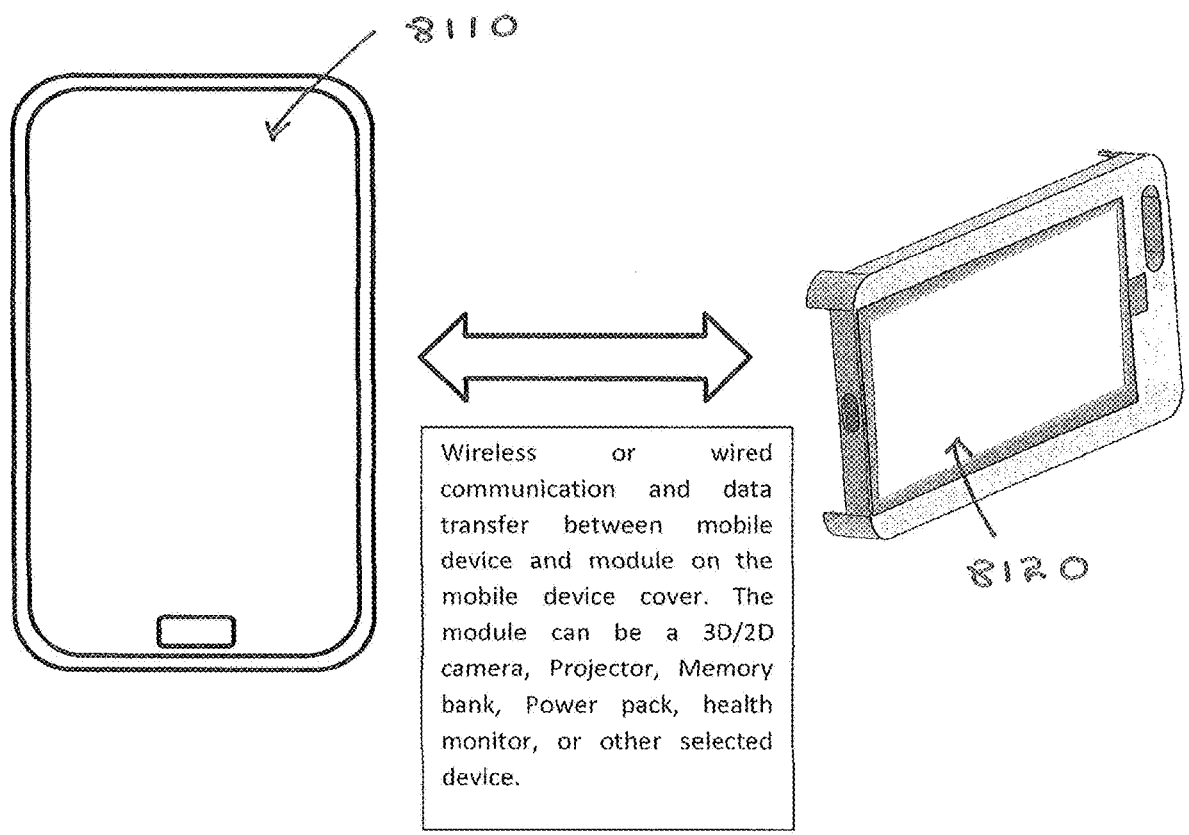

FIG. 81) illustrates wireless or wired communication between the mobile device and detachable unit on the mobile device cover.

DETAILED DESCRIPTION OF ILLUSTRATIVE EMBODIMENTS

In the following description, numerous specific details are set forth in order to provide a thorough understanding of various illustrative embodiments of the invention. It will be understood, however, to one skilled in the art, that embodiments of the present invention may be practiced without some or all of these specific details. In other instances, well known process operations have not been described in detail in order not to unnecessarily obscure pertinent aspects of embodiments being described.

Figure 1:
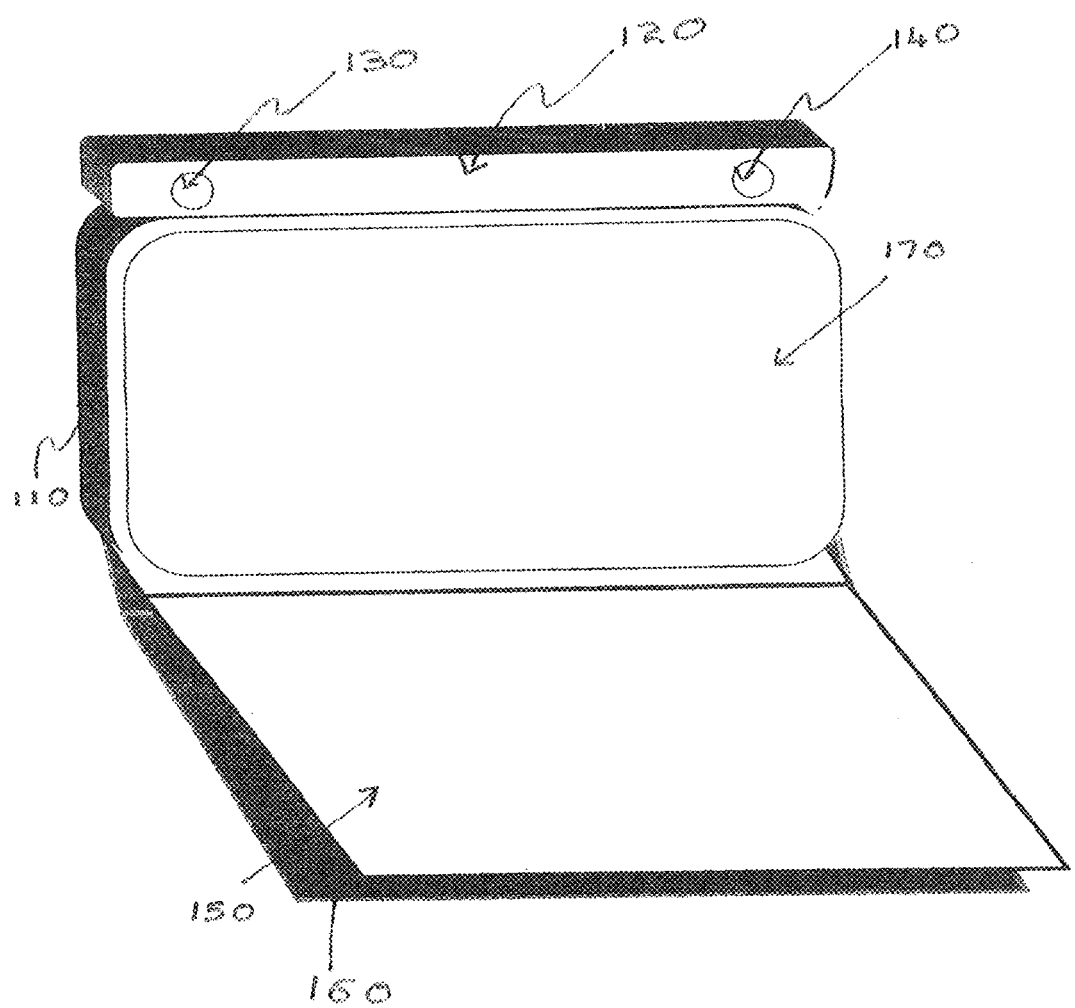
FIG. 1) illustrates a 3D camera and a 3D viewer integrated on a mobile phone/device case.

In one embodiment, a 3D camera (120) is realized by integrating two cameras (130) (140) and a 3D viewer/3D viewer sheet (150) integrated on a mobile phone/device case (110) as illustrated in FIG. 1. The 3D viewer sheet is in the form of a sticker or a peel able sticker or a flip cover. The flip cover (160) may also be added to the mobile phone/device cover (110). The mobile phone/device (170) can be fitted into the phone case (110). The 3D camera (120) can be controlled by means of an application which operates in the mobile device. By means of this 3D viewer (150), 3D can be observed without using special glasses (i.e. glass free 3D).

Figure 2:
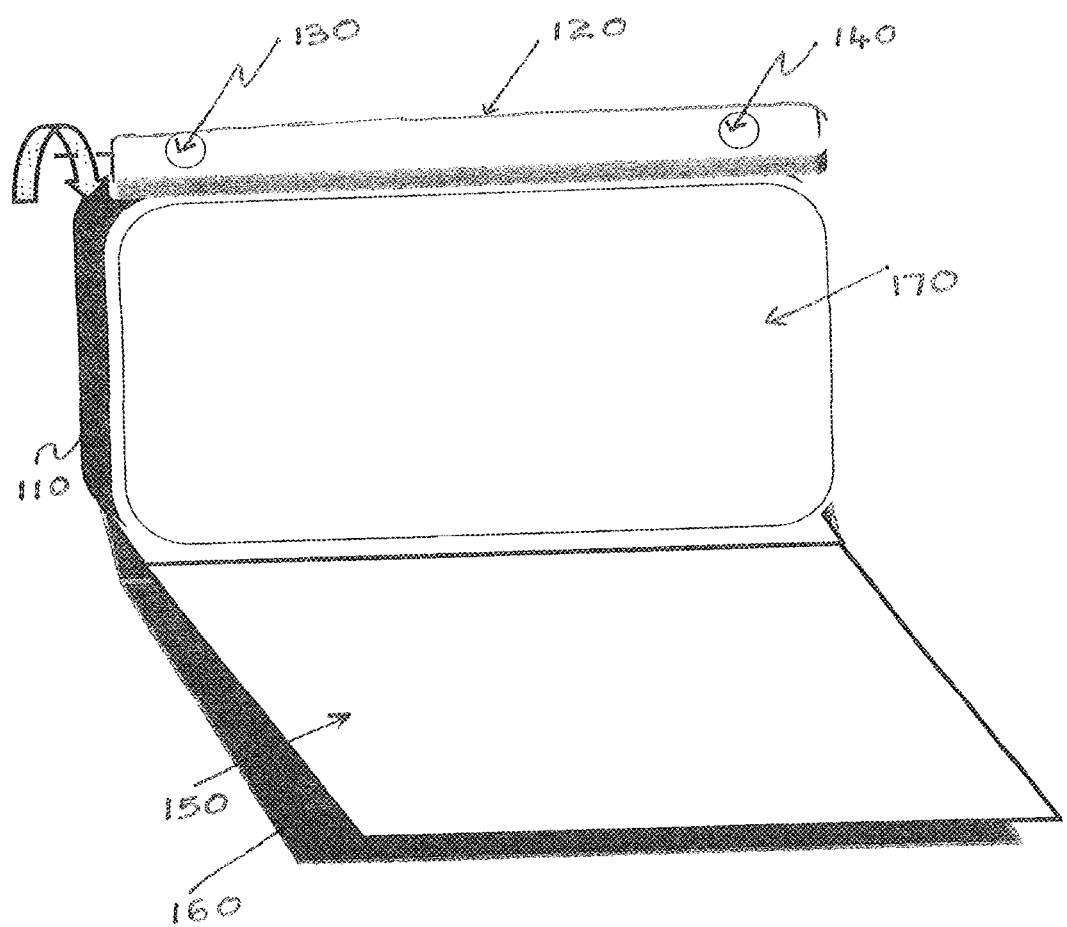
FIG. 2) illustrates a 3D camera and a 3D viewer integrated on a mobile phone/device case and the 3D camera being rotated to enable the 3D camera to be used as main camera as well as a selfie camera.

In one embodiment, a 3D camera (120) and a 3D viewer (150) is integrated on a mobile phone/device case (110) and the 3D camera (120) being rotated to enable the 3D camera to be used as main camera as well as a selfie camera as illustrated in FIG. 2.

Figure 3:
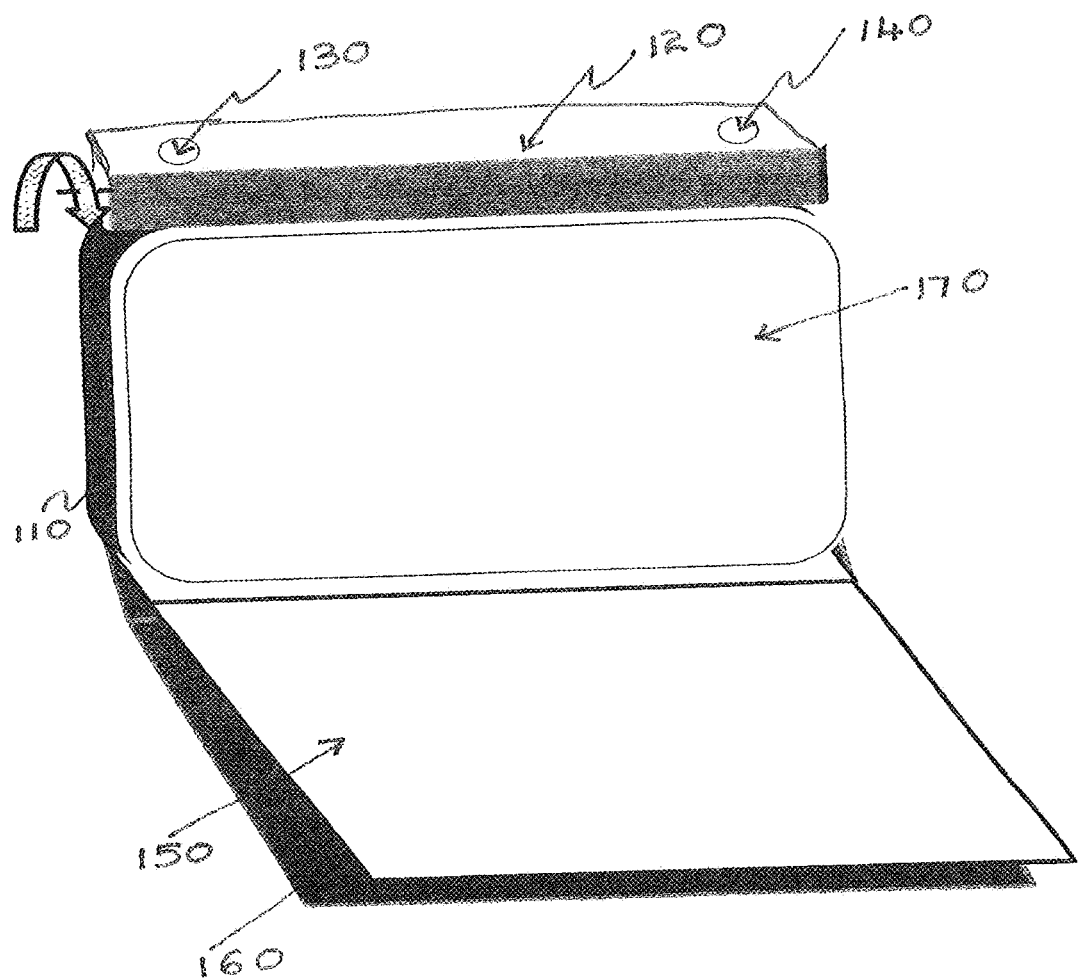
FIG. 3) illustrates a 3D camera and a 3D viewer integrated on a mobile phone/device case and the 3D camera being further rotated to enable the 3D camera to be used as main camera as well as a selfie camera.

In one embodiment, a 3D camera (120) and a 3D viewer (150) is integrated on a mobile phone/device case (110) and the 3D camera (120) being further rotated to enable the 3D camera to be used as main camera as well as a selfie camera, as illustrated in FIG. 3.

Figure 4:
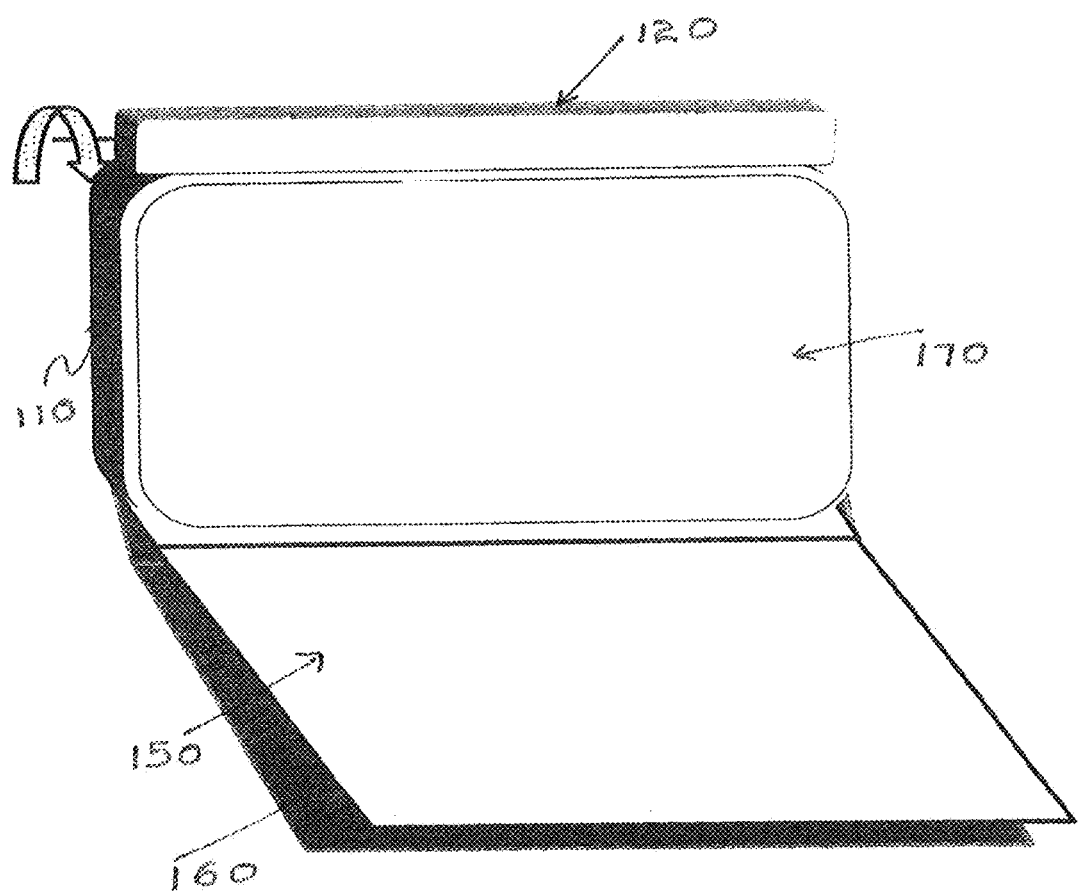
FIG. 4) illustrates a 3D camera and a 3D viewer integrated on a mobile phone/device case and the 3D camera being fully rotated to enable the 3D camera to be used as main camera.

In one embodiment, a 3D camera (120) and a 3D viewer (150) is integrated on a mobile phone/device case (110) and the 3D camera (120) being fully rotated to enable the 3D camera to be used as main camera, as illustrated in FIG. 4.

Figure 5:
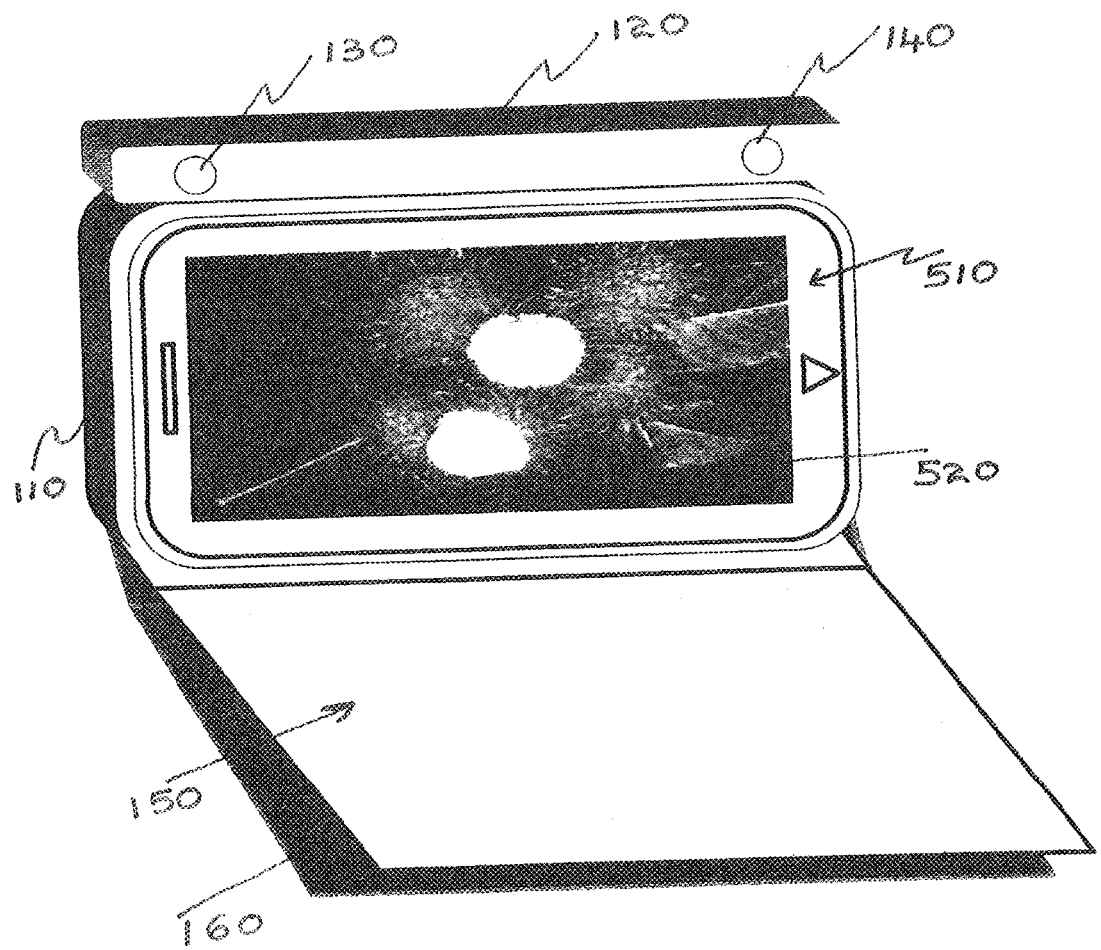
FIG. 5) illustrates the image captured by the 3D camera being displayed in the mobile phone/device (screen), which is attached to the mobile phone/device case.

In one embodiment, the image captured (520) by the 3D camera (120) is being displayed in the mobile phone/device (screen) (510), which is attached to the mobile phone/device case (110), as illustrated in FIG. 5.

Figure 6:
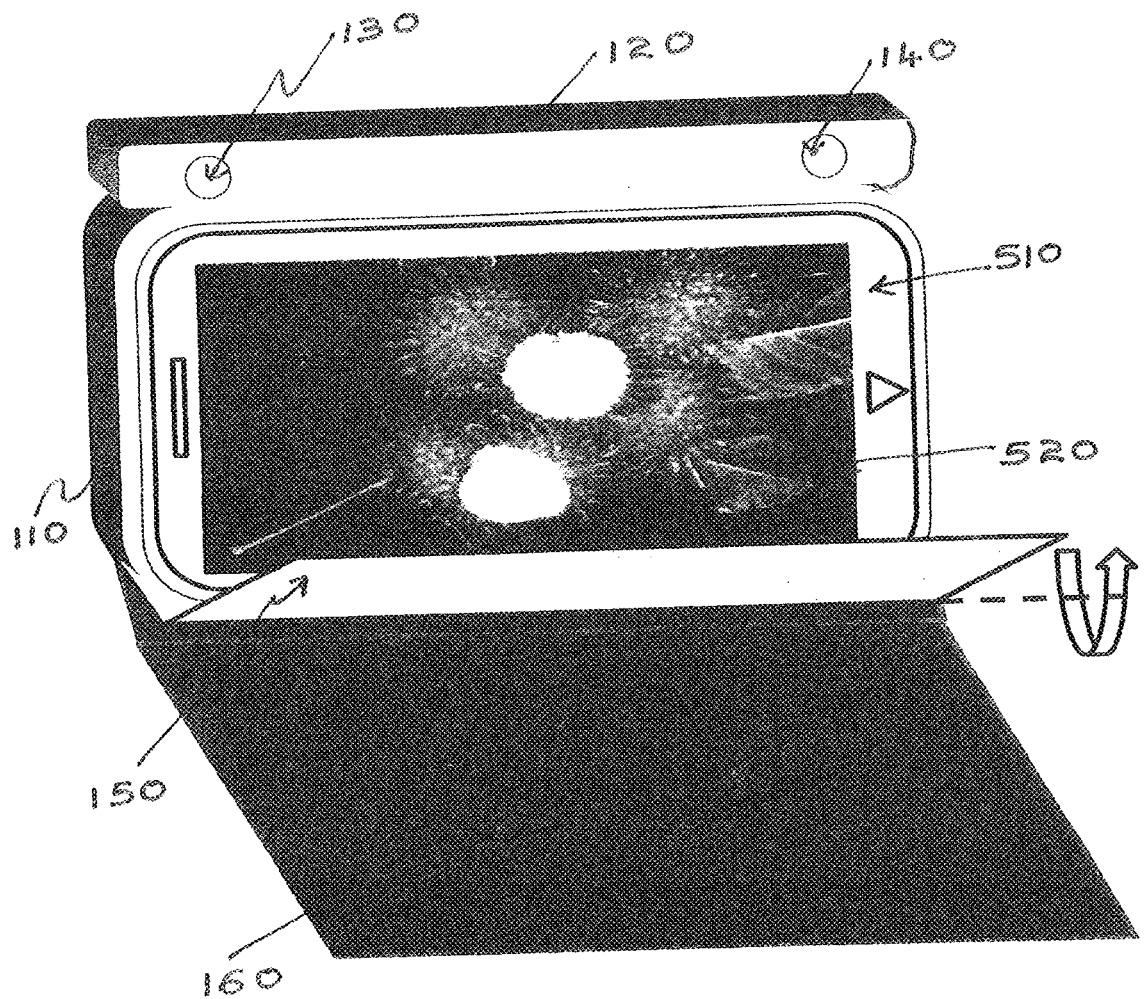
FIG. 6) illustrates the image captured by the 3D camera being displayed in the mobile phone/device (screen), which is attached to the mobile phone/device case. The 3D display being placed on top of the mobile phone/device (screen).

In one embodiment, the image captured (520) by the 3D camera (120) is being displayed in the mobile phone/device (screen) (510), which is attached to the mobile phone/device case (110). The 3D viewer (150) being placed on top of the mobile phone/device (screen), as illustrated in FIG. 6.

Figure 7:
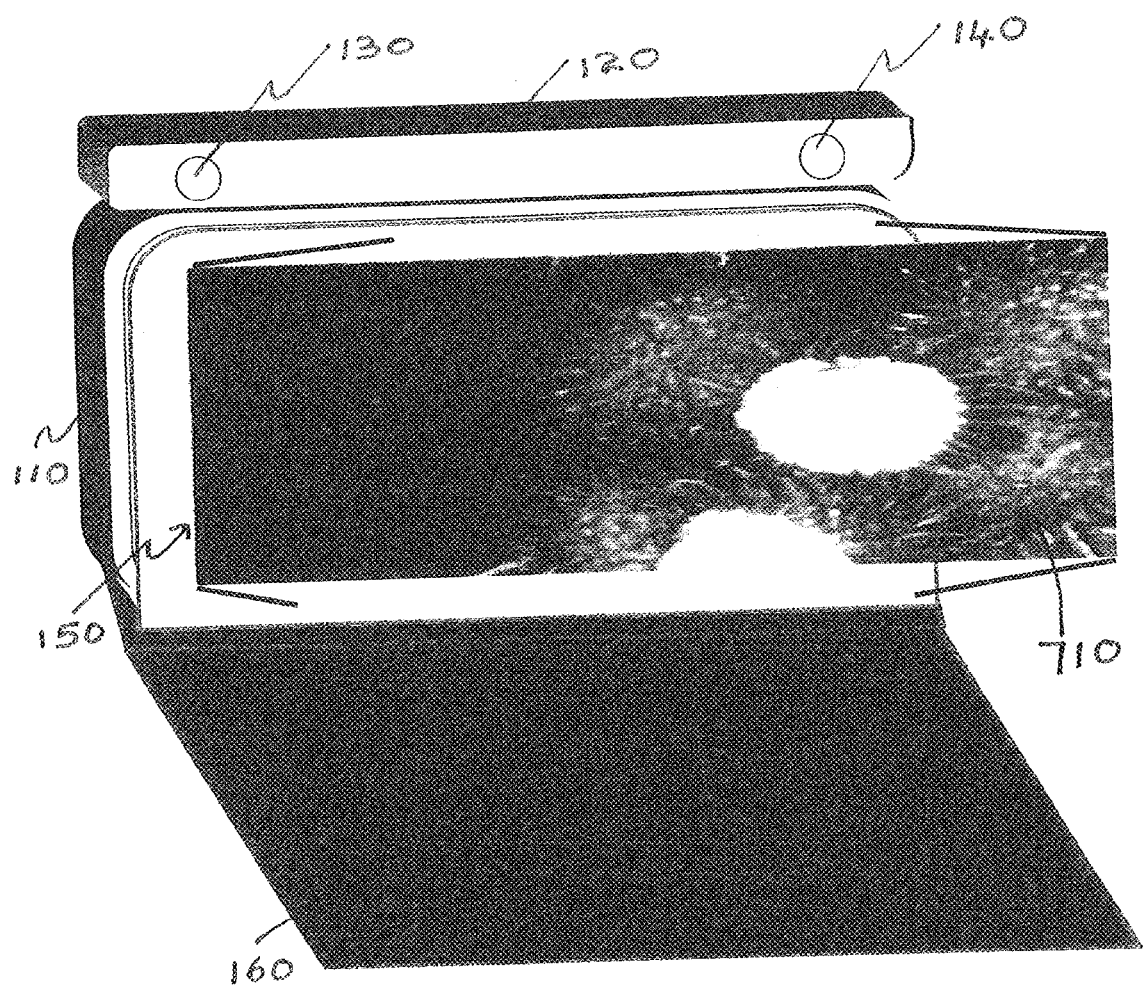
FIG. 7) illustrates the image captured by the 3D camera being displayed in the mobile phone/device (screen), which is attached to the mobile phone/device case. The 3D display placed on top of the mobile phone/device (screen) and the image can be viewed in 3D.

In one embodiment, the image captured (520) by the 3D camera (120) is being displayed in the mobile phone/device (screen) (510), which is attached to the mobile phone/device case (110). The 3D viewer (150) placed on top of the mobile phone/device (screen) (510) and the image can be viewed in 3D (710), as illustrated in FIG. 7.

Figure 8:
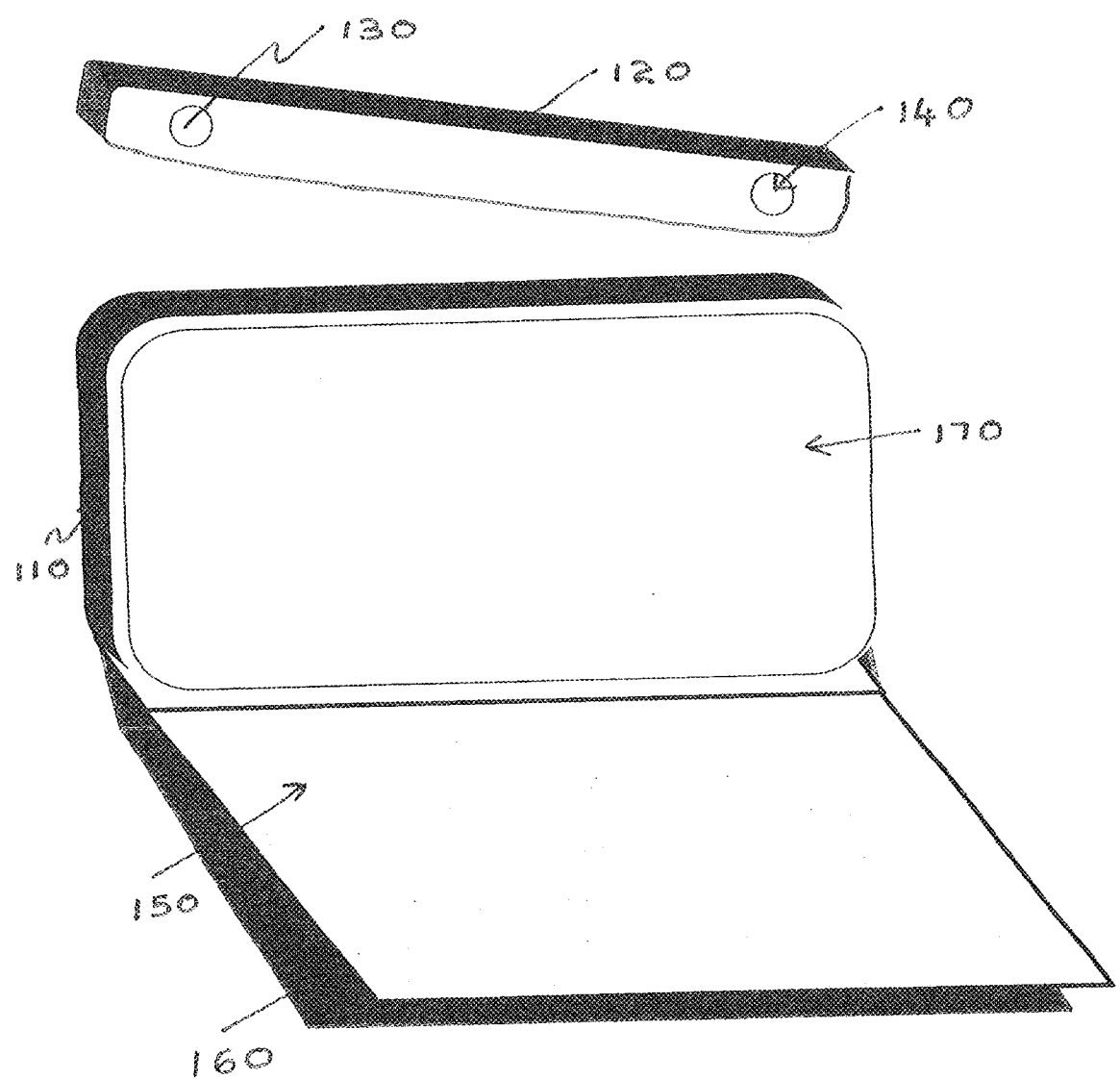
FIG. 8) illustrates a 3D camera and a 3D viewer integrated on a mobile phone/device case and the 3D camera being detached from the mobile phone/device casing, to enable the 3D camera to be used as main camera as well as a selfie camera.

In one embodiment, a 3D camera (120) and a 3D viewer (150) is integrated on a mobile phone/device case (110) and the 3D camera is being detached from the mobile phone/device casing, to enable the 3D camera to be used as main camera as well as a selfie camera as well as a remote controlled camera is illustrated in FIG. 8.

Figure 9:
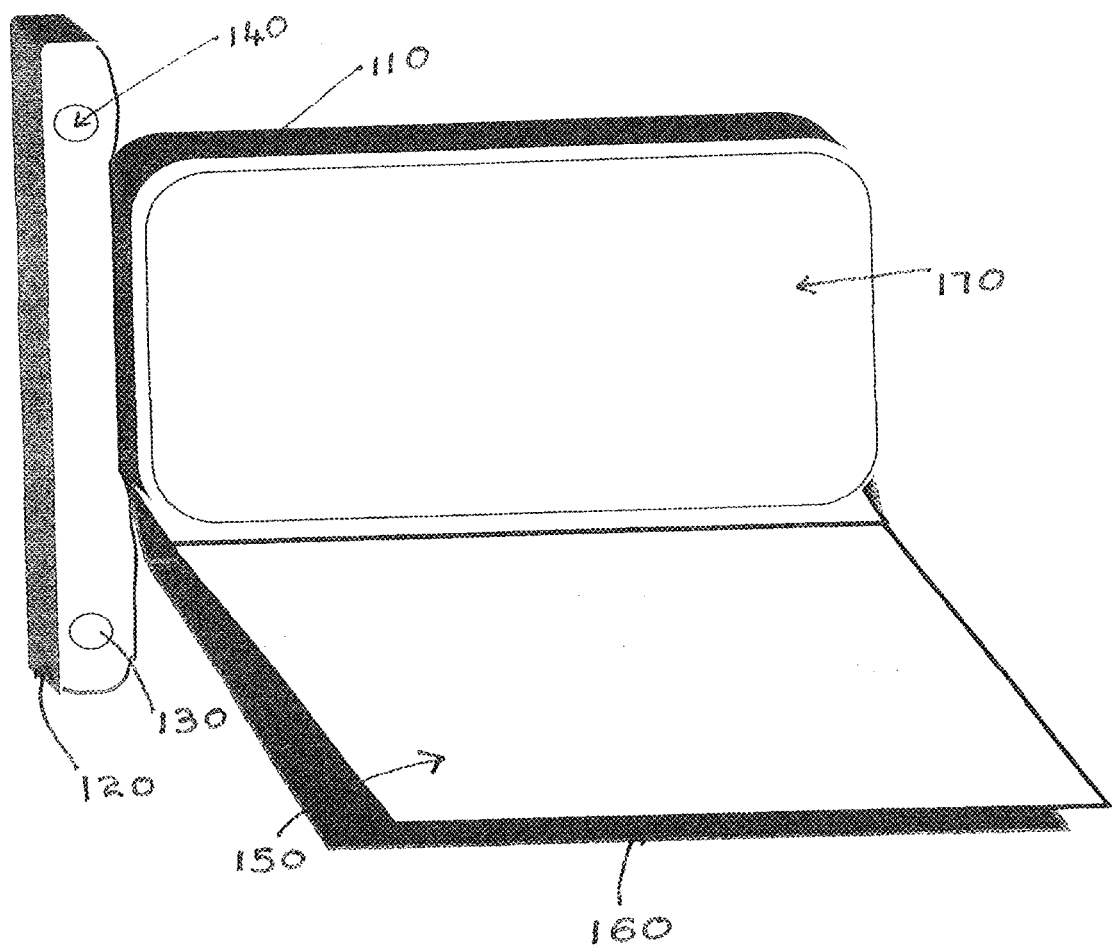
FIG. 9) illustrates a 3D camera and a 3D viewer integrated on a mobile phone/device case and the 3D camera being detached from the mobile phone/device casing, to enable the 3D camera to be used as main camera as well as a selfie camera and placed at another position.

In one embodiment, a 3D camera (120) and a 3D viewer (150) is integrated on a mobile phone/device case (110) and the 3D camera being detached from the mobile phone/device casing, to enable the 3D camera to be used as main camera as well as a selfie camera and placed at another position is illustrated in FIG. 9.

Figure 10:
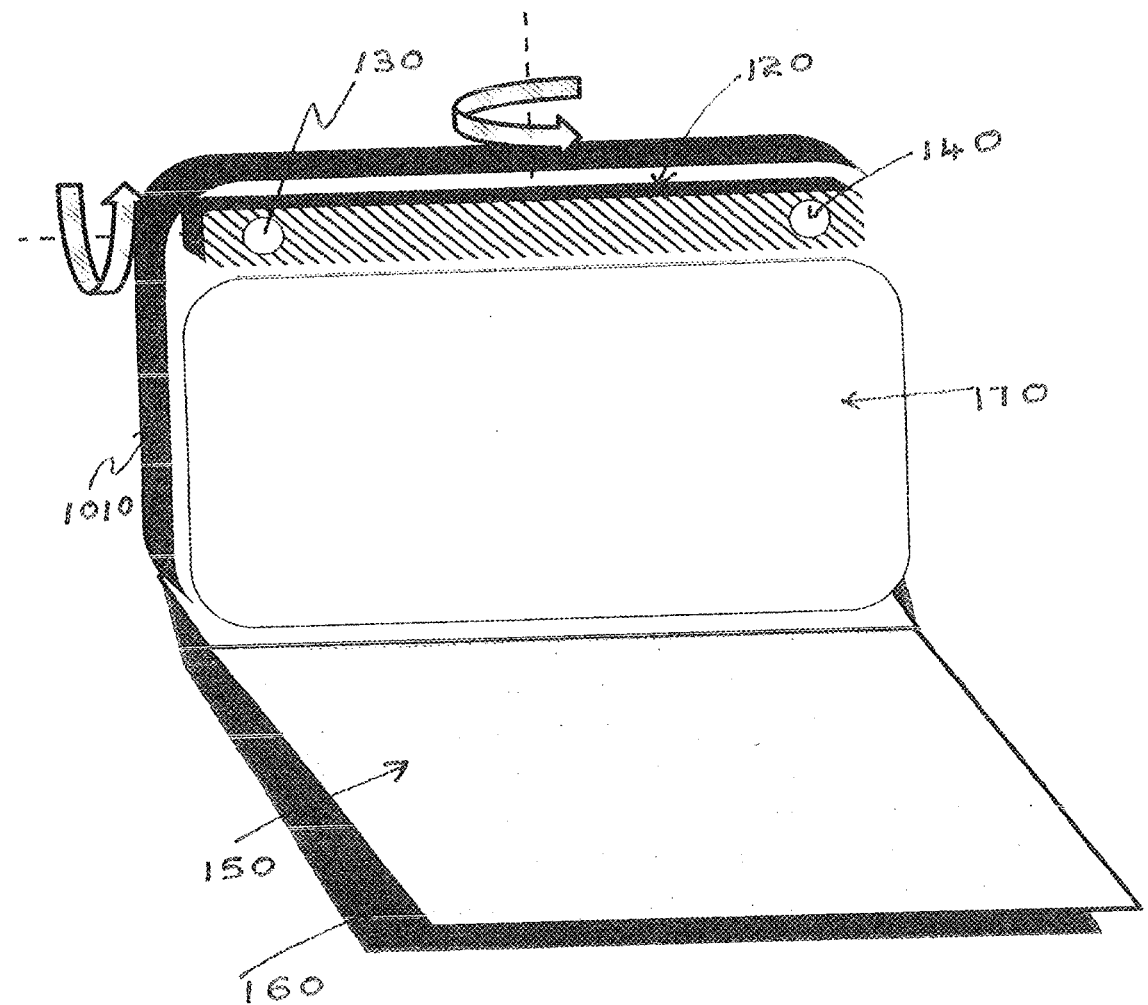
FIG. 10) illustrates a 3D camera and a 3D viewer integrated on a mobile phone/device case and the 3D camera being rotated in two perpendicular axes with respect to the mobile phone/device casing, to enable the 3D camera to be used as main camera as well as a selfie camera.

In one embodiment, a 3D camera (120) and a 3D viewer (150) is integrated on a mobile phone/device case (1010) and the 3D camera (120) being rotated in two perpendicular axis with respect to the mobile phone/device casing, to enable the 3D camera to be used as main camera as well as a selfie camera, as illustrated in FIG. 10.

Figure 11:
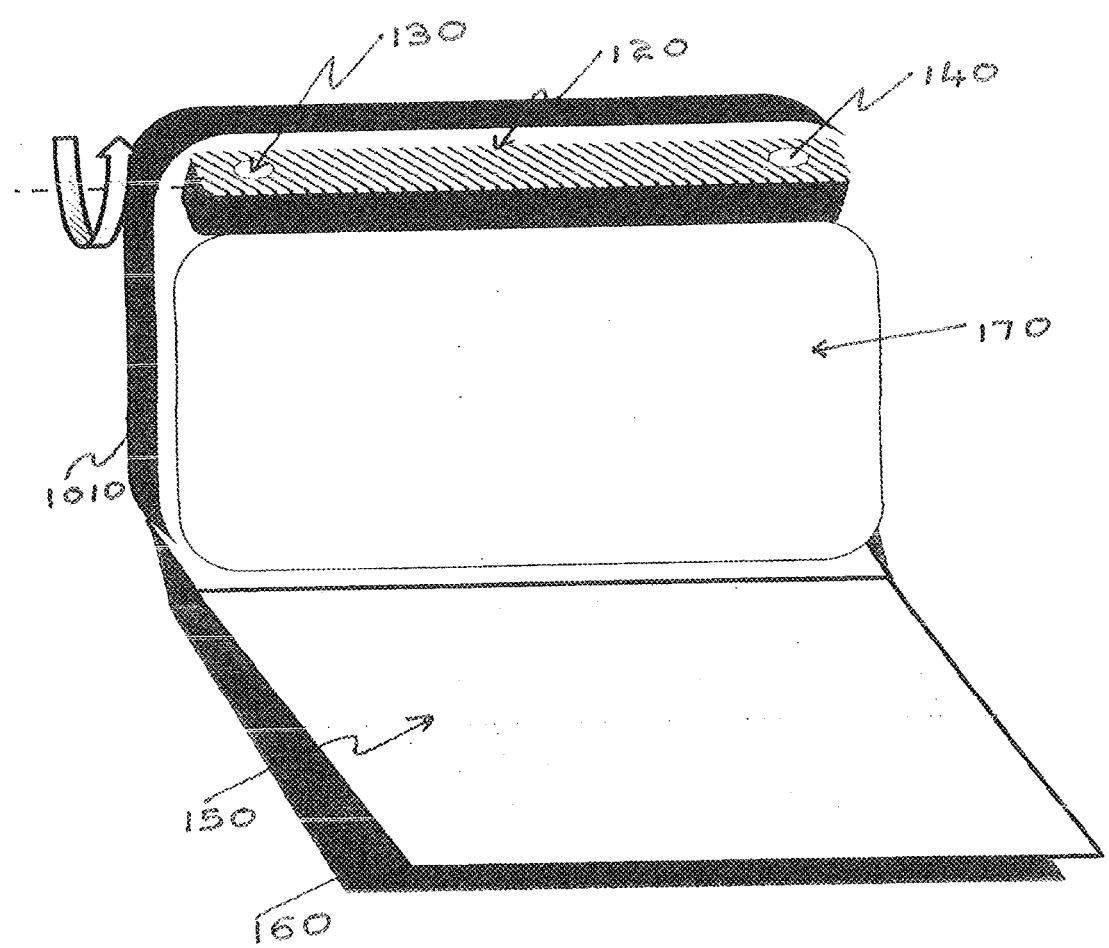
FIG. 11) illustrates a 3D camera and a 3D viewer integrated on a mobile phone/device case and the 3D camera being rotated in one axis with respect to the mobile phone/device casing, to enable the 3D camera to be used as main camera as well as a selfie camera.

In one embodiment, the 3D display sheet (150) converts the regular display of a mobile phone/device or television to a 3D display, which does not require to wear special glasses to view 3D In one embodiment, a 3D camera (120) and a 3D viewer (150) is integrated on a mobile phone/device case (1010) and the 3D camera being rotated in one axis with respect to the mobile phone/device casing (1010), to enable the 3D camera to be used as main camera as well as a selfie camera, as illustrated in FIG. 11.

Figure 12:
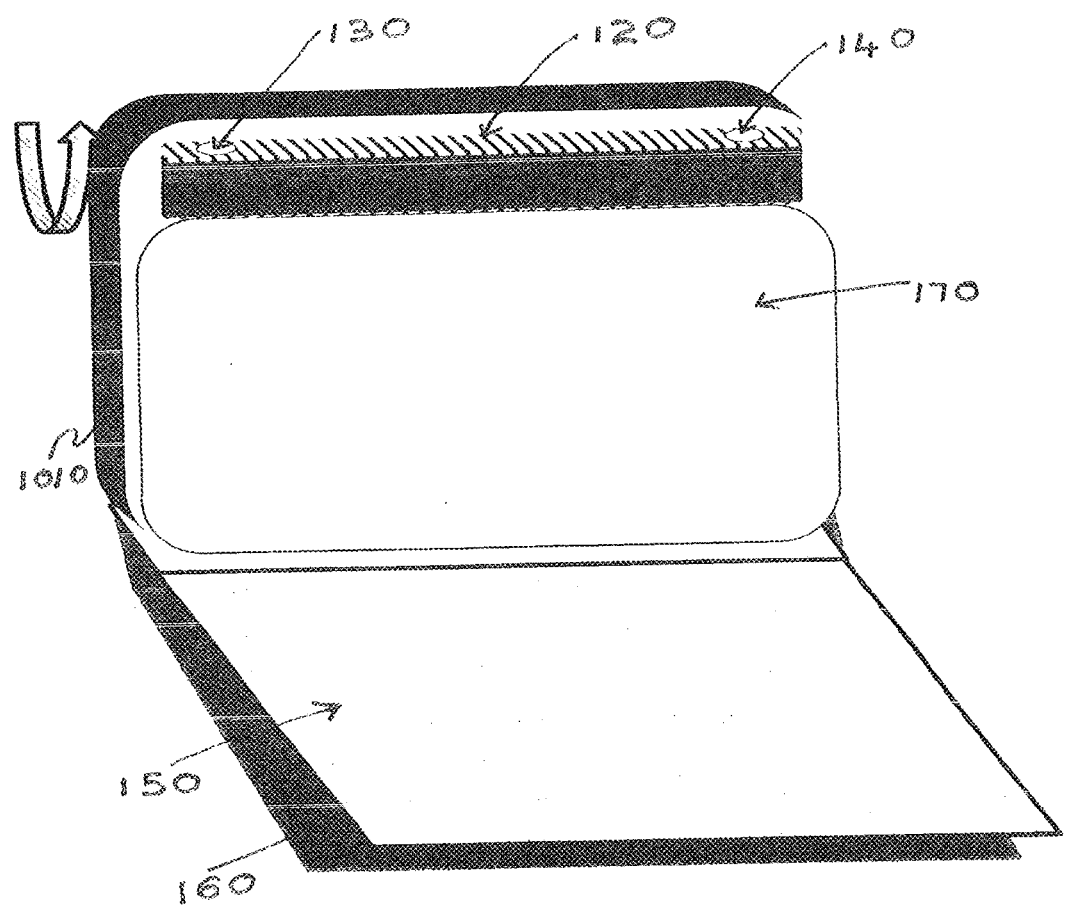
FIG. 12) illustrates a 3D camera and a 3D viewer integrated on a mobile phone/device case and the 3D camera being further rotated in one axis with respect to the mobile phone/device casing, to enable the 3D camera to be used as main camera as well as a selfie camera.

In one embodiment, a 3D camera (120) and a 3D viewer (150) is integrated on a mobile phone/device case (1010) and the 3D camera being further rotated in one axis with respect to the mobile phone/device casing, to enable the 3D camera to be used as main camera as well as a selfie camera, as illustrated in FIG. 12.

Figure 12A:
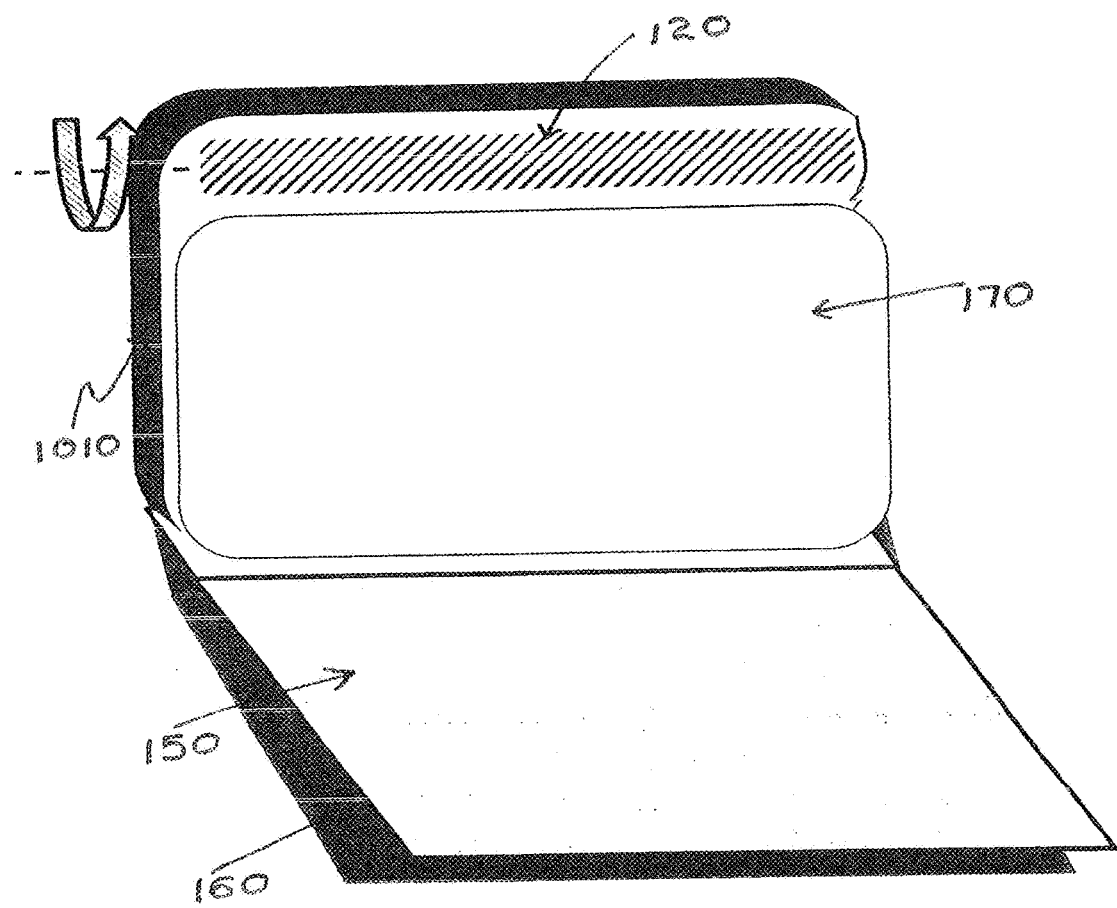
FIG. 12a) illustrates a 3D camera and a 3D viewer integrated on a mobile phone/device case and the 3D camera being fully rotated in one axis with respect to the mobile phone/device casing, to enable the 3D camera to be used as main camera as well as a selfie camera.

In one embodiment, a 3D camera (120) and a 3D viewer (150) is integrated on a mobile phone/device case (1010) and the 3D camera being fully rotated in one axis with respect to the mobile phone/device casing, to enable the 3D camera to be used as main camera as well as a selfie camera, as illustrated in FIG. 12*a*.

Figure 13:
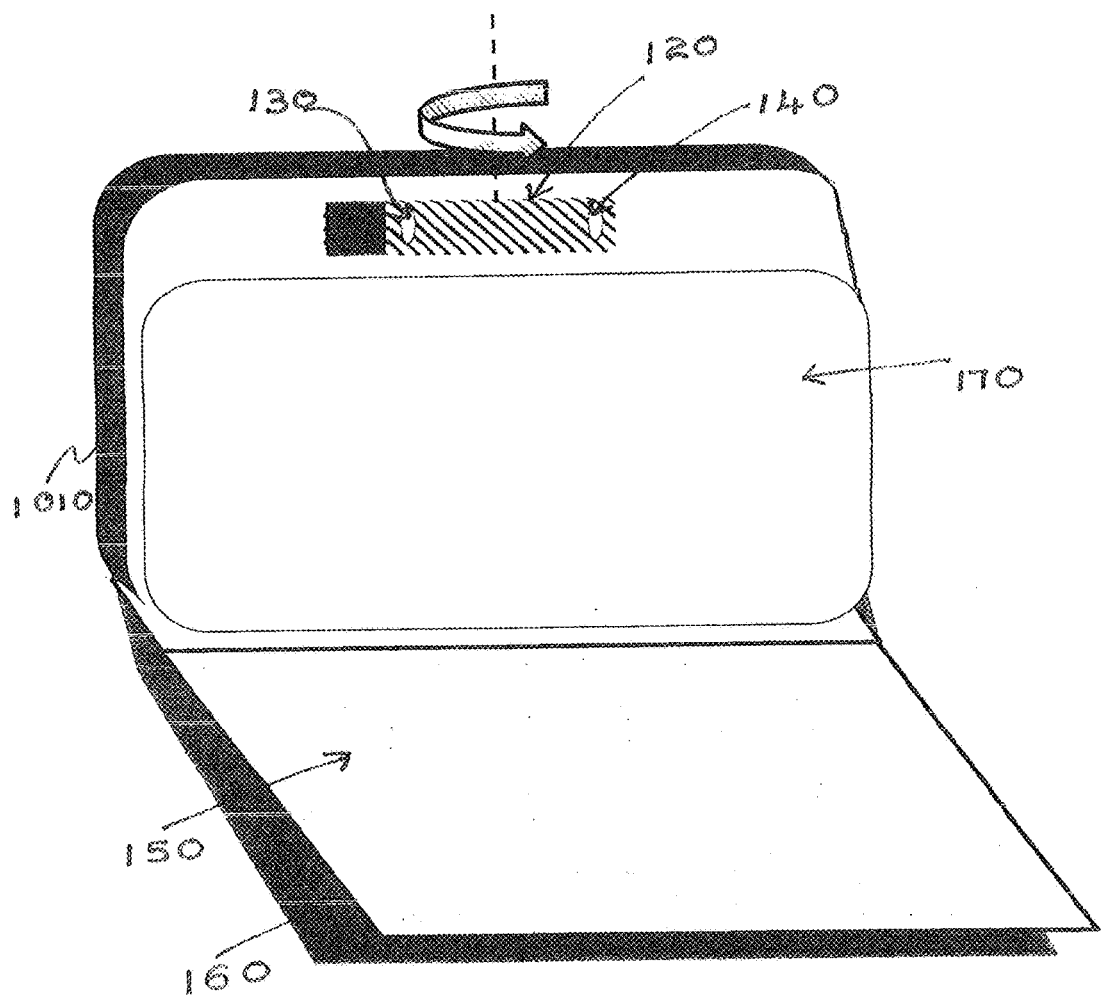
FIG. 13) illustrates a 3D camera and a 3D viewer integrated on a mobile phone/device case and the 3D camera being rotated in one axis with respect to the mobile phone/device casing, to enable the 3D camera to be used as main camera as well as a selfie camera.

In one embodiment, a 3D camera (120) and a 3D viewer (150) is integrated on a mobile phone/device case (1010) and the 3D camera (120) being rotated in one axis with respect to the mobile phone/device casing, to enable the 3D camera to be used as main camera as well as a selfie camera, as illustrated in FIG. 13.

Figure 14:
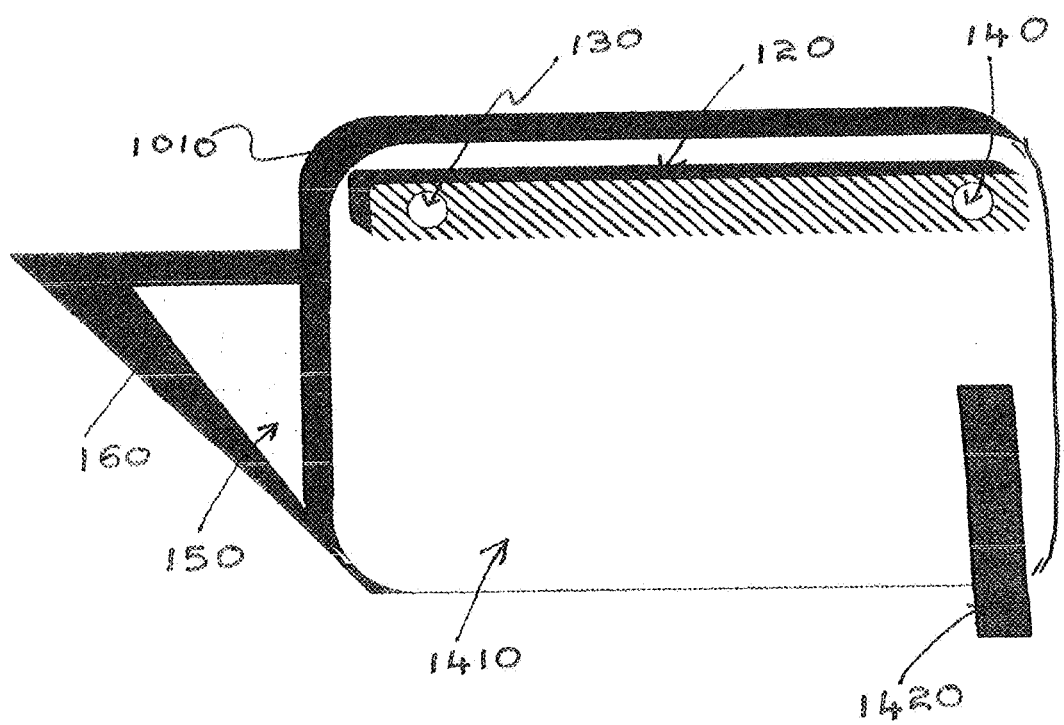
FIG. 14) illustrates a 3D camera and a 3D viewer integrated on a mobile phone/device case and the 3D camera being fully rotated in one axis with respect to the mobile phone/device casing, to enable the 3D camera to be used as main camera as well as a selfie camera. The camera is seen looking through the back of the mobile phone/device casing.

In one embodiment, a 3D camera (120) and a 3D viewer (150) is integrated on a mobile phone/device case and the 3D camera (120) being fully rotated in one axis with respect to the mobile phone/device casing, to enable the 3D camera to be used as main camera as well as a selfie camera. The mobile phone/device case has a retractable/foldable stand (1420) attached. The camera is seen looking through the back of the mobile phone/device casing, as illustrated in FIG. 14.

Figure 15:
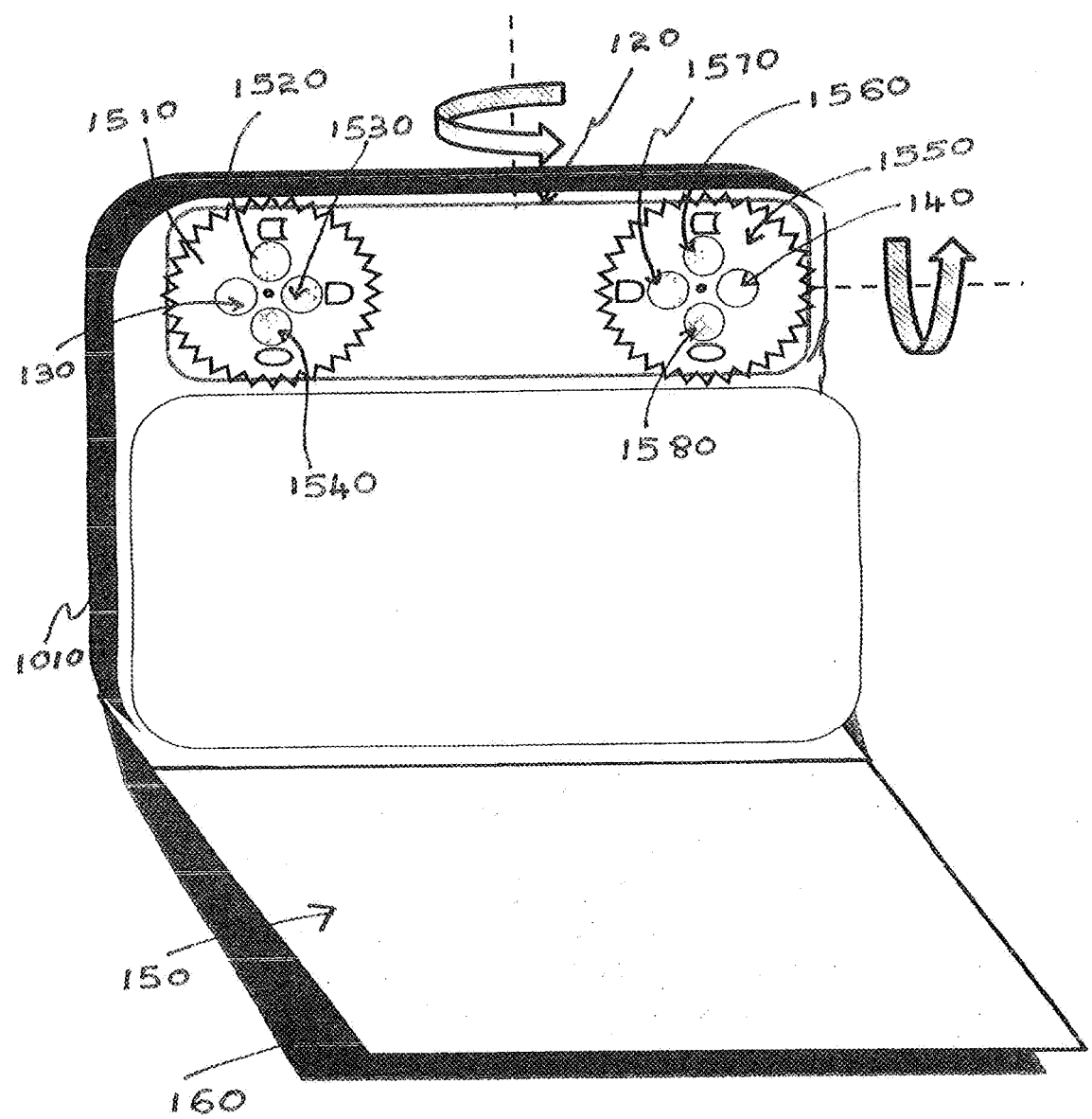
FIG. 15) illustrates a 3D camera and a 3D viewer integrated on a mobile phone/device case. The camera has multiple lenses attached to a thumb wheel where different lenses can be used/changed to have multiple optical effects. (eg. Zoom, telephoto, multi image, etc).

In one embodiment, a 3D camera (120) and a 3D viewer (150) integrated on a mobile phone/device case (1010). The camera has multiple lenses (1560, 1570, 1580, 1520, 1530, 1540) attached to thumb wheels (1550, 1510) where different lenses can be used/changed to have multiple optical effects (eg. Zoom, telephoto, multi image, etc), as illustrated in FIG. 15.

Figure 15A:
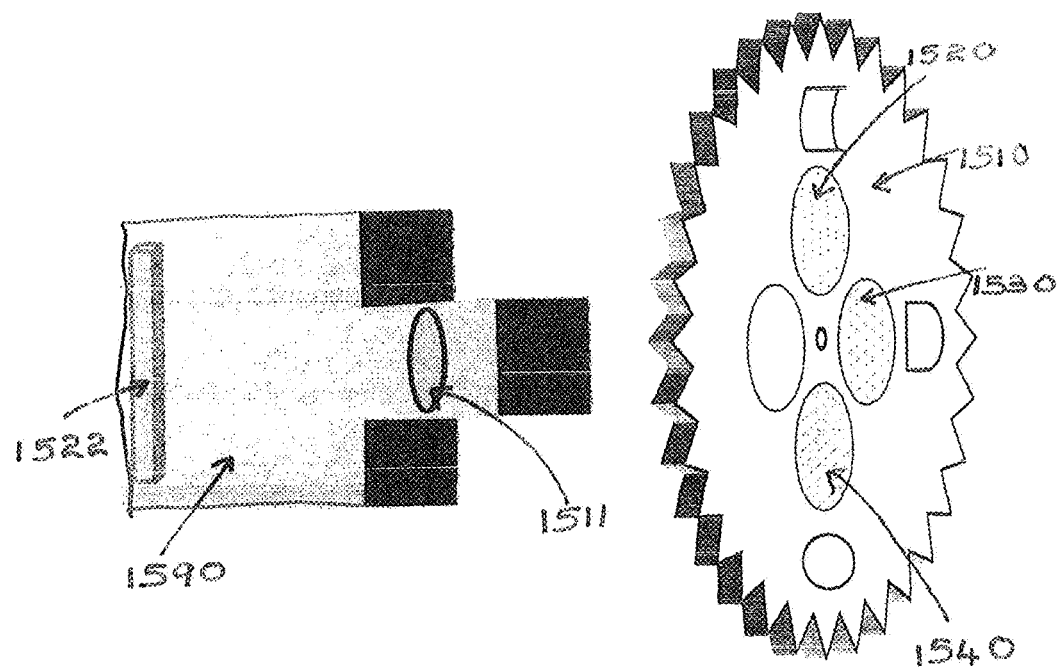

In one embodiment, a camera (1590) is integrated on a mobile phone/device case. The camera has multiple lenses (1520, 1530, 1540) attached to a thumb wheel (1510) where different lenses can be used/changed to have multiple optical effects (eg. Zoom, telephoto, multi image, etc). The thumb wheel containing different lenses is placed in front of the auto focus lens (1511) as illustrated in FIG. 15*a*. The image sensor (1522) of the camera is placed as illustrated in FIG. 15*a*

Figure 15B:
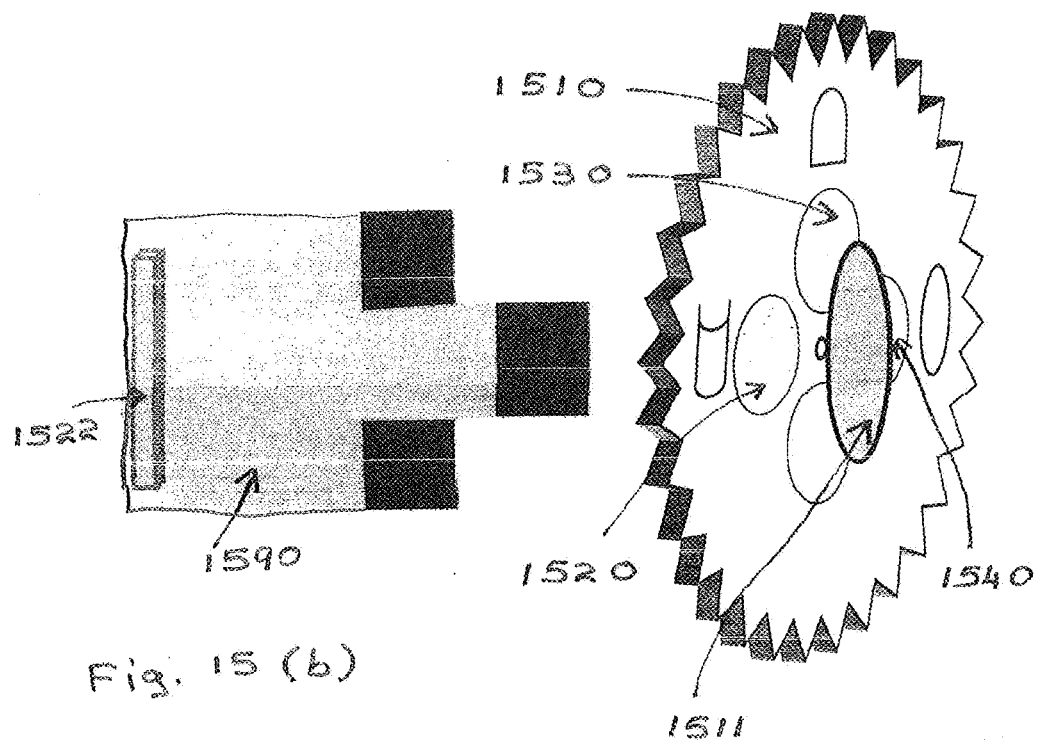

In one embodiment, a camera (1590) is integrated on a mobile phone/device case. The camera has multiple lenses (1520, 1530, 1540) attached to a thumb wheel (1510) where different lenses can be used/changed to have multiple optical effects (eg. Zoom, telephoto, multi image, etc). The thumb wheel containing different lenses is placed in between the auto focus lens (1511) and the image sensor (1522), as illustrated in FIG. 15*b*.

In one embodiment, a camera (1590) is integrated on a mobile phone/device case. The camera has multiple lenses (1520, 1530, 1540, 1521) attached to a thumb wheel (1510) where different lenses can be used/changed to have multiple optical effects (eg. Zoom, telephoto, multi image, etc), as illustrated in FIG. 15*c*. The thumb wheel containing different lenses (1520, 1530, 1540, 1521) may either be placed in front of the auto focus lens (1511), or in between the auto focus lens (1511) and the image sensor (1522), as illustrated in FIG. 15*a* and FIG. 15*b*.

Figure 16:
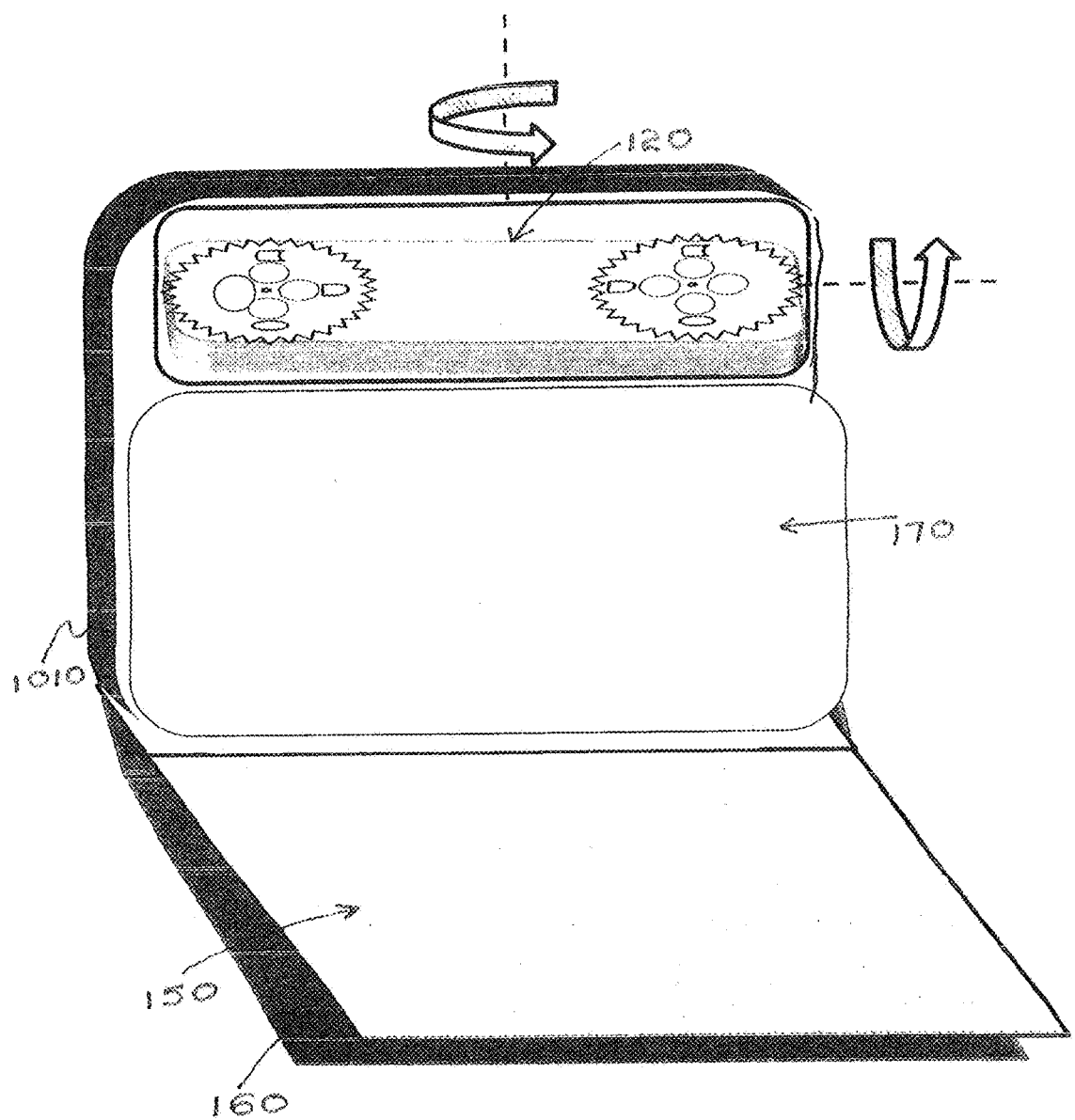

In one embodiment, a 3D camera (120) and a 3D viewer (150) is integrated on a mobile phone/device case (1010). The camera (120) has multiple lenses attached to a thumb wheel where different lenses can be used/changed to have multiple optical effects. The camera is shown to be rotated around multiple axis, as illustrated in FIG. 16.

In one embodiment, a 3D camera (120), a 3D viewer (150) and camera flash (1710) are integrated on a mobile phone/device case. The flash can be a Light Emitting Device (usually called LED) flash or gas discharge tube flash or any kind of a light source. The light source may not be limited to visible light. The light source can even be an Infra Red source. The camera has multiple lenses attached to a thumb wheel (1510) where different lenses can be used/changed to have multiple optical effects. The camera is shown to be rotated around multiple axis, as illustrated in FIG. 17.

In one embodiment, a 3D camera (120), a 3D viewer (150), electronics (1810, 1820) with wireless communication, signal processing, data storage, memory card, flash memory card, wi-fi transmitter and receiver, wi-fi hot spot, wireless transmitter and receiver, Near field communication, wireless charging, Bluetooth, and battery is integrated on a mobile phone/device case. The battery integrated with the camera can be used to re-charge the battery of the camera, via the connector (1830). The camera has multiple lenses attached to a thumb wheel (1510) where different lenses can be used/changed to have multiple optical effects. The camera is shown to be rotated around multiple axis. This embodiment is illustrated in FIG. 18.

Figure 18A:
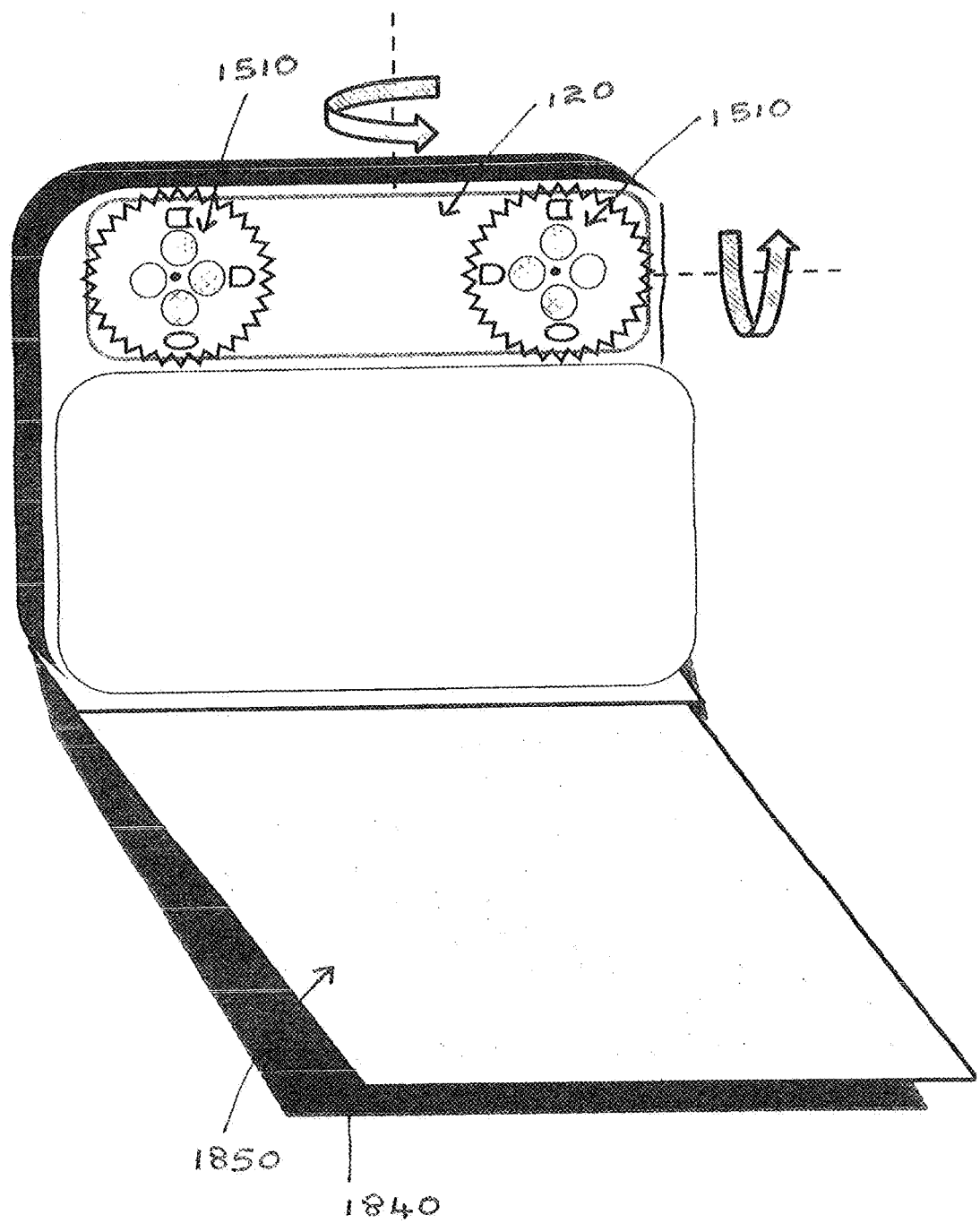

In one embodiment, a 3D camera (120), a 3D viewer with rounded edges (1850), electronics with wireless communication, signal processing and battery integrated on a mobile phone/device case. The camera has multiple lenses attached to a thumb wheel (1510) where different lenses can be used/changed to have multiple optical effects. The camera is shown to be rotated around multiple axis. The flip cover (1840) and 3D viewer (1850) has rounded edges, as illustrated in FIG. 18*a*.

In one embodiment, a 3D camera (120), a 3D viewer (150), electronics with wireless communication, signal processing and battery is integrated on a mobile phone/device case. The camera has multiple lenses attached to a thumb wheel (1510) where different lenses can be used/changed to have multiple optical effects. The camera is shown to have coupled the thumb wheels (1510) having multiple lenses via a gear arrangement using wheels (1910, 1920, 1930). This embodiment is illustrated in FIG. 19.

In one embodiment, a 3D camera (120), a 3D viewer (150), electronics with wireless communication, signal processing and battery is integrated on a mobile phone/device case. The camera has multiple lenses attached to a thumb wheel (1510) where different lenses can be used/changed to have multiple optical effects. The camera is shown to have coupled the thumb wheels (1510) having multiple lenses via a gear arrangement using wheels (1910, 1920, 1930). The camera is shown to be rotated around multiple axis. This embodiment is illustrated in FIG. 20.

In one embodiment, a 3D camera (120), a 3D viewer (150), electronics with wireless communication, signal processing and battery are integrated on a mobile phone/device case. The camera has multiple lenses attached to a thumb wheel (1510) where different lenses can be used/changed to have multiple optical effects. The camera is shown to have coupled the thumb wheels having multiple lenses via a gear arrangement using a wheel (2110), as illustrated in FIG. 21.

In one embodiment, a 3D camera (120), a 3D viewer (150), electronics with wireless communication, signal processing and battery are integrated on a mobile phone/device case. The camera has multiple lenses attached to a thumb wheel where different lenses can be used/changed to have multiple optical effects. The camera is shown to have coupled the thumb wheels having multiple lenses. The camera can be slipped into the phone or device case/cover (1010), after use, as illustrated in FIG. 22.

Figure 23:
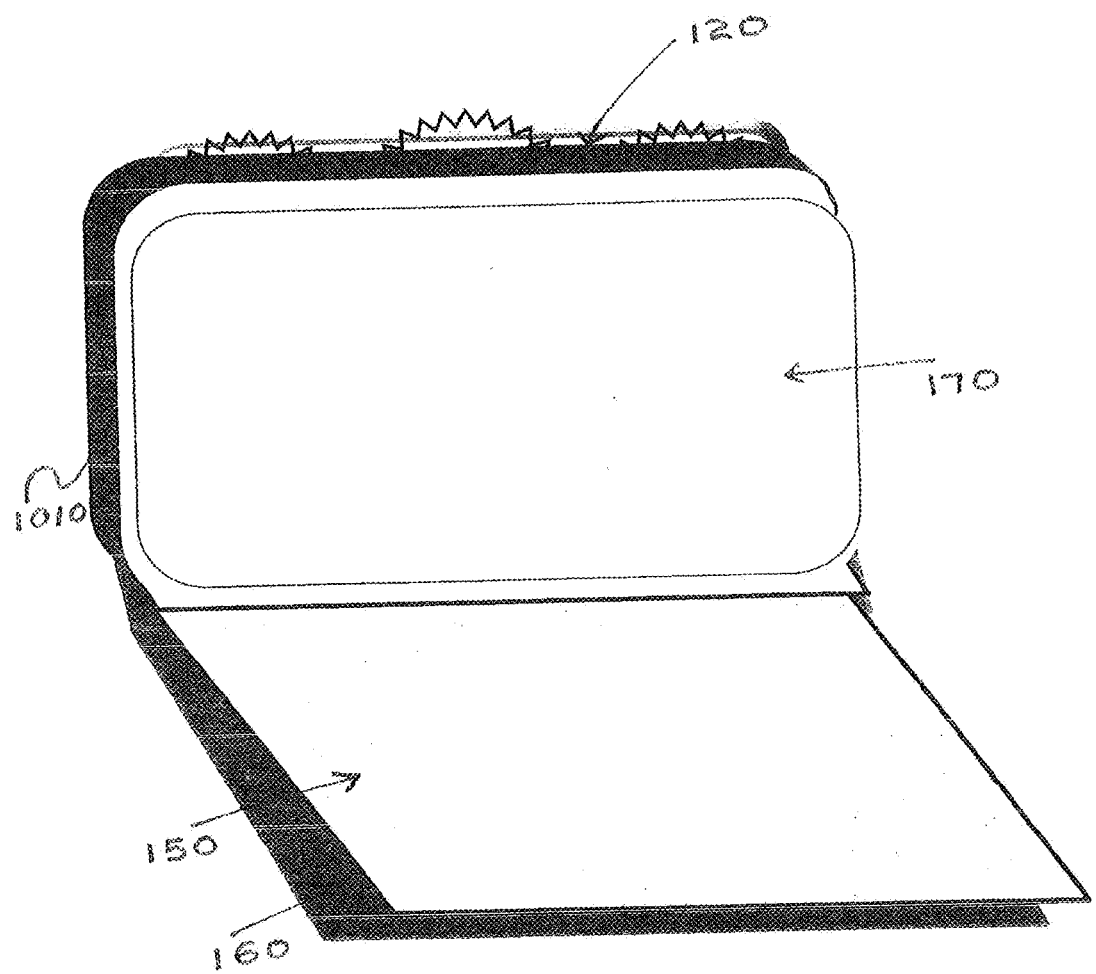

In one embodiment, a 3D camera (120), a 3D viewer (150), electronics with wireless communication, signal processing and battery integrated on a mobile phone/device case (1010). The camera has multiple lenses attached to a thumb wheel where different lenses can be used/changed to have multiple optical effects. The camera is shown to have coupled the thumb wheels having multiple lenses. The camera can be further slipped inside the phone/device case (1010), after use, as illustrated in FIG. 23. In one embodiment, the backside of the phone/device case (1010), when the camera is retracted will be like as shown in FIG. 24. A collapsible or retrievable stand (2430) is attached to the mobile phone/device case or cover.

In one embodiment, a camera (2520 and 120) which may be integrated on a mobile phone/device case is equipped with a flash (2510) as illustrated in FIG. 25. The flash may be a LED flash, Xenon flash, gas discharge flash, Infra red flash or any light emitting device.

In one embodiment, a camera (120), a 3D viewer (150), electronics with wireless communication, signal processing and battery are integrated on a mobile phone/device case. The camera has multiple lenses attached to a thumb wheel (1510) where different lenses (1560, 1570, 1580) can be used/changed to have multiple optical effects. The camera (120) is shown to be coupled to the thumb wheel (1510) having multiple lenses. The camera can be slipped inside the phone case (1010), after use. The camera is equipped with a flash (2510) as illustrated in FIG. 26. The flash may be a LED flash, Xenon flash, gas discharge flash, Infra red flash or any light emitting device.

In one embodiment, the 3D camera containing two cameras (130, 140) is permanently fixed on the phone case (1010), as illustrated in FIG. 27.

In one embodiment, a 3D camera (120), a 3D viewer (150), electronics with wireless communication, signal processing and battery are integrated on a mobile phone/device case (1010). A 3D viewer (150) and a Fresnel lens viewer (2810) is placed between the phone/device display screen (510) and the eye (2840) of the person looking at the screen, as illustrated in FIG. 28. The Fresnel gratings (2830, 2820) are shown in the Fresnel lens (2810).

In one embodiment, a 3D camera (120), a 3D viewer (150), electronics with wireless communication, signal processing and battery are integrated on a mobile phone/device case (1010). A Fresnel lens viewer (2810) is placed between the phone display screen (510) and the eye (2840) of the person looking at the screen (510), as illustrated in FIG. 29. In one embodiment, another mode of displaying the two images or video captured with the two cameras (3010, 3020) of the 3D camera (120) is illustrated in FIG. 30. Here, the image or video frame of object A (3040), captured by each camera is taken and partitioned into columns. Then, either one of, odd numbered or even numbered columns of the partitioned image or video frame are removed. The same process is done almost simultaneously to both image or video frames of the respective two cameras (3010, 3020). Then, the two respective image or video frames (3060, 3050) which underwent the above column removal process, is combined into one image or image frame, having an offset as shown in FIG. 30. This combined image or video is displayed in the 3D compatible display screen (3030) to have a 3D viewing experience.

In one embodiment, another mode of displaying the two images or video captured with the two cameras (3010, 3020) of the 3D camera (120) is illustrated in FIG. 31. Here, the image or video frame of object A (3040), captured by each camera is taken and partitioned into columns. Then, each column of the partitioned image or video frame are shifted by a given number of columns. The same process is done to both image or video frames of the respective two cameras (3010, 3020). Then, the two respective image or video frame (3110, 3120) which underwent the above column partition and shift process, is combined into one image or video frame, having an offset as shown in FIG. 31. This combined image is displayed in the 3D compatible display screen (3030) to have a 3D viewing experience. In one embodiment, images or video captured with one camera (3220) is displayed in 3D, in a 3D enabled display (3030) as illustrated in FIG. 32. The image or video frame of object A (3040), captured by the single camera module (3220) is duplicated. Here, the duplicated two image or video frames are taken and partitioned into columns. Then, either one of, odd numbered or even numbered columns of the partitioned image or video frame are removed. The same process is done to both image or video frames (i.e. original & duplicate). Then, the two respective image or video frames (3250, 3260) which underwent the above column removal process, is combined into one image or image frame, having an offset as shown in FIG. 32. This combined image is displayed in the 3D compatible display screen (3030) to have a 3D viewing experience.

In one embodiment, images or video captured with one camera (3220) is displayed in 3D, in a 3D enabled display (3030) as illustrated in FIG. 33. The image or video frame of object A (3040), captured by the single camera module (3220) is duplicated. Here, the duplicated two image or video frames are taken and partitioned into columns. Then, each column of the partitioned image or video frame are shifted by a given number of columns. The same process is done to both image or video frames (i.e. original & duplicate). Then, the two respective image or video frames (3350, 3360) which underwent the above column shift process, is combined into one image or image frame, having an offset as shown in FIG. 33. This combined image is displayed in the 3D compatible display screen (3030) to have a 3D viewing experience.

In one embodiment, some of the features of the 3D viewer (3430), when placed on the display (e.g. Mobile device screen or TV screen) (3420) is illustrated in FIG. 34. The pixel of the display (3410) is placed next to the 3D viewer. By means of this 3D viewer, 3D can be observed without using special glasses (i.e. glass free 3D). Lenticular lens array 420 and the parallel lines array 430 is attached on to the LED or LCD or any other display 410. The lenticular lens array 420 and the parallel lines array 430 is attached on to the LED or LCD or any other display 410 from one side and the other side is attached to another substrate 610.

In one embodiment, some of the features of the 3D viewer sheet (3430), when placed on the display (e.g. Mobile device screen or TV screen) (3420) is illustrated in FIG. 35.

The pixel of the display (3410) is placed next to the 3D viewer. A transparent sheet (3510) is attached or over moulded on the 3D viewer sheet (3430).

In one embodiment, the 3D display sheet converts the regular display of a mobile phone/device or television to a 3D display, which does not require to wear special glasses to view 3D.

In one embodiment, some of the features of the 3D viewer sheet (3610), when placed on the display (e.g. Mobile device screen or TV screen) (3420) is illustrated in FIG. 36. The pixel of the display (3410) is placed near the 3D viewer.

In one embodiment, the mobile phone/device case or cover, which has a 3D camera and a 3D viewer or 3D viewer sheet can be used as a water proofing case/cover for the mobile device.

In one embodiment, the mobile phone/device case or cover, which has a 3D camera and a 3D viewer or 3D viewer sheet may also be made to be used as a water proofing case/cover for the mobile device, which allow the use of the touch panel of the mobile device while underwater.

In one embodiment, some of the features of the 3D viewer, when placed on the display (e.g. Mobile device screen or TV screen) is illustrated in FIG. 37. The pixel of the display (3410) is placed next to the 3D viewer sheet (3610). A transparent sheet (3510) is attached or over moulded on the 3D viewer sheet (3610).

In one embodiment, a 3D camera (120) is mounted on a SLR or Digital SLR camera (3830) as illustrated in FIG. 38.

In one embodiment, the mobile phone/device case or cover which has a 3D camera and a 3D viewer or 3D viewer sheet can be used as a water proofing cover for the mobile device. In one embodiment, the video or still images captured by the camera/3D camera is transmitted to the mobile device, where the video or the still image is viewed on the mobile device's display or screen. The transmission of the video or still image data can be done using wireless transmission or wired transmission. Examples of wireless transmission are wi-fi and Bluetooth transmission, but is not limited to these methods. Examples of mobile devices are mobile phone/devices, tablets, ipad.

In one embodiment, the camera/3D camera can be controlled by using an application which is in the mobile device. The mobile device may communicate with the camera/3D camera by means of wired or wireless communication.

In one embodiment, the still photo frames and video can be stored in the mobile phone/device.

In one embodiment, a transparent substrate or sheet, consisting of a collection of lenticular lenses or lenticular lens array and a collection of micro feature array is combined together to form the 3D display, which is placed on the display screen of the mobile device, which provides and enables the stereoscopic view (vision), to the person viewing the content displayed on the display of the mobile device, which enables 3D vision or 3D viewing of content shown in the display of the mobile device or stereoscopic display disclosed herein. 3D content and 2D content both can be viewed while the 3D viewer sheet is placed on the display.

In one embodiment, a transparent substrate or sheet, consisting of a collection of lenticular lenses or lenticular lens array and a collection of parallel lines array is combined together to form the 3D display, which is placed on the display screen of the mobile device, which provides and enables the stereoscopic view (vision), to the person viewing the content displayed on the display of the mobile device or Television, which enables 3D vision or 3D viewing of content shown in the display of the mobile device or stereoscopic display disclosed herein. The above noted sheet may be attached onto the display or display screen of the camera, mobile phone/device, ipad, tab, laptop, PC monitor, Television or other applicable device. A software application is to be used with the display in order to transform the image or video, to a compatible mode with the display, in order to achieve the desired stereoscopic view and there by provide the 3D viewing experience to the viewer.

In one embodiment, the image/video recorded in 3D or 2D of the whole right around view or the view seen by a camera when rotated, the view all around the camera can be recorded, using the camera disclosed herein. The recorded image/video can be played back on the camera or mobile device, where the viewer can see the full all around view by turning or pointing the mobile device to the direction where the person watching the image/video desires to look at. The camera (120) and the viewer (150) can be used to have an augmented reality experience by the user of the mobile device, by using the cover (110) which is integrated with the viewer (150).

In one embodiment, the mobile device cover (110) which is integrated with the viewer (150) and a gyroscope can be used to record video which can deliver a 3D augmented reality experience to the viewer of the recorded video. This may be used with map applications and direction providing applications.

In one embodiment, the 3D camera disclosed herein can be used for Closed Circuit Television (CCTV) camera applications and the 3D viewer sheet can be used on the Closed Circuit Television monitor, along with the appropriate software, in order to view the 3D image captured by the CCTV camera.

In one embodiment, a transparent substrate or sheet, consisting of a collection of lenticular lenses or lenticular lens array, a collection of parallel lines array and a collection of micro & nano features or structures is combined together to form the 3D viewer sheet, which provides and enables the stereoscopic view (vision), to the person viewing the content displayed on the display, which enables 3D vision or 3D viewing of content shown in the display or stereoscopic display disclosed herein is attached onto the display or display screen of the camera, mobile phone/device, ipad, tab, laptop, PC monitor, or other applicable device. A software application is to be used with the display in order to transform the image or video, to a compatible mode with the display, in order to achieve the desired stereoscopic view and there by provide the 3D viewing experience to the viewer. 3D content and 2D content both can be viewed while the 3D viewer sheet is on the display.

In one embodiment by using the 3D/2D viewer sheet (3900), at a given point of time totally different two or more images/videos can be viewed by two or more people, on one mobile device/display or television. This is done by using/employing the 3D/2D viewer sheet to only make only one image out of the many images visible to a particular region in the viewable range, while two or more images or videos are simultaneously displaying on the display screen of the mobile device or television.

In one embodiment, a software application is to be used with the display in order to transform the image or video, to a compatible mode with the display, in order to achieve the desired stereoscopic view and there by provide the 3D viewing experience to the viewer.

One embodiment, the "Multi Purpose Mobile Device Case/Cover Integrated With A Camera System & non electrical 3D/multiple video & still frame viewer For 3D and/or 2D High Quality Videography, Photography and Selfie Recording" may have an optical camera system comprising: a lens assembly, wherein the lens assembly create a 3 dimensional perspective view which is formed on a 2 dimensional plane or 3 dimensional perspective view which is formed on a 3 dimensional area or 3 dimensional perspective view which is formed on a 3 dimensional object, of the objects or scenery which are in the field of view of the lens assembly or 3 Dimensional still or video image or a 3 Dimensional perspective image or a 3 Dimensional perspective video or a 3 Dimensional perspective view of the objects or scenery which are in the field of view of the lens assembly, on to an image plane or image sensor. The 3 Dimensional image or a 3 Dimensional perspective or a 3 Dimensional perspective view of the objects or scenery which are in the field of view of the lens assembly is formed on a first focal plane which is maintained at a fixed distance from the lens assembly, wherein the image sensor is placed, in order to record 3 Dimensional perspective video or still images. The camera system can convert the 3 dimensional perspective view which is formed on a 2 dimensional plane or 3 Dimensional image or a 3 Dimensional perspective or a 3 Dimensional perspective view of the objects or scenery to high quality 3-Dimensional video and still images using a combination of software and hardware. The lens assembly simultaneously focus a plurality of light rays originating from a plurality of distances, onto the image sensor.

In one embodiment the 3 Dimensional image or a 3 Dimensional perspective or a 3 Dimensional perspective view of the objects or scenery which are in the field of view of the lens assembly of the "Multi Purpose Mobile Device Case/Cover Integrated With A Camera System & non electrical 3D/multiple video & still frame viewer For 3D and/or 2D High Quality Videography, Photography and Selfie Recording" is formed on a first focal plane which is maintained at a fixed distance from the lens assembly, wherein the image sensor is placed, in order to record 3 Dimensional perspective video or still images and/or to record 2 dimensional video and/or still images having a 3 Dimensional perspective view. The recorded 3 Dimensional perspective view is converted to a format of which can be viewed in 3D (i.e. 3 Dimensions) on a appropriate 3D display.

In one embodiment, a unique mobile device casing or cover (110) integrated with a camera system (120) & non electrical 3D viewer (150) is disclosed, which can record 2Dimensional (2D) and 3-Dimensional (3D) video movies and still photographs and which can be used to view both 3-D video/still image, using an attachable/detachable 3D display system is disclosed herein. The unique display disclosed herein can be used to view both 3D and 2D video/still simultaneously.

In one embodiment, the 3D/multiple video & still frame viewer illustrated in FIG. 39 which is the cross section, can simultaneously project multiple videos or still images to multiple users (3920) (3930) (3940), who are watching the same display screen (3900), as shown. FIG. 39) illustrates the cross section of the unique 3D/multiple video & still frame viewer (3900), integrated on the display of mobile device (eg. Mobile device screen or TV screen). The 3D/multiple video & still frame viewer can be used to view both 3-D video/still images, using it's attachable/detachable 3D display system. The unique display disclosed herein can be used to view both 3D and 2D video and/or still images simultaneously. The various pixels (3950) of the display screen of the mobile device or television can display various video or still images simultaneously, and different people can watch different video or still content on the same mobile device screen or television, simultaneously.

In one embodiment, camera may consist of an Optical Image Stabilizer (4010) consisting of: One or more permanent magnets (4030) attached on to a housing (or optical module), One or more hollow electrical coils (4040) or voice coils (4040) resembling the voice coil of an audio speaker, electrical coils (4040) attached to the optical module (or housing) so that the optical module (4060) can be moved by controlling the flow of current through the electrical coils (4040). The hollow electrical coils are in the vicinity of the permanent magnets (4030), so that there will be electromagnetic interaction between the coils and the permanent magnets, when a electric current pass through the coils, Optical module (4060) is attached to the housing (4020) by movable and flexible mountings (4050) or wires or substrate, Electronic circuit which supply electric current to the electrical coils, Feedback mechanism or circuit and electronic control circuit which determine the direction of current flow, at a given point of time. The optical module is moved to the required direction by controlling the current passing through the electrical coils (4040), in order to maintain the stabilized image, on the image sensor.

In another embodiment, The "Multi Purpose Mobile Device Case/Cover Integrated With A Camera System & non electrical 3D/multiple video & still frame viewer For 3D and/or 2D High Quality Videography, Photography and Selfie Recording", may have HDMI output, video/audio output, wireless output, wi-fi output, Bluetooth output, serial output, parallel output, packet data output or any other suitable output.

In another embodiment, The "Multi Purpose Mobile Device Case/Cover" may contain a video/still image projector which can project the content displayed on the mobile device's display onto a projection screen, as shown in FIGS. 28a and 28b. Here, a lens (2870) is placed between the mobile device's display (2860) and a projection screen (2880), in order to project the content displayed on the mobile device's display onto a screen or wall.

In another embodiment, "Multi Purpose Mobile Device Case/Cover" may be integrated with a Digital Light Processor (DLP) type device in order to project the content displayed on the mobile device's display, in 3D or 2D, onto a screen or wall.

In one embodiment, the mobile device case (4100) has an opening for the mobile device's camera (4130) and two camera modules (4120) are connected to an arm (4110) that is attached by hinges which allows the arm to be lifted off the cover and rotated upwards. All of the components are integrated onto the back side of the cover.

In one embodiment, the mobile device case (4100) with an opening for the mobile device's camera (4130) has the arm (4110) lifted 180 degrees up. This allows the user to conveniently use this product to take selfies as well. The arm can be fitted back onto the device case by bending it back down so that it rests on the cavity (4210). This feature allows users to take pictures from the front of their device and also from the back.

In one embodiment, the inner side of mobile device case (4310) has an opening for the mobile device's camera (4130), has a charging connecter (4320) embedded at the bottom which can be connected to the mobile device when needed. The user can pull the charging connecter in order to insert the mobile device into the case and push it back in after fitting the mobile device to the cover. There is also a box (4330) that is detachable and interchangeable and can hold either the camera for photography purposes or the battery box for charging the mobile device or any other compatible component or system.

In one embodiment, a mobile device case (4410) two camera modules (4120) are connected to an arm (4110) which is integrated on an interchangeable box (4420). The box (4420) containing the camera can be inserted into the device case (4410) whenever necessary. This makes it more convenient as the user is able to use the device case for different purposes, in this case, to use it as a camera.

In one embodiment, the mobile device case (4310) two camera modules (130) integrated on a camera (120) which is placed inside the cover. This makes it simple and easy to use. In one embodiment, the mobile device case (4310) which has a box (4330) embedded on it. This box is interchangeable and it can hold a 2D or 3D camera, a battery charger or a health monitor or any other suitable device. This makes this product unique and multi-functional.

In one embodiment, a pair of camera modules (130) is integrated onto the box (4330) as one detachable unit. One of the camera modules is used to zoom and to view 3D and the other to view in high quality 2D.

In one embodiment, a mobile device which has been attached a detachable lenticular sheet (4820) is inserted into the cover (4800) which has audio speakers (4810) integrated on camera casing. The speakers are capable of playing high quality audio and music.

In one embodiment, the inside of the mobile device case (4310) with an opening for the mobile device's camera (4130) containing the stylus (4900). A removable camera unit (4420) has been integrated on a mobile device case or a camera housing. The camera housing can contain a 3D/2D display screen for viewing the video, photos captured by the detachable camera unit, which is connected to the camera housing by means of wireless communication, such as wi-fi or hi-fi or optical communication, but not limited to these communication media. It is convenient as it allows the user to insert the camera into the cover whenever necessary.

In one embodiment, the back of the mobile device case (4310) with an opening for the mobile device's camera (4130) containing the stylus (4900). There are two 3D camera modules (4120) and a device stand (4320) integrated onto the device case. The device stand allows the user to keep the device standing still while capturing high definition 3D videos or images using the 3D camera modules which are on the cover.

In one embodiment, the device case (4100) which is inserted into a dummy device (4910) and the stylus (4900) are mounted on a plastic display case.

In one embodiment, the electronic schematic diagram of the 3D camera unit. The image frame data from image sensors of the two camera modules (5210) combined together by the frame combining module (5220). Then the combined frame data are transmitted via wireless transmission such as wi-fi or hi-fi, but not limited to these methods of wireless transmission or via usb port with a wired method. The transmitted data is received by a mobile device (5240) to view live video or pictures.

In one embodiment, the mobile device case or cover has electronic circuit containing multiple image sensors (5210), connected to an image frame data combining module (5220), which can output 2D image frame, side-by-side image frame, full width image, half width image with the input being two separate image frames from two image sensors. The output is then input to an application processor (5230) and a wireless transmitter module (5240) for wireless transmission of data.

In one embodiment, one method of attaching the lenticular sheet (5320) onto the mobile device (5310). The strips (5330) which hold the lenticular sheet attaching onto mobile device or mobile device cover has attached to the mobile device and an adhesive material (5350) has introduced to keep the lenticular sheet on the surface of the mobile device. In one embodiment, a stylus (4900) having a conductive disc (5410) attached to the tip (5420) of the stylus which can be used on any touch screen device.

In one embodiment, the tip of the stylus (5510) can be rotated or swivelled for a more comfortable writing experience.

In one embodiment, a V-shaped optical component which is used for making a 3D camera capable of capturing side-by-side image/video using a single image sensor (1522). The light beam from the left (5680) and right (5690) of an object (5620) passes through separate objective lenses (5610) and guided through the left (5630) and right (5640) arms of the optical component (5600) respectively and then through the focusing lens (5650) and the side-by-side image is then displayed on the image sensor. This is illustrated in FIG. 56.

In one embodiment, as shown in cross-section of the V-shaped optical component (5600) with the left arm (5630), where the light beam from the left of the object is guided through and the right arm (5640), where the light beam from the right of the object is guided through, from two objective lenses (5610) and then through one focusing lens (5650) at the bottom of the V-shaped optical component which is used to display the side-by-side image onto the image sensor (1522), as illustrated in FIG. 57.

In one embodiment, as shown in cross-section of the V-shaped optical component (5600) with the left (5630) and right (5640) arms where the left and right light beams of an object are guided through respectively, and then through one focusing lens (5650) at the bottom of the V-shaped optical component which is used to display the side-by-side image onto the image sensor (1522), as illustrated in FIG. 58.

In one embodiment, the cross-section of the V-shaped optical component (5600) with the left (5630) and right (5640) arms where the left and right light beams of an object are guided through respectively, from two objective lenses (5910) one attached to each arm and one focusing lens (5920) attached to the bottom of the V-shaped optical component which is used to display the side-by-side image onto the image sensor (1522), as illustrated in FIG. 59.

In one embodiment, cross-section of another optical component utilising a total of four prisms, one on the left (6020), one on the right (6050) and two on the inner side, one on the left (6030) and one on the right (6040). The prisms are placed such that due to total internal reflection in the prism, light beams passing through two lenses (6010) on the left and right are reflected from prism to prism and through the focusing lens (6060), onto the image sensor (1522), as illustrated on FIG. 60.

In one embodiment, cross-section of another optical component utilising a total of four prisms, one on the left (6020), one on the right (6050) and two on the inner side, one on the left (6030) and one on the right (6040). The prisms are placed such that due to total internal reflection in the prism, light beams passing through the prisms on the left and right, are reflected and transmitted from prism to prism and through the focusing lens (6060), onto the image sensor (1522) forming side-by-side image, as illustrated in FIG. 61.
In one embodiment, cross-section of another optical component utilising a total of four prisms, one on the left (6020), one on the right (6050) and two on the inner side, one on the left (6030) and one on the right (6040). The prisms are placed such that due to total internal reflection in the prism, light beams passing through two lenses (6210) attached to the prisms on the left and right, are reflected and transmitted from prism to prism and through the attached focusing lens (6220), onto the image sensor, as illustrated in FIG. 62. In one embodiment, an image display screen or TV screen (6320) with consisting of many pixels (6330) (6340) attached to a 3D viewer (6310) on the flat side. The 3D viewer transmits the light from the pixels of the display in such a way that one pixel can be viewed only by one eye at a given time, as illustrated on FIG. 63.

In one embodiment, the image display screen or TV screen (6320) with many pixels (6330) (6340) is attached onto the corrugated surface of the 3D viewer (6310). The 3D viewer transmits the light from the pixels of the display in such a way that one pixel can be viewed only by one eye at a given time, as illustrated on FIG. 64.

In one embodiment, a 3D viewer (6310) being attached to another 3D viewer (6510) on the flat surface parallel to each other and an image display screen or TV screen (6320) with many pixels (6330) (6340) attached on the top corrugated surface. The 3D viewer transmits the light from the pixels of the display in such a way that one pixel can be viewed only by one eye at a given time, as illustrated on FIG. 65.

In one embodiment, a 3D viewer (6310) being attached to another 3D viewer (6510) on the flat surface, at an angle and an image display screen or TV screen (6320) with many pixels (6330) (6340) attached on the top corrugated surface. The 3D viewer transmits the light from the pixels of the display in such a way that one pixel can be viewed only by one eye at a given time, as illustrated on FIG. 66.

In one embodiment, a 3D viewer (6310) being attached to another 3D viewer (6510) on the corrugated surface, at an angle and an image display screen or TV screen (6320) with many pixels (6330) attached on the bottom corrugated surface, and a hard coating (6710) is put on the top flat surface. The 3D viewer transmits the light from the pixels of the display in such a way that one pixel can be viewed only by one eye at a given time, as illustrated on FIG. 67.

In one embodiment, the corrugated surface of the 3D viewer (6310) being attached to the flat surface of another 3D viewer (6510), at an angle and an image display screen or TV screen (6320) with many pixels (6330) (6340) attached on the top corrugated surface, and a hard coating on the top flat surface. The 3D viewer transmits the light from the pixels of the display in such a way that one pixel can be viewed only by one eye at a given time, as illustrated on FIG. 68.

In one embodiment, two types of multidirectional 3D viewer sheets (6900) (6940) consisting of many 3D viewer pixels (6910) having a shape of a pyramid with a flat or pointed top, and a square or rectangular base. This is illustrated in FIGS. 69 and 70. This multidirectional 3D viewer sheet is attached to an image display screen having multiple pixels (7030). The 3D viewer transmits the light from the pixels of the display in such a way that one pixel can be viewed only by one eye at a given time.

In one embodiment, the back view of a phone or mobile device cover (7130) with a detachable camera unit (7120), with two cameras (7110) is used to capture and record in 2D and 3D. the detachable camera can be attached or detached according to the user's preference. This is illustrated on FIG. 71.

In one embodiment, the phone or mobile device cover (7130) has a detachable unit (7120), with a 2D/3D display, which can be attached or detached from the mobile device cover according to the user's preference. This is illustrated on FIG. 72.

In one embodiment, at the bottom of the mobile device cover, there is a mobile device attaching clip (7310) which has a slit as illustrated on FIG. 73.

In one embodiment, the mobile device cover with a detachable unit (7120) is shown having bevelled edges (7410) as illustrated on FIG. 74. The camera modules (7420) and (7430) can be lifted and rotated to view front and back, thereby making it possible to record 360° videos and photos.

In one embodiment, the detachable unit (7120) is being lifted from the cover (7130) and is being swivelled into various positions according to the user's preference. This is illustrated in FIG. 75.

In one embodiment, the detachable unit (7120) is being attached to the cover (7130) in such a way where the 3D display is facing outwards. This is illustrated in FIG. 76.

In one embodiment, the detachable unit consists of a 3D projector (7710) consisting of two image/video projecting devices (7720). This is illustrated on FIG. 77.

In one embodiment, the detachable unit consists of a sound amplification module with a small box (7810)) containing a sound pipe (7840) connecting to a speaker unit (7820) which can be an independent speaker or the speaker on the mobile device. The box has a small cavity opening (7830) to gain sound amplification. This is illustrated on FIG. 78. In one embodiment, a sound amplification module with a small box (7810)) containing a sound pipe (7840) connecting to a Bluetooth speaker unit (7910). The box has a small cavity opening (7830) to gain sound amplification. There is also a Bluetooth unit where users can connect their mobile device to the mobile device cover and use it as a speaker. This is illustrated on FIG. 79.

In one embodiment, a mobile device is attached to the sound amplification module with a small box (7810)) containing a sound pipe (7840) connecting to a speaker unit (7820).

The box has a small cavity opening (7830) to gain sound amplification. There is also a Bluetooth unit where users can connect their mobile device to the cover and use it as a speaker. This is illustrated on FIG. 80.

In one embodiment, the mobile device (8110) is engaging in wireless or wired communication with the detachable unit (8120) which can be a 2D/3D camera, projector, memory bank, power pack, health monitor or other selected devices. This is illustrated on FIG. 81. The communication and data transfer is done using hardware and software. The detachable unit can also be as an additional memory storage module which can be accessed via wireless or wired communication.

In one embodiment, the 3D camera consists of a V-shaped optical component which has two left and right arms, which act as light guides to guide the light from an object, onto a image sensor device, where two images are formed of any object in the field of view of the V-shaped optical component.

In one embodiment, the 3D camera consists of two objective lenses to collect and focus light and one lens for focussing of image on the image sensor and these lenses can be placed at a distance or in contact with the V-shaped optical component.

In one embodiment, the camera consists of four prisms, placed in two groups of two, where in a given group, light entering into one prism is reflected into the second prism due to total internal reflection at the first prism and the light entering the second prism is reflected due to total internal reflection at the second prism, onto an image sensor forming a side-by-side image on the image sensor due to the two groups of prisms.

In one embodiment, the 3D camera consists of two objective lenses to collect and focus light and one lens for focussing of image on the image sensor and these lenses can be placed at a distance or in contact with the prisms.

In one embodiment, the 3D viewer consists of a corrugated clear polymer sheet in contact with or in close proximity without being in contact with an image display screen such as liquid crystal display, thin film transistor, organic light emitting diode or light emitting diode display.

In one embodiment, the 3D viewer consists of a corrugated clear polymer sheet in contact with or in close proximity without being in contact with a protective glass plate or touch panel placed above a image display screen such as liquid crystal display, thin film transistor, organic light emitting diode or light emitting diode display.

In one embodiment, the 3D viewer consists of two corrugated clear polymer sheets placed in contact on top of each other with the corrugations being in parallel to each other sheet and the image display screen being in close proximity or in contact with either clear polymer sheet.

In one embodiment, the 3D viewer consists of two corrugated clear polymer sheets placed in contact on top of each other with the corrugations being not in parallel to each other sheet and the image display screen being in close proximity or in contact with either clear polymer sheet.

In one embodiment, the 3D viewer consists of an anti-scratch hard coating.

In one embodiment, the 3D viewer consists of multi directional 3D viewer consisting of 3D pixels having a pyramidal shape with a polygonal shaped base having a matching gap between the pixels of the image display screen.

In one embodiment, the 3D camera can be rotated and swivelled with respect to the mobile phone/device case and has its edges bevelled.

In one embodiment, the mobile device case consists of a 2D/3D image projector, made using digital light processors.

In one embodiment, the mobile device cover consists of a passive audio amplifier module which has a sound pipe and a cavity system which amplifies the mobile device's sound and is connected to the speaker of the mobile device by physically being in contact.

In one embodiment, the mobile device cover consists of an active audio amplifier module which has a sound pipe and a cavity system which amplifies the mobile device's sound and is connected to the mobile device by wireless communication.

In one embodiment, the mobile device cover consists of a module which is a memory bank to the mobile device, where the mobile device and the memory bank in the mobile device cover, can exchange data and information via wireless communication.

In one embodiment, the mobile device cover consists of a module which is a health monitor or a 2D projector or a 3D projector or a memory bank or a power pack or power bank or another selected device.

In one embodiment, the corrugated clear polymer sheets of 3D viewer can be lenticular sheets, diamond sheets, prism sheets or a combination of these.

In one embodiment, the mobile device cover consists of a 360° camera.

Some embodiments may include:

1. A mobile device case or cover consisting of a 3D camera, realized by integrating or connecting two cameras and a 3D viewer sheet integrated on a mobile phone case or cover or mobile device case or cover, which may further consist of: The 3D camera can be rotated in multiple axis to enable the 3D camera to be used as main camera as well as a selfie (i.e. self photo or video) camera. The 3D viewer sheet in the form of a sticker or a peel able sticker or a flip cover. The 3D viewer sheet can be put on by flipping the cover on the display and the 3D viewer sheet can be taken off by flipping the cover off from the display. Another flip cover may also be added to the mobile phone/device cover in addition to the 3D viewer sheet. The mobile phone or mobile device can be fitted into the phone/device case or cover. The 3D camera can be controlled by means of an application which operates in the mobile device. The 3D viewer sheet is placed on top of the display screen of the mobile device or television and thereby enabling viewing 3D on the mobile device or television, without using special glasses (i.e. glass free 3D).

2. 3D content and 2D content both can be viewed while the 3D viewer sheet of embodiment 1, is attached on the display.

3. The 3D camera of embodiment 1, can be controlled by means of an application, which operates in the mobile device.

4. The 3D viewer sheet of embodiment 1, can be placed on top of the display screen of a Television and thereby enabling viewing 3D on the Television without using special glasses (i.e. glass free 3D).

5. The image captured by the 3D camera of embodiment 1 is displayed in the mobile phone/device (screen), where the mobile device is attached to the mobile phone/device case. The 3D viewer sheet which is also attached to the mobile device case is placed on top of the mobile phone/device (screen).

6. The 3D viewer sheet of embodiment 1, may be placed either directly on top of the mobile device's display or on top of the protective glass layer.

7. The 3D camera and a 3D viewer is integrated on a mobile phone/device case and the 3D camera can be detached from the mobile phone/device casing, to enable the 3D camera to be used as main camera as well as a selfie camera as well as a remote controlled camera.

8. The 3D camera of embodiment 1, can be rotated in multiple axis with respect to the mobile phone/device casing or cover, to enable the 3D camera to be used as main camera as well as a selfie camera.

9. The 3D camera of embodiment 1, has multiple lenses attached to thumb wheels which can be rotated, thereby where different lenses can be used with the 3D camera, to have multiple optical effects, such as for example Zoom, telephoto, multi image, but not limited to these examples.

10. The thumb wheel containing different lenses of embodiment 9, is placed in front of the auto focus lens of the camera. The image sensor of the camera is placed behind the auto focus lens.

11. The thumb wheel containing different lenses of embodiment 9, is placed in between the auto focus lens and the image sensor.

12. The thumb wheel containing different lenses of embodiment 9, may either be placed in front of the auto focus lens, or in between the auto focus lens and the image sensor.

13. The 3D camera of embodiment 1, may have multiple lenses attached to a thumb wheel where different lenses can be used/changed to have multiple optical effects such as zoom, telephoto, multi image, but not limited to these and this camera can be rotated around multiple axis.

14. The 3D camera and 3D viewer which are integrated on a mobile phone/device case of embodiment 1, is fitted with a camera flash. The flash can be a Light Emitting Device which is usually called LED flash or gas discharge tube flash, Infra Red source or any kind of a light source and the light source may not be limited to visible light.

15. The mobile device case or cover of embodiment 1, consists all or a few of the following: 3D camera, a 3D viewer sheet, electronics with wireless communication, signal processing, data storage, memory card, flash memory card, wi-fi transmitter and receiver, wi-fi hot spot, wireless transmitter and receiver, near field communication, wireless charging, Bluetooth, battery, battery charger for re-charging the battery of the mobile device via the connector on the phone, multiple lenses attached to a thumb wheel where different lenses can be used with the camera to have multiple optical effects, and the camera can be rotated around multiple axis.

16. The thumb wheel of embodiment 9, where multiple lenses can be used with the camera to have multiple optical effects, are coupled via a gear arrangement using wheels.

17. The 3D camera of embodiment 1, can be slipped into the Mobile device case or cover of embodiment 1, after use, for storing.

18. Mobile device case or cover of embodiment 1, may contain a collapsible or retrievable stand which is attached to the mobile phone/device case or cover.

19. Mobile device case or cover of embodiments 1 and 15, may also consist of a regular camera, which can capture 2D still photos and video.

20. Mobile device case or cover of embodiments 1 and 15, may also consist of a regular camera, in addition to the 3D camera of embodiment 1, which can capture 2D still photos and video. This regular camera may also be used or equipped with the thumb wheel of embodiment 9.

21. The 3D camera of embodiment 1, may be permanently fixed on the mobile phone/device case or cover.

22. In the 3D camera of embodiments 1 and 9, a 3D viewer sheet and a Fresnel lens is placed between the mobile phone/device display screen and the eye of the person looking at the mobile phone/device display, in order to have an enhanced viewing experience.

23. In the 3D camera of embodiments 1 and 9, a Fresnel lens is placed between the mobile phone/device display screen and the eye of the person looking at the mobile phone/device display, in order to have an enhanced viewing experience.

24. Out of the many methods which can be used for displaying in 3D, the two images or video frames captured with the two cameras in a 3D camera, one method of displaying the two images or video captured with the two cameras in a 3D camera is as follows: the image or video frame of an object, captured by each camera is taken and partitioned into columns. Then, either one of, odd numbered or even numbered columns of the partitioned image or video frame are removed or discarded. The same process is done almost simultaneously to both image or video frames of the respective two cameras. Then, the two respective image or video frames which underwent the above column removal process, is combined into one image or image frame or video frame, having an offset with respect to each other. This combined image or image frame or video frame is displayed in a 3D compatible display screen, to have a 3D viewing experience.

25. Another method of embodiment 24, which can be used for displaying the two images or video captured with the two cameras in a 3D camera is as follows: the image or video frame of an object, captured by each camera is taken and partitioned into columns. Then, each column of the partitioned image or video frame are shifted by a given number of columns. The same process is done to both image or video frames of the respective two cameras. Then, the two respective image or video frame which underwent the above column partition and shift process, is combined into one image or video frame, having an offset with respect to each other. This combined image or image frame or video frame is displayed in the 3D compatible display screen, to have a 3D viewing experience.

26. Out of the many methods which may be used for displaying in 3D, the images or video captured with one camera, one method is as follows: The image or video frame of an object, captured by the single camera module is duplicated. Here, the duplicated two image or video frames are taken and partitioned into columns. Then, either one of, odd numbered or even numbered columns of the partitioned image or video frame are removed or discarded. The same process is done to both image or video frames (i.e. original & duplicate). Then, the two respective image or video frames which underwent the above column removal process, is combined into one image or image frame, having an offset with respect to each other. This combined image is displayed in the 3D compatible display screen to have a 3D viewing experience.

27. Another method of embodiment 26, which can be used for displaying in 3D is as follows: the image or video frame of an object, captured by the single camera module is duplicated. Here, the duplicated two image or video frames are taken and partitioned into columns. Then, each column of the partitioned image or video frame are shifted by a given number of columns. The same process is done to both image or video frames (i.e. original & duplicate). Then, the two respective image or video frames which underwent the above column shift process, is combined into one image or image frame, having an offset with respect to each other. This combined image is displayed in the 3D compatible display screen to have a 3D viewing experience.

28. The 3D viewer sheet of embodiment 1, may comprise a collection of one or more of lenticular lenses or lenticular lens array, a collection of parallel lines array and a collection of micro & nano features or structures, and is attached on to the LED or LCD or any other display. One side of the 3D viewer sheet is attached on to the LED or LCD or any other display and the other side is attached to another substrate. The pixel in the mobile device display is placed below the 3D viewer sheet. By means of this 3D viewer sheet, 3D can be observed without using special glasses (i.e. glass free 3D).

29. The 3D viewer sheet of embodiment 1, which may comprise some or all of the features of the 3D viewer of embodiment 29, is placed on the display (eg. Mobile device screen or TV screen), the pixel of the display is placed in contact with the 3D viewer sheet. A transparent sheet is attached or over moulded on the 3D viewer sheet.

30. The 3D camera of embodiment 1, can be mounted on a SLR or Digital SLR camera.

31. The 3D viewer sheet of embodiment 1, can be installed or attached on the view finder or the display screen of a SLR or Digital SLR camera in order to have a 3D viewing experience without using/wearing special glasses.

32. By using the 3D/2D viewer sheet, at a given point of time totally different two or more images/videos can be viewed by two or more people, on one mobile device/display or television. This is done by using/employing the 3D/2D viewer sheet to only make one image out of the many images visible to a particular region in the viewable range, while two or more images or videos are simultaneously displaying on the display screen of the mobile device or television.

33. The viewing of different images/video, simultaneously by multiple viewers as in embodiment 32, can be made possible by not using/wearing any special glasses.

34. [Reserved]

35. The mobile phone/device case or cover of embodiment 1, which has a 3D camera and a 3D viewer or 3D viewer sheet may also be made to be used as a water proofing case/cover for the mobile device, which allow the use of the touch panel of the mobile device while underwater.

36. In the camera of embodiment 1, the still photo frames and video can be stored in the mobile phone/device or in the mobile phone/device case or cover itself.

37. The video or still images captured by the camera/3D camera of embodiment 1, is transmitted to the mobile device, where the video or the still image is viewed on the mobile device's display or screen. The transmission of the video or still image data can be done using wireless transmission or wired transmission. Examples of wireless transmission are wi-fi and Bluetooth transmission, but is not limited to these methods. Examples of mobile devices are mobile phone/devices, tablets, and ipad.

38. The 3D viewer sheet of embodiment 1, consisting of a collection of lenticular lenses or lenticular lens array and a collection of micro feature array is combined together to form the 3D display, which is placed on the display screen of the mobile device or Television, which provides and enables the stereoscopic view (vision), to the person viewing the content displayed on the display of the mobile device, which enables 3D vision or 3D viewing of content shown in the display of the mobile device, television or stereoscopic display.

39. The 3D viewer sheet of embodiment 1, consisting of a collection of lenticular lenses or lenticular lens array and a collection of parallel lines array is combined together to form the 3D display, which is placed on the display screen of the mobile device, which provides and enables the stereoscopic view (vision), to the person viewing the content displayed on the display of the mobile device, which enables 3D vision or 3D viewing of content shown in the display of the mobile device or stereoscopic display disclosed herein. The above noted sheet may be attached onto the display or display screen of the camera, mobile phone/device, ipad, tab, laptop, PC monitor, Television or other applicable device. A software application is to be used with the display in order to transform the image or video, to a compatible mode with the display, in order to achieve the desired stereoscopic view and there by provide the 3D viewing experience to the viewer.

40. The camera of embodiment 1, can be used to record image/video in 3D or 2D of the whole right around view or the view seen by a camera when rotated. The recorded image/video can be played back on the camera or mobile device, where the user can see the full all around view by turning or pointing the mobile device to the direction where the person watching the image/video desires to look at.

41. The camera, the 3D viewer sheet of embodiment 1 and the method of embodiment 40, can be used to have an augmented reality experience by the user of the mobile device, by using the mobile device cover/case, which is integrated with the 3D viewer sheet.

42. The mobile device cover of embodiment 1, which is integrated with the 3D or 2D viewer and a gyroscope can be used to record video which can deliver a 3D augmented reality experience to the viewer of the recorded video. This may be used with map applications and applications. providing direction.

43. The 3D camera of embodiment 1, can be used for Closed Circuit Television (CCTV) applications, and the 3D viewer sheet can be used on the Closed Circuit Television monitor, along with the appropriate software, in order to view the 3D image captured by the CCTV camera.

44. The 3D viewer sheet of embodiment 1, consists of a transparent substrate or sheet, of a collection of lenticular lenses or lenticular lens array, a collection of parallel lines array, a collection of micro & nano structures array is combined together to form a 3D viewer sheet, which provides and enables the stereoscopic view (vision), to the person viewing the content displayed on the LED (Light Emitting Diode)/LCD (Liquid Crystal Display)/TFT (Thin Film Transistor)/Plasma display of a mobile device or television, which enables 3D vision or 3D viewing of content shown in the mobile device or television.

45. The 3D viewer sheet of embodiment 1, is attached onto the display or display screen of the camera, mobile phone/device, ipad, tab, laptop, PC monitor, Television or other applicable device. A software application is used on the mobile device or television, in order to transform the image or video, to a compatible mode with the display, in order to achieve the desired stereoscopic view and there by provide the 3D viewing experience to the viewer.

46. A software application is to be used with the display in order to transform the image or video, to a compatible mode with the display, in order to achieve the desired stereoscopic view and there by provide the 3D viewing experience to the viewer.

47. The camera of embodiment 1, comprises: a lens assembly, wherein the lens assembly create a 3 dimensional perspective view which is formed on a 2 dimensional plane or 3 dimensional perspective view which is formed on a 3 dimensional area or 3 dimensional perspective view which is formed on a 3 dimensional object, of the objects or scenery which are in the field of view of the lens assembly or 3 Dimensional still or video image or a 3 Dimensional perspective image or a 3 Dimensional perspective video or a 3 Dimensional perspective view of the objects or scenery which are in the field of view of the lens assembly, on to an image plane or image sensor. The 3 Dimensional image or a 3 Dimensional perspective or a 3 Dimensional perspective view of the objects or scenery which are in the field of view of the lens assembly is formed on a first focal plane which is maintained at a fixed distance from the lens assembly, wherein the image sensor is placed, in order to record 3 Dimensional perspective video or still images. The camera system can convert the 3 dimensional perspective view which is formed on a 2 dimensional plane or 3 Dimensional image or a 3 Dimensional perspective or a 3 Dimensional perspective view of the objects or scenery to high quality 3-Dimensional video and still images using a combination of software and hardware. The lens assembly simultaneously focus a plurality of light rays originating from a plurality of distances, onto the image sensor.

48. The camera of embodiment 1, may also be able to record 3 Dimensional image or a 3 Dimensional perspective or a 3 Dimensional perspective view of the objects or scenery which are in the field of view of the lens assembly is formed on a first focal plane which is maintained at a fixed distance from the lens assembly, wherein the image sensor is placed, in order to record 3 Dimensional perspective video or still images and/or to record 2 dimensional video and/or still images having a 3 Dimensional perspective view. The recorded 3 Dimensional perspective view is converted to a format of which can be viewed in 3D (i.e. 3 Dimensions) on an appropriate 3D display.

49. The mobile device casing or cover of embodiment 1, which is integrated with a camera system & non electrical 3D viewer is disclosed, which can record 2-Dimensional (2D) and 3-Dimensional (3D) video movies and still photographs and which can be used to view both 3-D video/still image, using an attachable/detachable 3D display system is disclosed herein. The unique display disclosed herein can be used to view both 3D and 2D video/still simultaneously.

50. The 3D viewer sheet of embodiment 1, may not require electricity to function.

51. The 3D display sheet of embodiment 1, converts the regular display of a mobile phone/device or television to a 3D display, which does not require to wear special glasses to view 3D.

52. The 3D display sheet of embodiment 1, may be a 3D/multiple video & still frame viewer illustrated in FIG. 39, which can have the following functions. Simultaneously project multiple videos or still images to multiple users (3920) (3930) (3940), who are watching the same display screen, as shown. FIG. 39). The 3D/multiple video & still frame viewer can be used to view both 3D video/still images, using it's attachable/detachable 3D display system. The various pixels (3950) of the display screen of the mobile device or television can display various video or still images simultaneously, and different people can watch different video or still content on the same mobile device screen or television, simultaneously. The unique display disclosed herein can be used to view both 3D and 2D video and/or still images simultaneously.

53. The camera of embodiment 1, may consist of an Optical Image Stabilizer consisting of: One or more permanent magnets attached on to a housing; One or more hollow electrical coils or voice coils resembling the voice coil of an audio speaker; Electrical coils attached to the optical module, so that the optical module can be moved by controlling the flow of current flow. Hollow electrical coils are in the vicinity of the permanent magnets, so that there will be electromagnetic interaction between the coils and the permanent magnets, when an electric current pass through the coils. Optical module is attached to the housing by movable and flexible mountings or wires or substrate. Electronic circuit which supply electric current to the electrical coils. Feedback mechanism or circuit and electronic control circuit, which determine the direction of current flow, at a given point of time.

54. The camera of embodiment 1, may have HDMI output, video/audio output, wireless output, wi-fi output, Bluetooth output, serial output, parallel output, packet output or any other suitable output.

55. The "Multi Purpose Mobile Device Case/Cover" of embodiment 1, may contain a video/still image projector which can project the content displayed on the mobile device's display onto a projection screen or wall. A lens system placed between the mobile device's display and a projection screen/wall, in order to project the content displayed on the mobile device's display onto a screen or wall.

56. The "Multi Purpose Mobile Device Case/Cover" of embodiment 1, may be integrated with a Digital Light Processor (DLP) type device in order to project the content displayed on the mobile device's display, in 3D or 2D, onto a screen or wall.

57. The mobile device case or cover of embodiment 1, has 3D camera connected to an arm by hinges to allow the cover to be lifted off and rotated upwards.

58. The mobile device case or cover of embodiment 1, has an opening for the mobile device's camera with the arm lifted upwards allows the user to conveniently use to take selfies and the arm can be fitted back onto the phone case by bending it back down so that it rests on the cavity. This feature allows users to take pictures from the front of their phone and also from the back.

59. The mobile device case or cover of embodiment 1, has a charging connecter which can be connected to the mobile device and a small box which is detachable and interchangeable and can hold either the camera or the battery or any other system or device.

60. The mobile device case or cover of embodiment 1, has a 3D camera inside an interchangeable box.

61. The mobile device case or cover of embodiment 1, has two camera modules placed inside the cover to make it simple and easy to use.

62. The mobile device case or cover of embodiment 1, is unique and multi-functional because of the box which is interchangeable and can hold a 2D or 3D camera, a battery charger or a health monitor.

63. The mobile device case or cover of embodiment 1, has 2 camera modules as one detachable unit. One of them is used to zoom and to view 3D and the other to view in high quality 2D.

64. The mobile device case or cover of embodiment 1, has a lenticular sheet attached to the display and audio speakers embedded on the front of the device.

65. The mobile device case or cover of embodiment 1, has a stylus and a removable camera unit.

66. The mobile device case or cover of embodiment 1, has two 3D camera modules and a stand.

67. The mobile device case or cover of embodiment 1, has a packaging of the mobile device.

68. The mobile device case or cover of embodiment 1, has electronic circuit containing multiple image sensors, connected to an image frame data combining module, which can output 2D image frame, side-by-side image frame, full width image, half width image with the input being two separate image frames from two image sensors. The output is then input to an application processor and a wireless transmitter module for wireless transmission of data.

69. The mobile device case or cover of embodiment 1, has a lenticular sheet attached onto the mobile device by means of strips and adhesive material.

70. The 3D camera of embodiment 7, consists of a V-shaped optical component which has two left and right arms, which act as light guides to guide the light from an object, onto an image sensor device, where two images are formed of any object in the field of view of the V-shaped optical component.

71. The 3D camera of embodiment 7, consists of two objective lenses to collect and focus light and one lens for focussing of image on the image sensor and these lenses can be placed at a distance or in contact with the V-shaped optical component of embodiment 70.

72. The camera of embodiment 7, consists of four prisms, placed in two groups of two, where in a given group, light entering into one prism is reflected into the second prism due to total internal reflection at the first prism and the light entering the second prism is reflected due to total internal reflection at the second prism, onto an image sensor forming a side by-side image on the image sensor due to the two groups of prisms.

73. The 3D camera of embodiment 7, consists of two objective lenses to collect and focus light and one lens for focussing of image on the image sensor and these lenses can be placed at a distance or in contact with the prisms of embodiment 72.

74. The 3D viewer of embodiment 7, consists of a corrugated clear polymer sheet in contact with or in close proximity without being in contact with an image display screen such as liquid crystal display, thin film transistor, organic light emitting diode or light emitting diode display.

75. The 3D viewer of embodiment 7, consists of a corrugated clear polymer sheet in contact with or in close proximity without being in contact with a protective glass plate or touch panel placed above an image display screen such as liquid crystal display, thin film transistor, organic light emitting diode or light emitting diode display.

76. The 3D viewer of embodiment 7, consists of two corrugated clear polymer sheets placed in contact on top of each other with the corrugations being in parallel to each other sheet and the image display screen being in close proximity or in contact with either clear polymer sheet.

77. The 3D viewer of embodiment 7, consists of two corrugated clear polymer sheets placed in contact on top of each other with the corrugations being not in parallel to each other sheet and the image display screen being in close proximity or in contact with either clear polymer sheet.

78. The 3D viewer of embodiment 7, consists of an anti-scratch hard coating.

79. The 3D viewer of embodiment 7, consists of multi directional 3D viewer consisting of 3D pixels having a pyramidal shape with a polygonal shaped base having a matching gap between the pixels of the image display screen.

80. The corrugated clear polymer sheets of embodiments 74 to 77 can be lenticular sheets, diamond sheets, prism sheets or a combination.

81. The 3D camera of embodiment 7, can be rotated and swivelled with respect to the mobile phone/device case and has its edges bevelled.

82. The mobile device case of embodiment 7, consists of a 2D/3D image projector, made using digital light processors.

83. The mobile device cover of embodiment 7, consists of a passive audio amplifier module which has a sound pipe and a cavity system which amplifies the mobile device's sound and is connected to the speaker of the mobile device by physically being in contact.

84. The mobile device cover of embodiment 7, consists of an active audio amplifier module which has a sound pipe and a cavity system which amplifies the mobile device's sound and is connected to the mobile device by wireless communication.

85. The mobile device cover of embodiment 7, consists of a module which is a memory bank to the mobile device, where the mobile device and the memory bank in the mobile device cover, can exchange data and information via wireless communication.

86. The mobile device cover of embodiment 7, consists of a module which is a health monitor.

87. The mobile device cover of embodiment 7, consists of a 360° camera.

What is claimed is:

1. A mobile phone/device case or cover (110) having a 3D camera, realized by integrating or connecting two cameras and a 3D viewer sheet integrated on the phone/device case or cover; wherein the 3D camera comprises: a V-shaped optical component (5600) having left (5630) and right (5640) arms, which act as light guides to guide the light from an object, onto an image sensor (1522), and a focusing lens (5650) for focusing an image on the image sensor, where two images are formed of any object in the field of view of the V-shaped optical component; wherein the 3D viewer sheet consists of:

(i) a corrugated clear polymer sheet in contact with or in close proximity without being in contact with an image display screen;
(ii) a corrugated clear polymer sheet in contact with or in close proximity without being in contact with a protective glass plate or touch panel placed above an image display screen;
(iii) two corrugated clear polymer sheets placed in contact on top of each other with the corrugations being in parallel to each other sheet and the image display screen being in close proximity or in contact with either clear polymer sheet; or
(iv) two corrugated clear polymer sheets placed in contact on top of each other with the corrugations being not in parallel to each other sheet and the image display screen being in close proximity or in contact with either clear polymer sheet.

2. The mobile phone/device case or cover of claim 1, wherein the 3D camera further comprises two objective lenses (5610, 5610) to collect and focus light from an object and guide the light through the left and right arms of the V-shaped optical component, respectively.

3. The mobile phone/device case or cover of claim 1, wherein the V-shaped optical component comprises four prisms (6020, 6030, 6040, 6050) placed in two groups of two, where in a given group, light entering into one prism is reflected into the second prism due to total internal reflection at the first prism and the light entering the second prism is reflected due to total internal reflection at the second prism, on the image sensor, forming side-by-side images on the image sensor.

4. The mobile phone/device case or cover of claim 2, wherein the V-shaped optical component comprises four prisms (6020, 6030, 6040, 6050) placed in two groups of two, where in a given group, light entering into one prism is reflected into the second prism due to total internal reflection at the first prism and the light entering the second prism is reflected due to total internal reflection at the second prism, on the image sensor, forming side-by-side images on the image sensor.

5. The mobile phone/device case or cover of claim 2, wherein the two objective lenses are placed at a distance from the V-shaped optical component.

6. The mobile phone/device case or cover of claim 2, wherein the two objective lenses are placed in contact with the V-shaped optical component.

7. The mobile phone/device case or cover of claim 4, wherein the two objective lenses are placed at a distance from the V-shaped optical component.

8. The mobile phone/device case or cover of claim 4, wherein the two objective lenses are placed in contact with the V-shaped optical component.

9. The mobile phone/device case or cover of claim 1, wherein the 3D camera is rotatable in multiple axes, allowing the 3D camera to be used as main camera and a selfie camera.

10. The mobile phone/device case or cover of claim 1, wherein the 3D camera is detachable from the mobile phone/device case or cover, allowing the 3D camera to be used as a remote-controlled camera.

11. The mobile phone/device case or cover of claim 1, wherein the 3D viewer sheet is in a form selected from the group consisting of a sticker, a peel-able sticker, and a flip cover.

12. The mobile phone/device case or cover of claim 1, wherein the 3D camera is controlled by an application which operates in the mobile phone/device.

13. The mobile phone/device case or cover of claim 1, wherein the 3D viewer sheet is placed on top of a display screen of the mobile phone/device, allowing 3D viewing on the mobile phone/device, without the use of special glasses.

14. The mobile phone/device case or cover of claim 1, wherein the corrugated clear polymer sheets are selected from the group consisting of lenticular sheets, diamond sheets, prism sheets, and combinations thereof.

15. The mobile phone/device case or cover of claim 1, wherein the image display screen is a liquid crystal display, a thin film transistor, an organic light emitting diode, or a light emitting diode display.

16. The mobile phone/device case or cover of claim 1, wherein the 3D viewer sheet does not require electricity to function.

17. A mobile phone/device case or cover consisting of a 3D camera,
realized by integrating or connecting two cameras and a 3D viewer sheet integrated on the phone/device case or cover; wherein the 3D camera comprises:
(a) a V-shaped optical component having left and right arms, which act as light guides to guide the light from an object, onto an image sensor, and a focusing lens for focusing an image on the image sensor, where two images are formed of any object in the field of view of the V-shaped optical component; and
(b) two objective lenses to collect and focus light from an object and guide the light through the left and right arms of the V-shaped optical component, respectively, wherein the two objective lenses are placed at a distance from the V-shaped optical component;
wherein the 3D viewer sheet does not require electricity to function; and
wherein the 3D viewer sheet consists of:
(i) a corrugated clear polymer sheet in contact with or in close proximity without being in contact with an image display screen;
(ii) a corrugated clear polymer sheet in contact with or in close proximity without being in contact with a protective glass plate or touch panel placed above an image display screen;
(iii) two corrugated clear polymer sheets placed in contact on top of each other with the corrugations being in parallel to each other sheet and the image display screen being in close proximity or in contact with either clear polymer sheet; or
(iv) two corrugated clear polymer sheets placed in contact on top of each other with the corrugations being not in parallel to each other sheet and the image display screen being in close proximity or in contact with either clear polymer sheet.

18. The mobile phone/device case or cover of claim 17, wherein the corrugated clear polymer sheets are selected from the group consisting of lenticular sheets, diamond sheets, prism sheets, and combinations thereof.

19. The mobile phone/device case or cover of claim 17, wherein the image display screen is a liquid crystal display, a thin film transistor, an organic light emitting diode, or a light emitting diode display.

20. The mobile phone/device case or cover of claim 17, wherein the 3D camera is rotatable in multiple axes, allowing the 3D camera to be used as main camera and a selfie camera.

* * * * *